US012720528B2

(12) United States Patent
Jang et al.

(10) Patent No.: US 12,720,528 B2
(45) Date of Patent: Aug. 25, 2026

(54) METHOD AND APPARATUS FOR FREQUENCY RESOURCE ALLOCATION IN WIRELESS COMMUNICATION SYSTEMS

(71) Applicant: Samsung Electronics Co., Ltd., Gyeonggi-do (KR)

(72) Inventors: Youngrok Jang, Gyeonggi-do (KR); Ameha Tsegaye Abebe, Gyeonggi-do (KR); Seongmok Lim, Gyeonggi-do (KR); Hyoungju Ji, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 557 days.

(21) Appl. No.: 17/857,477

(22) Filed: Jul. 5, 2022

(65) Prior Publication Data

US 2023/0028259 A1 Jan. 26, 2023

(30) Foreign Application Priority Data

Jul. 5, 2021 (KR) ........................ 10-2021-0088104
Jul. 4, 2022 (KR) ........................ 10-2022-0082142

(51) Int. Cl.
*H04W 72/12* (2023.01)
*H04W 72/1268* (2023.01)

(52) U.S. Cl.
CPC ............................... *H04W 72/1268* (2013.01)

(58) Field of Classification Search
CPC ............ H04W 72/1268; H04W 72/231; H04L 5/0044; H04L 1/08
See application file for complete search history.

(56) References Cited

U.S. PATENT DOCUMENTS 12,317,255 B2 * 5/2025 Kang ................ H04W 72/1268
2020/0196307 A1 6/2020 Yerramalli et al.
2020/0214005 A1 * 7/2020 Lee ......................... H04L 1/189
2020/0275431 A1 8/2020 Bae et al.
2021/0036808 A1 2/2021 Papasakellariou et al.
2022/0104224 A1 * 3/2022 Choi ..................... H04L 5/0053
(Continued)

FOREIGN PATENT DOCUMENTS

WO WO 2020/033785 2/2020

OTHER PUBLICATIONS

ZTE Corporation, "Discussion on Support of Type A PUSCH Repetitions for Msg3", R1-2104334, 3GPP TSG RAN WG1 #105-e, May 10-27, 2021, 17 pages.
(Continued)

*Primary Examiner* — Wutchung Chu
(74) *Attorney, Agent, or Firm* — The Farrell Law Firm, P.C.

(57) ABSTRACT

The disclosure relates to a 5G or 6G communication system for supporting a higher data transmission rate. The method performed by a user equipment (UE) in a wireless communication system is provided. The method comprises receiving, from a base station (BS), a radio resource control (RRC) message including configuration information related to a physical uplink shared channel (PUSCH) repetition transmission, identifying a frequency resource for the PUSCH repetition transmission based on the configuration information, and information about at least one scheduled resource for the UE, and transmitting, to the BS, based on the frequency resource, a data via a PUSCH.

17 Claims, 21 Drawing Sheets

(56) References Cited

U.S. PATENT DOCUMENTS

2022/0116968 A1* 4/2022 Choi .................... H04L 5/0053
2022/0132533 A1* 4/2022 Taherzadeh Boroujeni ................ H04L 5/1469
2022/0150928 A1* 5/2022 Choi .................... H04L 5/0078
2023/0028259 A1* 1/2023 Jang .......................... H04L 1/08
2023/0114039 A1* 4/2023 Manolakos ........... H04L 5/0094 370/329
2023/0403702 A1* 12/2023 Su ......................... H04L 1/1896
2024/0163011 A1* 5/2024 Hasegawa ............. H04L 1/0071
2024/0163869 A1* 5/2024 Nogami ............ H04W 72/0446
2024/0306128 A1* 9/2024 Yoshimura .......... H04W 72/231

OTHER PUBLICATIONS

International Search Report dated Oct. 7, 2022 issued in counterpart application No. PCT/KR2022/009638, 11 pages.

* cited by examiner

FIG. 2

200
1 frame
201
1 subframe
slot
202
slot
203
204 μ = 0
205 μ = 1
0 1 2 3 4 5 6 7 8 9
0 1 2 3 4 5 6 7 8 9 10 11 12 13 14 15 16 17 18 19

System DL–UL configuration 700
Bandwidth 701
Symbol/slot 702
Frequency
Time
: Downlink resource 703
: Guard band 704
: Uplink resource 705
UE1's DL–UL configuration 710
UE2's DL–UL configuration 720
UE3's DL–UL configuration 730
UE4's DL–UL configuration 740

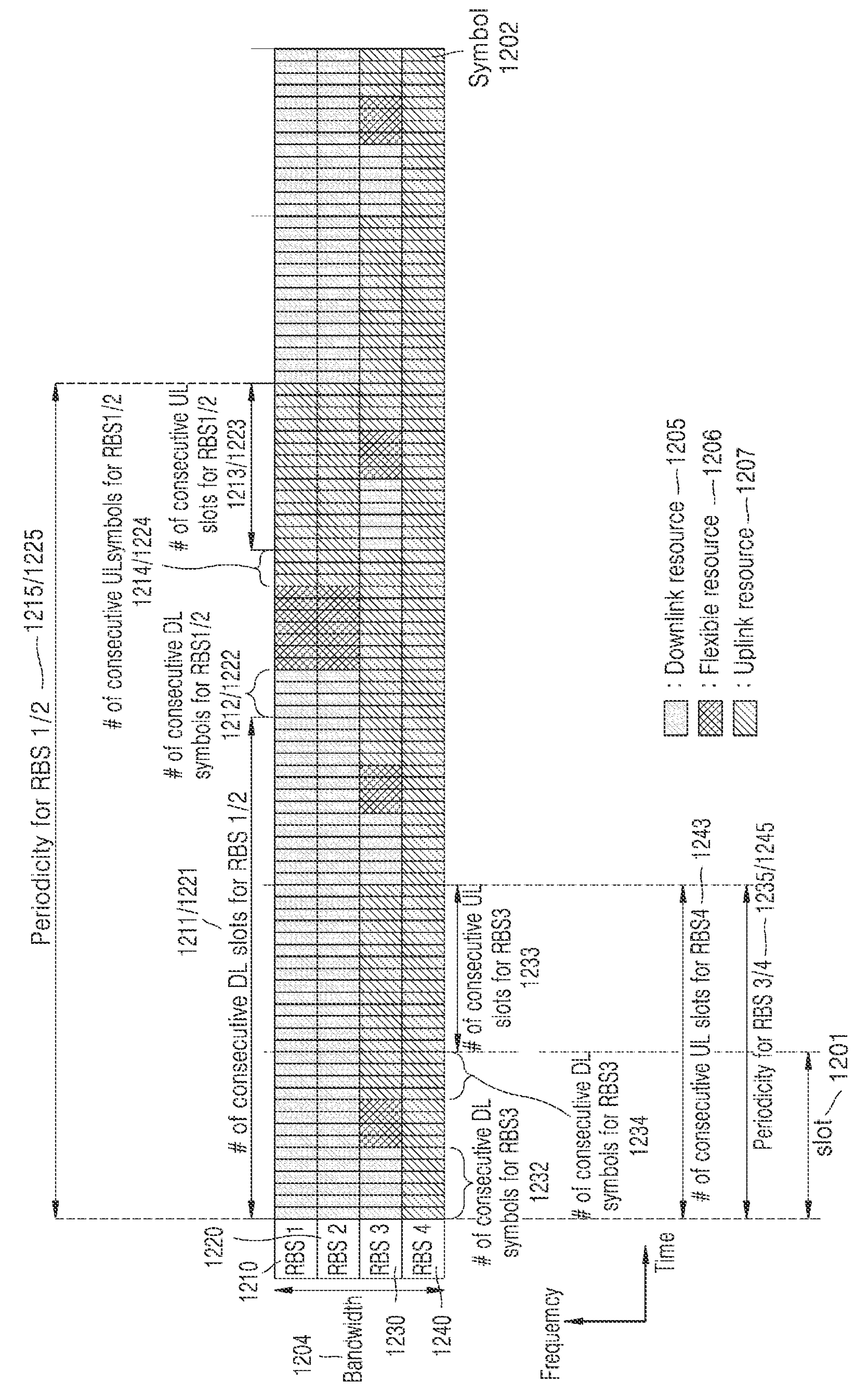
FIG. 12
Periodicity for RBS 1/2 1215/1225
# of consecutive DL slots for RBS 1/2 1211/1221
# of consecutive DL symbols for RBS1/2 1212/1222
# of consecutive ULsymbols for RBS1/2 1214/1224
# of consecutive UL slots for RBS1/2 1213/1223
Symbol 1202
: Downlink resource 1205
: Flexible resource 1206
: Uplink resource 1207
RBS 1
RBS 2
RBS 3
RBS 4
1210
1220
1204
Bandwidth
1230
1240
# of consecutive DL symbols for RBS3 1232
# of consecutive DL symbols for RBS3 1234
# of consecutive UL slots for RBS3 1233
# of consecutive UL slots for RBS4 1243
Periodicity for RBS 3/4 1235/1245
slot 1201
Frequency
Time FIG. 16
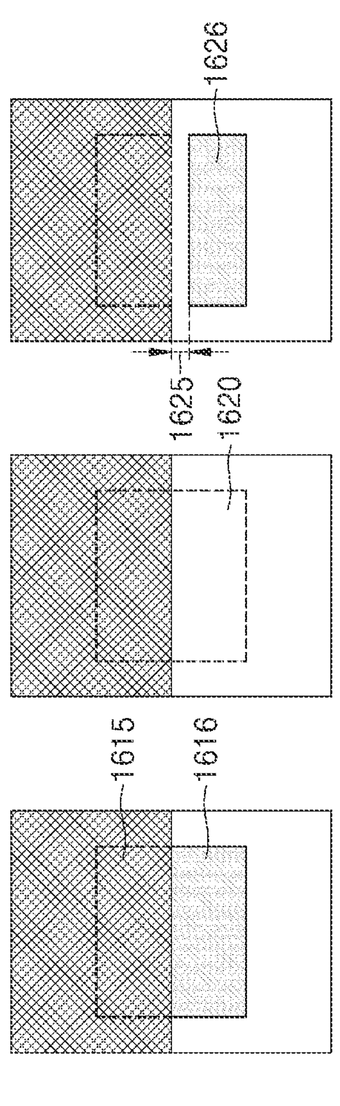
: DL resource — 1600
: UL resource — 1601
: PUSCH resource — 1602
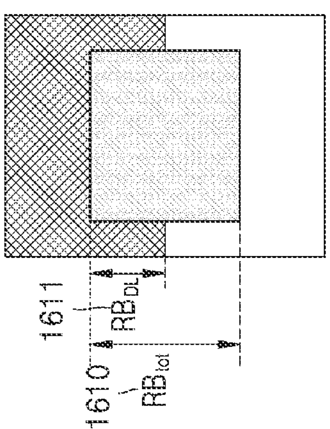
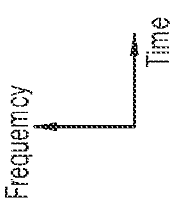

FIG. 17
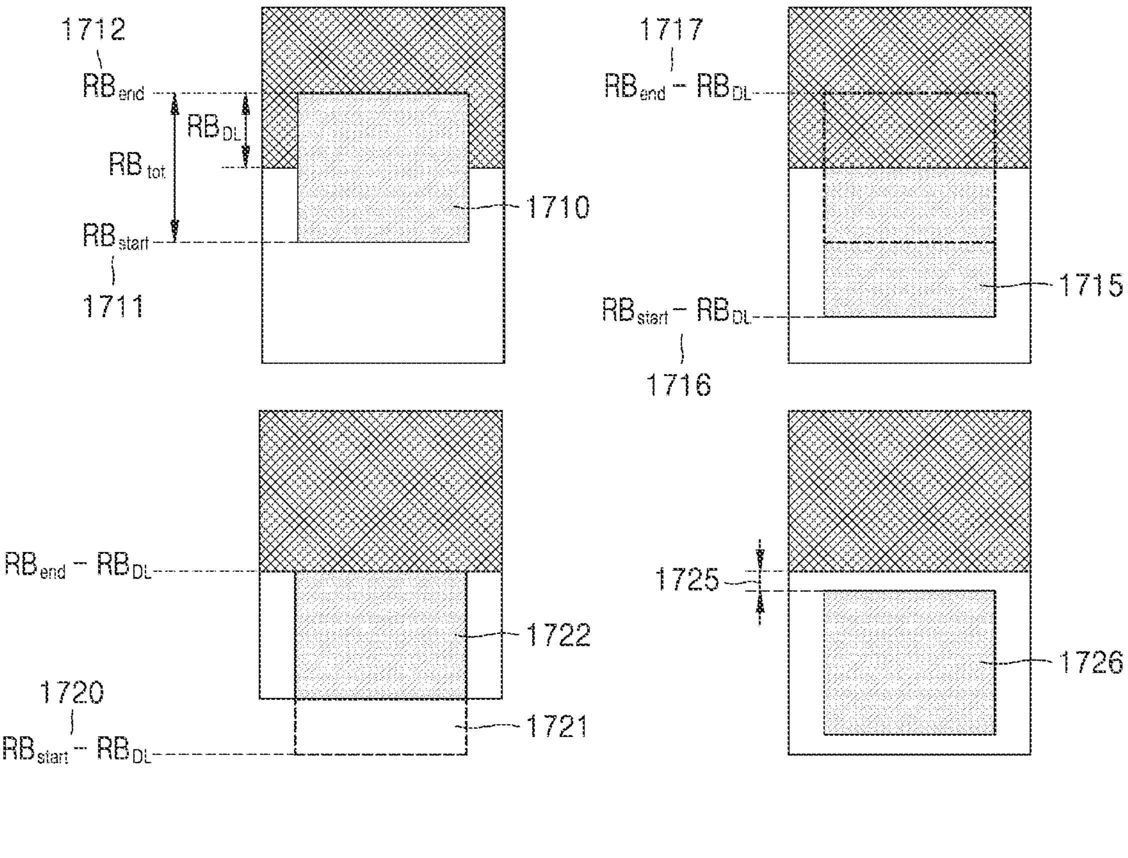
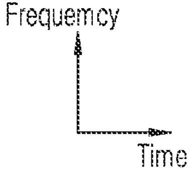

METHOD AND APPARATUS FOR FREQUENCY RESOURCE ALLOCATION IN WIRELESS COMMUNICATION SYSTEMS

CROSS-REFERENCE TO RELATED APPLICATIONS

This application is based on and claims priority under 35 U.S.C. § 119 to Korean Patent Application No. 10-2021-0088104, filed on Jul. 5, 2021 in the Korean Intellectual Property Office, and 35 U.S.C. § 119 to Korean Patent Application No. 10-2022-0082142, filed on Jul. 4, 2022 in the Korean Intellectual Property Office, the disclosure of each of which is incorporated herein by reference.

BACKGROUND

1. Field

The disclosure relates generally to a wireless communication system, and more particularly, to a method and apparatus for frequency resource allocation in the wireless communication system.

2. Description of the Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mm Wave including 28 GHz and 39 GHz. In addition, it has been considered to implement 6G mobile communication technologies (referred to as Beyond 5G systems) in terahertz bands (for example, 95 GHz to 3THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure has been made to address at least the above-described issues and to provide at least the advantages described below. Accordingly, an aspect of the disclosure provides a method and an apparatus for allocating frequency resources in a wireless communication system.

In an exemplary embodiment, the method performed by a user equipment (UE) in a wireless communication system is provided. The method comprising: receiving, from a base station (BS), a radio resource control (RRC) message including configuration information related to a physical uplink shared channel (PUSCH) repetition transmission, identifying a frequency resource for the PUSCH repetition transmission based on the configuration information, and information about at least one scheduled resource for the UE, and transmitting, to the BS, based on the frequency resource, a data via a PUSCH.

In an exemplary embodiment, wherein the configuration information includes information indicating that the PUSCH repetition transmission is configured to the UE. Wherein the information about at least one scheduled resource includes information indicating that a configured frequency bandwidth part including a first frequency resource allocated for downlink reception and a second frequency resource allocated for uplink transmission in a time resource is allocated to the terminal, or information indicating that a first bandwidth part and a second bandwidth part that partially or entirely overlap on a frequency domain is allocated to the terminal, and wherein a time ratio of resources allocated for downlink reception and resources allocated for uplink transmission for each of the first bandwidth part and the second bandwidth part is different from each other.

In an exemplary embodiment, wherein identifying a frequency resource for the PUSCH repetition transmission based on the configuration information, and the information about at least one scheduled resource for the UE comprises: identifying whether scheduled resources for receiving a downlink and allocated resources for the PUSCH repetition transmission overlap in a time domain and in a frequency domain based on the configuration information, and the information about at least one scheduled resource.

In an exemplary embodiment, wherein the frequency resource for the PUSCH repetition transmission is identified based on a total number of resource blocks with respect to the PUSCH repetition transmission and, a number of resource block allocated for receiving a downlink, and wherein the configuration information includes the total number of resource blocks.

In an exemplary embodiment, wherein the frequency resource for the PUSCH repetition transmission is identified based on a number of resource blocks allocated for receiving a downlink, a start resource block index with respect to the PUSCH repetition transmission, and an end resource block index with respect to the PUSCH repetition transmission, and wherein the configuration information includes the start resource block index and the end resource block index.

In an exemplary embodiment, wherein the configuration information includes information indicating invalid resource in time domain and frequency domain.

In an exemplary embodiment, the method further comprising: transmitting, to the BS, UE capability information including at least one UE capability related to the PUSCH repetition transmission.

In an exemplary embodiment, a method performed by a base station (BS) in a wireless communication system is provided. The method comprising: transmitting, to a user equipment (UE), a radio resource control (RRC) message including configuration information related to a physical uplink shared channel (PUSCH) repetition transmission, identifying a frequency resource for the PUSCH repetition transmission based on the configuration information, and information about at least one scheduled resource for the UE, and receiving, from the UE, based on the frequency resource, a data via a PUSCH.

In an exemplary embodiment, wherein the configuration information includes information indicating that the PUSCH repetition transmission is configured to the UE, and wherein the information about at least one scheduled resource includes information indicating that a configured frequency bandwidth part including a first frequency resource allocated for downlink reception and a second frequency resource allocated for uplink transmission in a time resource is allocated to the terminal, or information indicating that a first bandwidth part and a second bandwidth part that partially or entirely overlap on a frequency domain is allocated to the terminal, and wherein a time ratio of resources allocated for downlink reception and resources allocated for uplink transmission for each of the first bandwidth part and the second bandwidth part is different from each other.

In an exemplary embodiment, wherein identifying a frequency resource for the PUSCH repetition transmission based on the configuration information, and the information about at least one scheduled resource for the UE comprises: identifying whether scheduled resources for receiving a downlink and allocated resources for the PUSCH repetition transmission overlap in a time domain and in a frequency domain based on the configuration information, and the information about at least one scheduled resource.

In an exemplary embodiment, wherein the frequency resource for the PUSCH repetition transmission is identified based on a total number of resource blocks with respect to the PUSCH repetition transmission and, a number of resource block allocated for receiving a downlink, and wherein the configuration information includes the total number of resource blocks.

In an exemplary embodiment, wherein the frequency resource for the PUSCH repetition transmission is identified based on a number of resource blocks allocated for receiving a downlink, a start resource block index with respect to the PUSCH repetition transmission, and an end resource block index with respect to the PUSCH repetition transmission, and wherein the configuration information includes the start resource block index and the end resource block index.

In an exemplary embodiment, wherein the configuration information includes information indicating invalid resource in time domain and frequency domain.

In an exemplary embodiment, the method further comprising: receiving, from the UE, UE capability information including at least one UE capability related to the PUSCH repetition transmission.

In an exemplary embodiment, a user equipment (UE) performed in a wireless communication system, the UE comprising: a transceiver; and at least one processor coupled to the transceiver and configured to: receive, from a base station (BS), a radio resource control (RRC) message including configuration information related to a physical uplink shared channel (PUSCH) repetition transmission, identify a frequency resource for the PUSCH repetition transmission based on the configuration information, and information about at least one scheduled resource for the UE, and transmit, to the BS, based on the frequency resource, a data via a PUSCH.

In an exemplary embodiment, wherein the at least one processor is configured to: identify whether scheduled resources for receiving a downlink and allocated resources for the PUSCH repetition transmission overlap in a time domain and in a frequency domain based on the configuration information, and the information about at least one scheduled resource.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates an example of a slot structure used in a 5G wireless communication system;

FIG. 12 illustrates an example of a data channel scheduling method, according to an embodiment;

FIG. 16 illustrates an example of a method for allocating/determining frequency resources, according to an embodiment;

FIG. 17 illustrates an example of a method for allocating/determining frequency resources, according to an embodiment;

DETAILED DESCRIPTION

Figure 1:
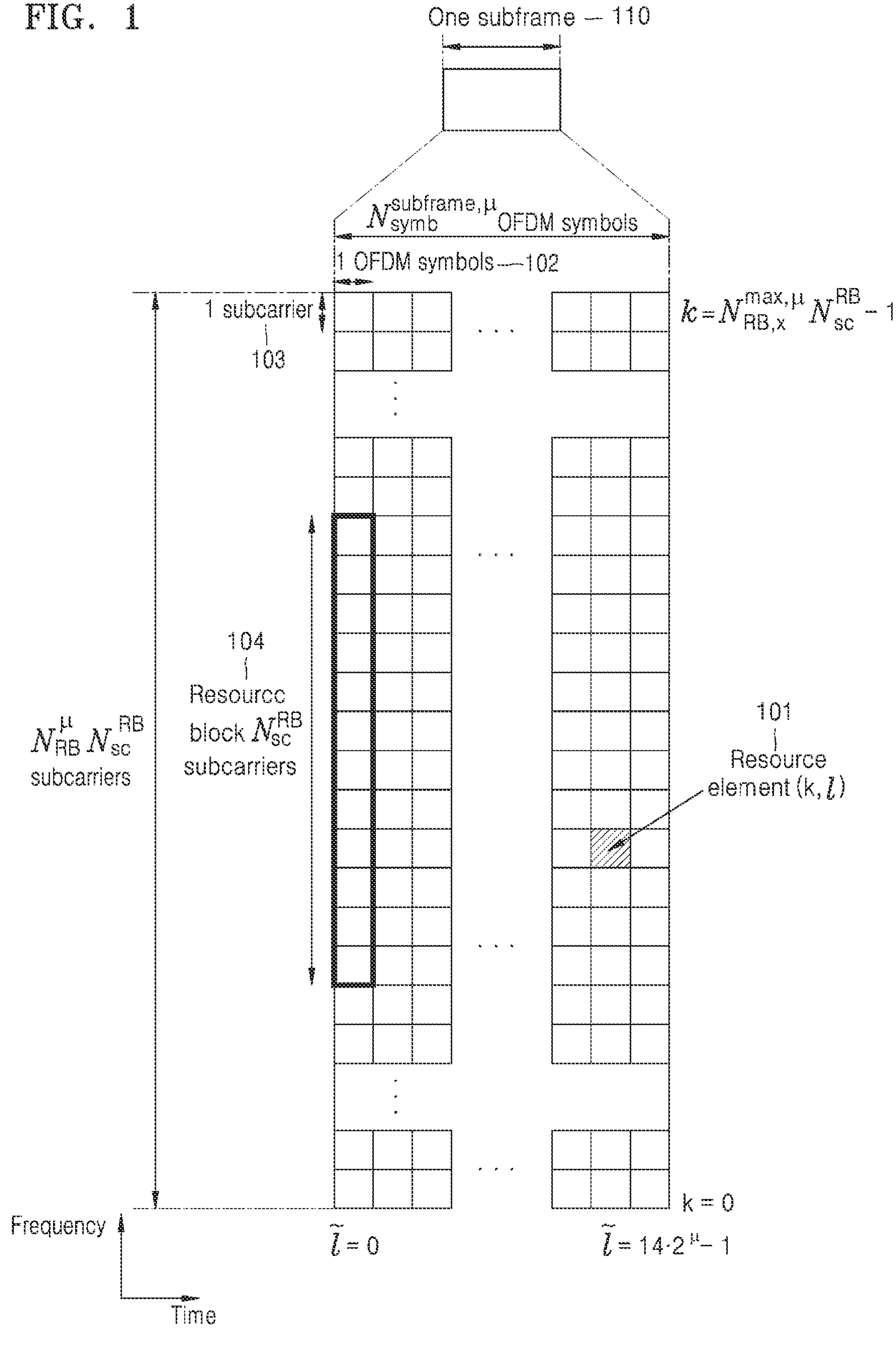
FIG. 1 illustrates a basic structure of a time-frequency domain, which is a radio resource domain in which a data or control channel is transmitted, in a 5G wireless communication system.

Embodiments of the disclosure are described in detail with reference to the attached drawings. The same or similar components may be designated by the same or similar reference numerals although they are illustrated in different drawings. Detailed descriptions of constructions or processes known in the art may be omitted to avoid obscuring the subject matter of the disclosure.

Some elements may be exaggerated, omitted, or schematically illustrated in drawings. A size of an illustrated element does not entirely reflect a real size of the element.

The disclosure may be embodied in many different forms and should not be construed as limited to embodiments set forth herein; rather these embodiments are provided so that this disclosure will be thorough and complete, and will fully convey the scope of the disclosure to one of ordinary skill in the art, and the scope of the disclosure is defined only by the accompanying claims. The terms used herein are those defined in consideration of functions in regard to the disclosure, but the terms may vary according to the intention of users or operators, precedents, etc. Thus, the terms used in the specification should be understood based on the overall description of the disclosure.

Throughout the disclosure, the expression “at least one of a, b or c” indicates only a, only b, only c, both a and b, both a and c, both b and c, all of a, b, and c, or variations thereof.

Throughout the disclosure, a layer may also be referred to as an entity.

Herein, a base station (BS) is an entity for allocating a resource to a terminal and may include at least one of a gNode B (gNB), an eNode B (eNB), a Node B (NB), a radio access unit, a BS controller, or a node on a network. A terminal may include a user equipment (UE), a mobile station (MS), a cellular phone, a smart phone, a computer, or a multimedia system capable of performing communication functions. As used herein, a downlink (DL) refers to a wireless transmission path of signals from a base station to a terminal, and an uplink (UL) refers to a wireless transmission path of signals from the terminal to the base station. Embodiments may be described below on the basis of long term evolution (LTE), LTE-advanced (LTE-A) or 5G systems, but may also be applied to other communication systems having similar technical backgrounds or channel types. For example, such communication systems may include 5th generation mobile communication systems (e.g., 5G or new radio (NR) systems) developed after LTE-A, and 5G in the following description may be a concept including existing LTE, LTE-A, and other similar services. Furthermore, the disclosure may also be applied to other communication systems through partial modification without greatly departing from the scope of the disclosure based on the judgment of one of ordinary skill in the art.

It will be understood that blocks in flowcharts or combinations of the flowcharts may be performed by computer program instructions. Because these computer program instructions may be loaded into a processor of a general-purpose computer, special purpose computer, or other programmable data processing apparatus, the instructions, which are executed via the processor of the computer or other programmable data processing apparatus generate means for implementing the functions specified in the flowchart block(s). Because these computer program instructions may also be stored in a computer-executable or computer-readable memory that may direct a computer or other programmable data processing apparatus to function in a particular manner, the instructions stored in the computer-executable or computer-readable memory may produce an article of manufacture including instruction means that implement the functions specified in the flowchart block(s). Because the computer program instructions may also be loaded onto a computer or other programmable data processing apparatus, a series of operational steps may be performed on the computer or other programmable apparatus to produce a computer implemented process, and thus the instructions executed on the computer or other programmable apparatus may provide steps for implementing the functions specified in the flowchart block(s).

Also, each block of the flowchart illustrations may represent a module, segment, or portion of code, which includes one or more executable instructions for implementing the specified logical function(s). It should also be noted that in some alternative implementations, the functions noted in the blocks may occur out of the order shown. For example, two consecutive blocks may also be executed simultaneously or in reverse order depending on functions corresponding thereto.

As used herein, the term "unit" means a software component or hardware component such as a field-programmable gate array (FPGA) or an application-specific integrated circuit (ASIC), and performs a specific function. However, "unit" is not limited to software or hardware. The term "unit" may be configured to be in an addressable storage medium or configured to operate one or more processors. Thus, "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "units" may be combined into fewer components and "units" or further separated into additional components and "units". Further, components and "units" may be implemented to operate one or more central processing units (CPUs) in a device or a secure multimedia card. Also, a unit may include one or more processors in embodiments of the disclosure.

Wireless communication systems providing voice-based services are being developed to broadband wireless communication systems providing high-speed and high-quality packet data services according to communication standards such as high speed packet access (HSPA), LTE (or evolved universal terrestrial radio access (E-UTRA)), LTE-A, and LTE-Pro of 3GPP, high rate packet data (HRPD) and ultra mobile broadband (UMB) of 3GPP2, and 802.16e of the Institute of Electrical and Electronics Engineers (IEEE).

As a representative example of the broadband wireless communication system, the LTE system has adopted an OFDM scheme in a DL and has adopted a single carrier frequency division multiple access (SC-FDMA) scheme in an UL. The UL is a radio link through which the terminal transmits data or a control signal to the BS, and the DL is a radio link through which the BS transmits data or a control signal to the terminal. In the multiple access scheme described above, data or control information of each user may be identified by performing allocation and operation so that time-frequency resources for carrying data or control information for each user do not overlap each other, that is, orthogonality therebetween is established.

As post-LTE systems, 5G communication systems need to support services capable of simultaneously reflecting and satisfying various requirements of users, service providers, etc. The services considered for the 5G communication systems include enhanced mobile broadband (eMBB), massive machine type communication (mMTC), ultra-reliability low latency communication (URLLC), etc.

The eMBB service is aimed to provide an enhanced data rate compared to a data rate supported by LTE, LTE-A, or LTE-Pro. For example, the eMBB service in the 5G communication systems need to provide a peak data rate of 20 gigabits per second (Gbps) for a downlink and a peak data rate of 10 Gbps for an uplink in view of a single base station. At the same time, the 5G communication systems need to provide an increased user-perceived data rate. In order to satisfy such requirements, improvement of various transmitting/receiving technologies including a further improved multiple-input and multiple-output (MIMO) transmission technology is demanded. Compared to LTE systems using a transmission bandwidth of up to 20 megahertz (MHz) in a 2 gigahertz (GHz) band, the data rate required for the 5G communication systems may be satisfied by using a frequency bandwidth wider than 20 MHz in a frequency band of 3 GHz to 6 GHz or over 6 GHz.

At the same time, the mMTC service is considered for the 5G communication systems to support application services such as the Internet of things (IoT). The mMTC service is required to, for example, support massive user accesses within a cell, enhance terminal coverage, increase battery time, and reduce user charges in order to efficiently provide the IoT service. The IoT service provides a communication function by using a variety of sensors attached to various devices, and thus needs to support a large number of terminals within a cell (e.g., 1,000,000 terminals/km$^2$). In addition, because terminals supporting mMTC are likely to be located in a dead zone not covered by a cell, e.g., a basement of a building, due to service characteristics, the mMTC service may require a wider coverage compared to other services provided by the 5G communication systems. The terminals supporting mMTC need to be low-priced, and may require a very long battery life time, e.g., 10 to 15 years, because batteries are not frequently replaceable.

Lastly, the URLLC service is a cellular-based wireless communication service used in a mission-critical manner. For example, services used for remote control of robots or machinery, industrial automation, unmanned aerial vehicles, remote healthcare, and emergency alert may be considered. Thus, URLLC communication needs to provide a very low latency and a very high reliability. For example, the URLLC service needs to satisfy an air interface latency less than 0.5 milliseconds and, at the same time, requires a packet error rate equal to or less than 10-5. Therefore, for the URLLC service, 5G systems need to provide a smaller transmit time interval (TTI) compared to other services and, at the same time, may be required to allocate a wide resource in a frequency band to ensure reliability of a communication link.

The three services of 5G (i.e., eMBB, URLLC, and mMTC), may be multiplexed and provided by a single system. In order to satisfy different requirements of the services, different transmission and reception schemes and transmission/reception parameters may be used between the services. 5G is not limited to the above-described three services.

A frame structure of a 5G system is described in detail with reference to the drawings.

FIG. 1 illustrates a basic structure of a time-frequency domain, which is a radio resource domain in which a data or control channel is transmitted, in a 5G wireless communication system.

In FIG. 1, the horizontal axis indicates a time domain, and the vertical axis indicates a frequency domain. A basic unit of a resource in the time and frequency domain is a resource element (RE) (k,l) 101 and may be defined as one OFDM symbol 102 on the time axis and one subcarrier 103 on the frequency axis.

$$\left(k = N_{RB,x}^{max,\mu} N_{sc}^{RB} - 1\right) N_{sc}^{RB}$$

(e.g., 12) consecutive REs in the frequency domain may configure one resource block (RB) 104. In FIG. 1, one subframe 110 includes $$N_{symb}^{subframe,\mu}$$

symbols.

Figure 2:
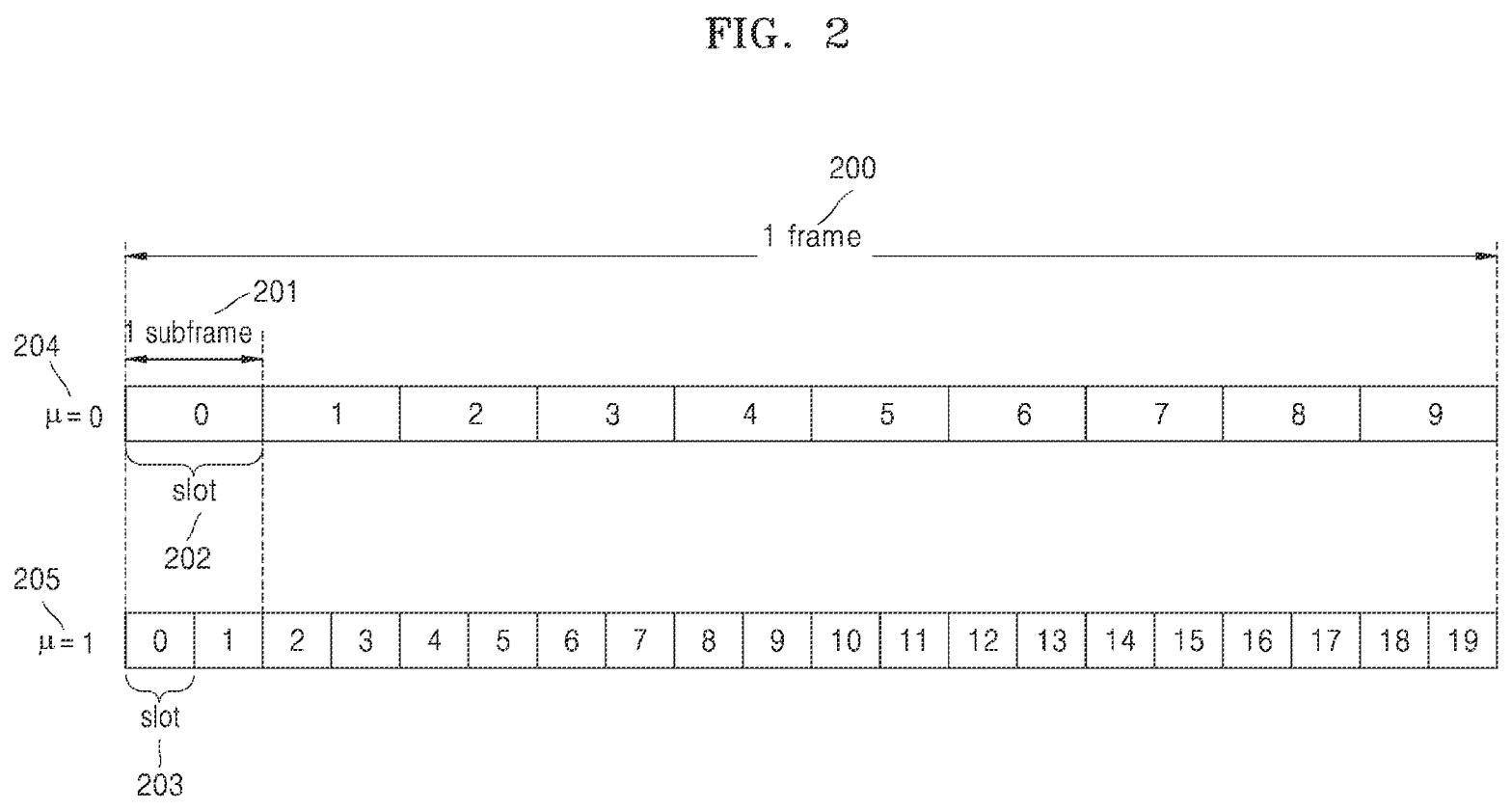

FIG. 2 illustrates an example of a slot structure used in a 5G wireless communication system.

In FIG. 2, an example of frame 200, subframe 201, and slot 202 structures are illustrated. One frame 200 may be defined as 10 ms. One subframe 201 may be defined as 1 ms, and thus, one frame 200 may include a total of 10 subframes 201. A single slot, 202 or 203, may be defined to have 14 OFDM symbols (i.e., the number of symbols per 1 slot $$\left(N_{symb}^{slot}\right) = 14).$$

The subframe 201 may include one or more slots 202 or 203, and the number of slots 202 or 203 per subframe 201 may vary depending on a subcarrier spacing value μ 204 or 205. FIG. 2 illustrates a case in which the subcarrier spacing value is μ=0 204 or μ=1 205. One subframe 201 may include one slot 202 when μ=0 204, or include two slots 203 when μ=1 205. That is, the number $$N_{slot}^{subframe,\mu}$$

of slots per one subframe may vary according to the set value u for the subcarrier spacing, and thus, the number $$N_{slot}^{frame,\mu}$$

of slots per one frame may vary.

$$N_{slot}^{subframe,\mu} \text{ and } N_{slot}^{frame,\mu}$$

according to each subcarrier spacing configuration μ may be defined as in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |

TABLE 1-continued

| μ | $N_{symb}^{slot}$ | $N_{slot}^{frame,\mu}$ | $N_{slot}^{subframe,\mu}$ |
|---|---|---|---|
| 4 | 14 | 160 | 16 |
| 5 | 14 | 320 | 32 |

A BWP configuration in a 5G communication system is described in greater detail below.

Figure 3:
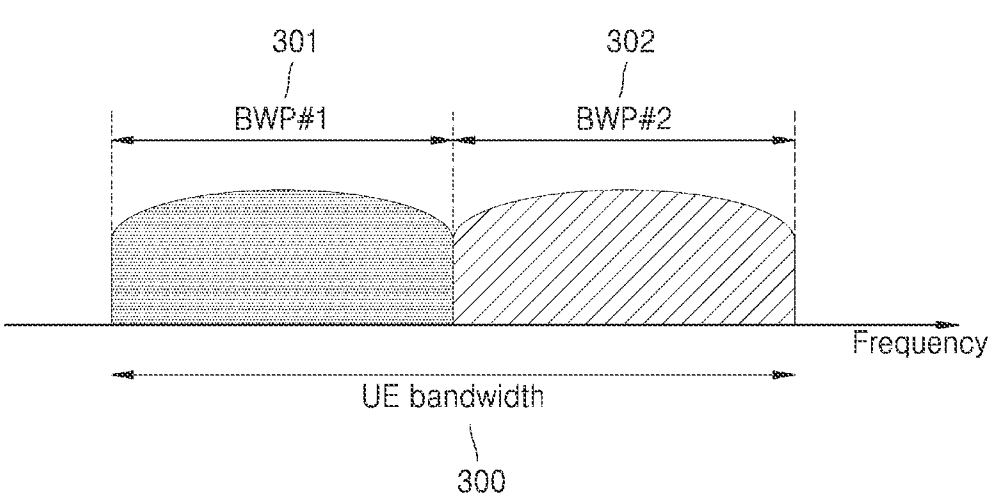
FIG. 3 illustrates an example of a configuration of a bandwidth part (BWP) of a 5G wireless communication system.

FIG. 3 illustrates an example of a configuration of a BWP of a 5G wireless communication system.

Referring to FIG. 3, a UE bandwidth 300 is configured as two BWPs, that is, BWP #1 301 and BWP #2 302. A base station may configure one or more bandwidth parts for the terminal, and may configure the following information, in Table 2, for each bandwidth part.

TABLE 2

```
BWP::=                          SEQUENCE {
  bwp-Id                                 BWP-Id,
  (bandwidth part identifier)
  locationAndBandwidth              INTEGER(1..65536),
  (bandwidth part location)
  subcarrierSpacing             ENUMERATED {n0, n1, n2, n3, n4, n5},
  cyclicPrefix                  ENUMERATED {extended}
}
```

However, the configuration of a BWP is not limited thereto, and various parameters related to a BWP in addition to the configuration information may be configured for the terminal. The BS may transmit the configuration information to the terminal through higher layer signaling, such as, for example, radio resource control (RRC) signaling. At least one BWP among the configured one or more BWPs may be activated. An indication indicating whether the configured BWP is activated may be semi-statically transmitted from the BS to the terminal through RRC signaling or may be dynamically transmitted through downlink control information (DCI).

According to an embodiment, before an RRC connection, the terminal may be configured with an initial BWP for initial access, through a master information block (MIB) from the BS. In detail, the terminal may receive, through the MIB in an initial access stage, configuration information for a search space and a control resource set (CORESET) where a physical downlink control channel (PDCCH) may be transmitted in order to receive system information (e.g., remaining system information (RMSI) or system information block 1 (SIB1)) required for initial access. An identity (ID) of a CORESET and a search space configured via the MIB may be considered as 0. The BS may notify, to the terminal, configuration information such as frequency allocation information, time allocation information, and numerology for a core resource set #0 via the MIB. Also, the BS may notify, to the terminal, configuration information for a monitoring period and an occasion for the CORESET #0, that is, configuration information for a search space #0, through the MIB. The terminal may consider a frequency domain configured as the CORESET #0 obtained from the MIB, as the initial bandwidth part for initial access. In this case, an ID of the initial bandwidth part may be considered as 0.

Configuration of a bandwidth part supported in the 5G wireless communication system may be used for various purposes.

According to an embodiment, when the bandwidth supported by the terminal is less than the system bandwidth, the configuration about the BWP may be used. For example, the BS configures a frequency location (configuration 2) of a BWP in the terminal so that the terminal transmits and receives data at a specific frequency location within the system bandwidth.

Also, the BS may configure a plurality of BWPs to the terminal for the purpose of supporting different numerologies. For example, in order to support, to a certain terminal, data transmission and reception using both a subcarrier spacing of 15 kHz and a subcarrier spacing of 30 kHz, the base station may configure two bandwidth parts with a subcarrier spacing of 15 kHz and 30 kHz, respectively. Different BWPs may be frequency division multiplexed, and when the BS is to transmit or receive data at a specific subcarrier spacing, a BWP configured as the specific subcarrier spacing may be activated.

In addition, for the purpose of reducing power consumption of the terminal, the base station may configure BWPs having different magnitudes of bandwidths to the terminal. For example, when the terminal supports a very large bandwidth, for example, a bandwidth of 100 MHz, and always transmits and receives data in the bandwidth, very high power consumption may occur. In particular, monitoring an unnecessary downlink control channel by using a large bandwidth of 100 MHz when there is no traffic may be very inefficient in terms of power consumption. In order to reduce power consumption of the terminal, the base station may configure a BWP having a relatively small bandwidth, for example, a BWP of 20 MHz, for the terminal. The terminal may perform a monitoring operation in the bandwidth part of 20 MHz when there is no traffic, and the terminal may transmit and receive data in the BWP of 100 MHz according to an indication from the base station when data is generated.

In the method of configuring the BWP, the terminals before RRC connection may receive configuration information about an initial bandwidth part through a MIB in an initial access phase. In detail, the terminal may be configured with a CORESET for a downlink control channel through which DCI for scheduling a SIB may be transmitted from an MIB of a physical broadcast channel (PBCH). A bandwidth of the control resource set configured through the MIB may be considered as an initial BWP, and the terminal may receive a physical downlink shared channel (PDSCH) via which the SIB is transmitted through the configured initial bandwidth part. The initial BWP may be used for other system information (OSI), paging, and random access as well as for reception of the SIB.

When one or more BWPs are configured for the terminal, the BS may indicate the terminal to switch a BWP by using a BWP indicator field in the DCI. For example, when a currently activated BWP of the terminal is the BWP #1 301 in FIG. 3, the BS may indicate the BWP #2 302 to the terminal through the BWP indicator in the DCI, and the terminal may switch the BWP to the BWP #2 320 indicated by the BWP indicator in the received DCI.

As described above, DCI-based BWP switch may be indicated by DCI that schedules PDSCH or PUSCH, and thus, when the terminal has received a request for switching a bandwidth part, the terminal needs to be able to perform reception or transmission of the PDSCH or PUSCH seamlessly in the switched BWP. To this end, requirements for a latency $T_{Bwp}$ required for a BWP switch are specified in a standard, and may be defined, for example, as follows in Table 3.

TABLE 3

| | NR Slot length | BWP switch delay $T_{BWP}$ (slots) | |
|---|---|---|---|
| μ | (ms) | Type 1[Note 1] | Type 2[Note 1] |
| 0 | 1 | [1] | [3] |
| 1 | 0.5 | [2] | [5] |
| 2 | 0.25 | [3] | [9] |
| 3 | 0.125 | [6] | [17] |

Note 1Depends on UE capability.
Note 2If the BWP switch involves changing of SCS, the BWP switch delay is determined by the larger one between the SCS before BWP switch and the SCS after BWP switch.

The requirements for the BWP switch latency support Type 1 and Type 2, according to a capability of the terminal. The terminal may report a supportable BWP latency type to the BS.

According to the above-described requirement for delay time of BWP switch, when the terminal receives DCI including a BWP switch indicator in slot n, the terminal may complete a switch to a new BWP indicated by the BWP switch indicator at a time point not later than slot $n+T_{BWP}$, and transmission and reception for a data channel scheduled by the corresponding DCI may be performed in the switched new BWP. When a BS is to schedule a data channel to the new BWP, the BS may determine time domain resource allocation for the data channel by considering a BWP switch latency $T_{BWP}$ of the terminal. That is, when the BS is to schedule the data channel to the new BWP, in a method of determining time domain resource allocation for the data channel, the BS may schedule the data channel after the BWP switch latency. Accordingly, the terminal may not expect that the DCI indicating the BWP switch indicates a slot offset K0 or K2 smaller than the BWP switch latency $T_{BWP}$.

When the terminal received the DCI indicating the BWP switch (e.g., a DCI format 1_1 or 0_1), the terminal may not perform any transmission or reception during a time interval from a third symbol of a slot in which a PDCCH including the DCI is received, to a starting point of a slot indicated by the slot offset K0 or K2 indicated by a time domain resource allocation indicator field in the DCI. For example, when the terminal receives the DCI indicating the BWP switch in the slot n and a slot offset value indicated in the DCI as K, the terminal may not perform any transmission or reception during a time interval from a third symbol of the slot n to a symbol before a slot n+K (that is, a last symbol of a slot n+K−1).

A synchronization signal (SS)/PBCH block in a 5G wireless communication system is described in greater detail below.

The SS/PBCH block may refer to a physical layer channel block composed of a primary SS (PSS), a secondary SS (SSS), and a PBCH, which are described below.

- PSS: a signal serving as a reference for downlink time/frequency synchronization; provides some information of cell ID.
- SSS: serves as a reference for downlink time/frequency synchronization; provides information of other cell IDs that PSS did not provide. In addition, SSS may act as a reference signal for demodulation of a PBCH.
- PBCH: provides essential system information required for transmission and reception of a data channel and a control channel of a terminal. The essential system information may include search space-related control information indicating radio resource mapping information of a control channel, scheduling control information about a separate data channel for transmitting system information, and the like.

SS/PBCH block: consists of a combination of PSS, SSS, and PBCH. One or a plurality of SS/PBCH blocks may be transmitted within 5 ms, and each transmitted SS/PBCH block may be distinguished by an index.

The terminal may detect a PSS and an SSS in an initial access stage and may decode a PBCH. An MIB may be obtained from a PBCH, and a CORESET #0 (which may correspond to a control core set with a control core set index of 0) may be configured therefrom. The terminal may perform monitoring on the CORESET #0 on the assumption that the selected SS/PBCH block and a demodulation reference signal (DMRS) transmitted in the CORESET #0 is quasi-co located (QCL). The terminal may receive system information through downlink control information transmitted in CORESET #0. The terminal may obtain random access channel (RACH)-related configuration information required for initial access from the received system information. In consideration of the selected SS/PBCH index, the terminal may transmit a physical RACH (PRACH) to the BS, and the BS receiving the PRACH may obtain information about the SS/PBCH block index selected by the terminal. The BS may know which block among each SS/PBCH blocks the terminal has selected and that the terminal monitors control resource set #0 in association with the selected SS/PBCH block.

DCI in the 5G wireless communication system is described in greater detail below.

In a 5G system, scheduling information about uplink data (or a PUSCH) or downlink data (or a PDSCH) may be transmitted through DCI from a BS to a terminal. The terminal may monitor a fallback DCI format and a non-fallback DCI format for a PUSCH or a PDSCH. The fallback DCI format may include a fixed field predefined between the BS and the terminal, and the non-fallback DCI format may include a configurable field.

The DCI may be channel-coded and modulated and then be transmitted through a PDCCH. A cyclic redundancy check (CRC) is attached to a payload of a DCI message and may be scrambled by a radio network temporary identifier (RNTI) corresponding to an identity of the terminal. Depending on the use of the DCI message, (e.g., UE-specific data transmission, power control command, random access response, or the like), different RNTIs may be used. That is, the RNTI is not explicitly transmitted but is included and transmitted in a CRC calculation process. When the DCI message transmitted on the PDCCH is received, the terminal may check the CRC by using the allocated RNTI and determine that the corresponding message is for the terminal when a result of checking the CRC is correct.

For example, DCI for scheduling a PDSCH for system information (SI) may be scrambled by a system information RNTI (SI-RNTI). DCI for scheduling a PDSCH for a random access response (RAR) message may be scrambled by a random access RNTI (RA-RNTI). DCI for scheduling a PDSCH for a paging message may be scrambled by a paging RNTI (P-RNTI). DCI for notifying a slot format indicator (SFI) may be scrambled by an SFI-RNTI. DCI for notifying transmit power control (TPC) may be scrambled by a TPC RNTI. DCI for scheduling UE-specific PDSCH or PUSCH may be scrambled by a cell RNTI (C-RNTI), a modulation coding scheme C-RNTI (MCS-C-RNTI), a configured scheduling RNTI (CS-RNTI).

A DCI format 0_0 may be used as fallback DCI for scheduling a PUSCH, and a CRC in this case may be scrambled by a C-RNTI. The DCI format 0_0 having the CRC scrambled by the C-RNTI may include, for example, information shown in Table 4 below.

TABLE 4

Identifier for DCI formats - 1 bit

The value of this bit field is always set to 0, indicating an UL DCI format

Frequency domain resource assignment $\lceil \log_2(N_{RB}^{UL,BWP}(N_{RB}^{UL,BWP}+1)/2 \rceil$ bits where $N_{RB}^{UL,BWP}$ is defined in subclause 7.3.1.0

For PUSCH hopping with resource allocation type 1:

$N_{UL\_hop}$ MSB bits are used to indicate the frequency offset according to Subclause 6.3 of [6, TS 38.214], where $N_{UL\_hop} = 1$ if the higher layer parameter frequencyHoppingOffsetLists contains two offset values and $N_{UL\_hop} = 2$ if the higher layer parameter frequencyHoppingOffsetLists contains four offset values $\lceil \log_2(N_{RB}^{UL,BWP}(N_{RB}^{UL,BWP}+1)/2 \rceil - N_{UL\_hop}$ bits provides the frequency domain resource allocation according to Subclause 6.1.2.2.2 of [6, TS 38.214]

For non-PUSCH hopping with resource allocation type 1:

$\lceil \log_2(N_{RB}^{UL,BWP}(N_{RB}^{UL,BWP}+1)/2 \rceil$ bits provides the frequency domain resource allocation according to Subclause 6.1.2.2.2 of [6, TS 38.214]

Time domain resource assignment - 4 bits as defined in Subclause 6.1.2.1 of [6, TS 38.214]

Frequency hopping flag - 1 bit according to Table 7.3.1.1.1-3, as defined in Subclause 6.3 of [6, TS 38.214]

Modulation and coding scheme - 5 bits as defined in Subclause 6.1.4.1 of [6, TS 38.214]

New data indicator - 1 bit

Redundancy version - 2 bits as defined in Table 7.3.1.1.1-2

HARQ process number (HARQ) - 4 bits

TPC command for scheduled PUSCH (transmission power control for scheduled

TABLE 4-continued

PUSCH) - 2 bits as defined in Subclause 7.1.1 of [5, TS 38.213]
Padding bits, if required.
UL/SUL indicator (uplink/supplementary uplink (UL) indicator ) - 1 bit for UEs configured with supplementaryUplink in ServingCellConfig in the cell as defined in Table 7.3.1.1.1-1 and the number of bits for DCI format 1_0 before padding is larger than the number of bits for DCI format 0_0 before padding; 0 bit otherwise.
The UL/SUL indicator, if present, locates in the last bit position of DCI format 0_0, after the padding bit(s).
If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured;
If the UL/SUL indicator is not present in DCI format 0_0 and pucch-Config is configured, the corresponding PUSCH scheduled by the DCI format 0_0 is for the UL or SUL for which higher layer parameter pusch-Config is configured.
If the UL/SUL indicator is not present in DCI format 0_0 and pucch-Config is not configured, the corresponding PUSCH scheduled by the DCI format 0_0 is for the uplink on which the latest PRACH is transmitted.

A DCI format 0_1 may be used as non-fallback DCI for scheduling a PUSCH, and a CRC in this case may be scrambled by a C-RNTI. The DCI format 0_1 having the CRC scrambled by the C-RNTI may include, for example, information shown in Table 5 below.

TABLE 5

Identifier for DCI formats - 1 bit
The value of this bit field is always set to 0, indicating an UL DCI format
Carrier indicator - 0 or 3 bits, as defined in Clause 10.1 of [5, TS38.213].
UL/SUL indicator - 0 bit for UEs not configured with supplementaryUplink in ServingCellConfig in the cell or UEs configured with supplementaryUplink in ServingCellConfig in the cell but only one carrier in the cell is configured for PUSCH transmission; otherwise, 1 bit as defined in Table 7.3.1.1.1-1.
Bandwidth part indicator - 0, 1 or 2 bits as determined by the number of UL BWPs $n_{BWP,RRC}$ configured by higher layers, excluding the initial UL bandwidth part. The bitwidth for this field is determined as $\lceil \log_2(n_{BWP}) \rceil$ bits, where
$n_{BWP} = n_{BWP,RRC} + 1$ if $n_{BWP,RRC} \leq 3$, in which case the bandwidth part indicator is equivalent to the ascending order of the higher layer parameter BWP-Id;
otherwise $n_{BWP} = n_{BWP,RRC}$, in which case the bandwidth part indicator is defined in Table 7.3.1.1.2-1;
If a UE does not support active BWP change via DCI, the UE ignores this bit field.

Frequency domain resource assignment - number of bits determined by the following, where $N_{RB}^{UL,BWP}$ is the size of the active UL bandwidth part:
$N_{RBG}$ bits if only resource allocation type 0 is configured, where $N_{RBG}$ is defined in Clause 6.1.2.2.1 of [6, TS 38.214], $\lceil \log_2(N_{RB}^{UL,BWP}(N_{RB}^{UL,BWP}+1)/2 \rceil$ bits if only resource allocation type 1 is configured, or $\max(\lceil \log_2(N_{RB}^{UL,BWP}(N_{RB}^{UL,BWP}+1)/2 \rceil, N_{RBG}) + 1$ bits if both resource allocation type 0 and 1 are configured.
If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
For resource allocation type 0, the $N_{RBG}$ LSBs provide the resource allocation as defined in Clause 6.1.2.2.1 of [6, TS 38.214].

For resource allocation type 1, the $\lceil \log_2(N_{RB}^{UL,BWP}(N_{RB}^{UL,BWP}+1)/2) \rceil$ $LSBs$ provide the resource allocation as follows:
For PUSCH hopping with resource allocation type 1:
$N_{UL\_hop}$ MSB bits are used to indicate the frequency offset according to Subclause 6.3 of [6, TS 38.214], where $N_{UL\_hop} = 1$ if the higher layer parameter frequency HoppingOffsetLists contains two offset values and $N_{UL\_hop} = 2$ if the higher layer parameter frequencyHoppingOffsetLists contains four offset values $\lceil \log_2(N_{RB}^{UL,BWP}(N_{RB}^{UL,BWP}+1)/2) \rceil - N_{UL\_hop}$ bits provides the frequency domain resource allocation according to Clause 6.1.2.2.2 of [6, TS 38.214]

TABLE 5-continued

For non-PUSCH hopping with resource allocation type 1:

$\lceil \log_2(N_{RB}^{UL,BWP}(N_{RB}^{UL,BWP}+1)/2) \rceil$ bits provides the frequency domain resource allocation according to Subclause 6.1.2.2.2 of [6, TS 38.214]

If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.

Time domain resource assignment - 0, 1, 2, 3, or 4 bits as defined in Clause 6.1.2.1 of [6, TS38.214]. The bitwidth for this field is determined as $\lceil \log_2(I) \rceil$ bits, where I is the number of entries in the higher layer parameter pusch-TimeDomainAllocationList if the higher layer parameter is configured; otherwise I is the number of entries in the default table.

Frequency hopping flag - 0 or 1 bit:

0 bit if only resource allocation type 0 is configured, or if the higher layer parameter frequencyHopping is not configured;

1 bit according to Table 7.3.1.1.1-3 otherwise, only applicable to resource allocation type 1, as defined in Subclause 6.3 of [6, TS 38.214].

Modulation and coding scheme - 5 bits as defined in Subclause 6.1.4.1 of [6, TS 38.214]

New data indicator - 1 bit

Redundancy version - 2 bits as defined in Table 7.3.1.1.1-2

HARQ process number - 4 bits $1^{st}$ downlink assignment index - 1 or 2 bits:

1 bit for semi-static HARQ-ACK codebook;

2 bits for dynamic HARQ-ACK codebook;

$2^{nd}$ downlink assignment index - 0 or 2 bits:

2 bits for dynamic HARQ-ACK codebook with two HARQ-ACK sub-codebooks;

0 bit otherwise.

TPC command for scheduled PUSCH 2 bits as defined in Subclause 7.1.1 of [5, TS38.213]

SRS resource indicator (Sound reference signal (SRS) resource indicator) -

$\left\lceil \log_2\left(\sum_{k=1}^{min\{LSRS_{max}\{\}\}\Sigma}\binom{N_{SRS}}{k}\right)\right\rceil$ or $\lceil \log_2(N_{SRS}) \rceil$ bits, where $N_{SRS}$ is the number of configured SRS resources in the SRS resource set associated with the higher layer parameter usage of value 'codeBook' or 'nonCodeBook', $\left\lceil \log_2\left(\sum_{k=1}^{min\{LSRS_{max}\{\}\}\Sigma}\binom{N_{SRS}}{k}\right)\right\rceil$ bits according to Tables 7.3.1.1.2-28/29/30/31 if the higher layer parameter txConfig = nonCodebook, whereNSRS is the number of configured SRS resources in the SRS resource set associated with the higher layer parameter usage of value 'nonCodeBook' and if UE supports operation with maxMIMO-Layers and the higher layer parameter maxMIMO-Layers of PUSCH-ServingCellConfig of the serving cell is configured, $L_{max}$ is given by that parameter otherwise, $L_{max}$ is given by the maximum number of layers for PUSCH supported by the UE for the serving cell for non-codebook based operation.

$\lceil \log_2(N_{SRS}) \rceil$ bits according to Tables 7.3.1.1.2-32 if the higher layer parameter txConfig = codebook, where $N_{SRS}$ is the number of configured SRS resources in the SRS resource set associated with the higher layer parameter usage of value 'codeBook'.

Precoding information and number of layers - number of bits determined by the following:

0 bits if the higher layer parameter txConfig = nonCodeBook;

0 bits for 1 antenna port and if the higher layer parameter txConfig = codebook;

4, 5, or 6 bits according to Table 7.3.1.1.2-2 for 4 antenna ports, if txConfig - codebook, and according to whether transform precoder is enabled or disabled, and the values of higher layer parameters maxRank, and codebookSubset;

2, 4, or 5 bits according to Table 7.3.1.1.2-3 for 4 antenna ports, if txConfig = codebook, and according to whether transform precoder is enabled or disabled, and the values of higher layer parameters maxRank, and codebookSubset;

2 or 4 bits according to Table7.3.1.1.2-4 for 2 antenna ports, if txConfig = codebook, and according to whether transform precoder is enabled or disabled, and the values of higher layer parameters maxRank and codebookSubset;

1 or 3 bits according to Table7.3.1.1.2-5 for 2 antenna ports, if txConfig = codebook, and according to whether transform precoder is enabled or disabled, and the values of higher layer parameters maxRank and codebookSubset.

Antenna ports - number of bits determined by the following 2 bits as defined by Tables 7.3.1.1.2-6, if transform precoder is enabled, dmrs-Type = 1, and maxLength = 1;

4 bits as defined by Tables 7.3.1.1.2-7, if transform precoder is enabled, dmrs-Type = 1, and maxLength = 2;

3 bits as defined by Tables 7.3.1.1.2-8/9/10/11, if transform precoder is disabled, dmrs-Type = 1, and maxLength = 1, and the value of the rank is determined according to the SRS resource indicator field if the higher layer parameter txConfig = nonCodebook and according to the Precoding information and number of layers field if the higher layer parameter txConfig = codebook;

4 bits as defined by Tables 7.3.1.1.2-12/13/14/15, if transform precoder is disabled, dmrs-Type = 1, TABLE 5-continued and maxLength = 2, and the value of the rank is determined according to the SRS resource indicator field if the higher layer parameter txConfig = nonCodebook and according to the Precoding information and number of layers field if the higher layer parameter txConfig = codebook;
4 bits as defined by Tables 7.3.1.1.2-16/17/18/19, if transform precoder is disabled, dmrs-Type = 2, and maxLength = 1, and the value of the rank is determined according to the SRS resource indicator field if the higher layer parameter txConfig = nonCodebook and according to the Precoding information and number of layers field if the higher layer parameter txConfig = codebook;
5 bits as defined by Tables 7.3.1.1.2-20/21/22/23, if transform precoder is disabled, dmrs-Type = 2, and maxLength = 2, and the value of the rank is determined according to the SRS resource indicator field if the higher layer parameter txConfig = nonCodebook and according to the Precoding information and number of layers field if the higher layer parameter txConfig = codebook.
where the number of CDM groups without data of values 1, 2, and 3 in Tables 7.3.1.1.2-6 to 7.3.1.1.2-23 refers to CDM groups {0}, {0, 1}, and {0, 1, 2} respectively.
If a UE is configured with both dmrs-UplinkForPUSCH-MappingTypeA and dmrs-UplinkForPUSCH-MappingTypeB, the bitwidth of this field equals max{$x_A$, $x_B$}, where $x_A$ is the "Antenna ports" bitwidth derived according to dmrs-UplinkForPUSCH-MappingTypeA and $x_B$ is the "Antenna ports" bitwidth derived according to dmrs-UplinkForPUSCH-MappingTypeB. A number of $|x_A - x_B|$ zeros are padded in the MSB of this field, if the mapping type of the PUSCH corresponds to the smaller value of $x_A$ and $x_B$.
SRS request - 2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Clause 6.1.1.2 of [6, TS 38.214].
CSI request (channel state information (CSI) request) - 0, 1, 2, 3, 4, 5, or 6 bits determined by higher layer parameter reportTriggerSize.
CBG transmission information (CBGTI) (code block group (CBG) transmission information)
0 bit if higher layer parameter codeBlockGroupTransmission for PDSCH is not configured, otherwise, 2, 4, 6, or 8 bits determined by higher layer parameter maxCodeBlockGroupsPerTransportBlock for PUSCH.
PTRS-DMRS association (phase tracking reference signal - demodulation reference signal association) - number of bits determined as follows
0 bit if PTRS-UplinkConfig is not configured and transform precoder is disabled, or if transform precoder is enabled, or if maxRank = 1;
2 bits otherwise, where Table 7.3.1.1.2-25 and 7.3.1.1.2-26 are used to indicate the association between PTRS port(s) and DMRS port(s) for transmission of one PT-RS port and two PT-RS ports respectively, and the DMRS ports are indicated by the Antenna ports field.
If "Bandwidth part indicator" field indicates a bandwidth part other than the active bandwidth part and the "PTRS-DMRS association" field is present for the indicated bandwidth part but not present for the active bandwidth part, the UE assumes the "PTRS-DMRS association" field is not present for the indicated bandwidth part.
beta_offset indicator - 0 if the higher layer parameter betaOffsets = semiStatic; otherwise 2 bits as defined by Table 9.3-3 in [5, TS 38.213].
DMRS sequence initialization (demodulation reference signal (DMRS) sequence initialization) - 0 bit if transform precoder is enabled; 1 bit if transform precoder is disabled.
UL-SCH indicator (uplink-data channel (UL-SCH) indicator) - 1 bit. A value of "1" indicates UL-SCH shall be transmitted on the PUSCH and a value of "0" indicates UL-SCH shall not be transmitted on the PUSCH. Except for DCI format 0_1 with CRC scrambled by SP-CSI-RNTI, a UE is not expected to receive a DCI format 0_1 with UL-SCH indicator of "0" and CSI request of all zero(s).

A DCI format 1_0 may be used as fallback DCI for scheduling a PDSCH, and a CRC in this case may be scrambled by a C-RNTI. The DCI format 1_0 having the CRC scrambled by the C-RNTI may include, for example, information shown in Table 6 below.

TABLE 6

Identifier for DCI formats - 1 bits
The value of this bit field is always set to 1, indicating a DL DCI format Frequency domain resource assignment - $\lceil \log_2(N_{RB}^{DL,BWP}(N_{RB}^{DL,BWP}+1)/2) \rceil$ bits where $N_{RB}^{DL,BWP}$ is given by Clause 7.3.1.0
If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows:
Random Access Preamble index - 6 bits according to ra-PreambleIndex in Subclause 5.1.2 of [8, TS38.321]
UL/SUL indicator - 1 bit. If the value of the "Random Access Preamble index" is not all zeros and if the UE is configured with supplementaryUplink in ServingCellConfig in the cell, this field indicates which UL carrier in the cell to transmit the PRACH according to Table 7.3.1.1.1-1; otherwise, this field is reserved.

TABLE 6-continued

SS/PBCH index (synchronization signal (SS)/broadcast channel) (Physical Broadcast Channel; PBCH)index) - 6 bits. If the value of the "Random Access Preamble index" is not all zeros, this field indicates the SS/PBCH that shall be used to determine the RACH occasion for the PRACH transmission; otherwise, this field is reserved.

PRACH Mask index (physical random access channel (PRACH) mask index)

4 bits. If the value of the "Random Access Preamble index" is not all zeros, this field indicates the RACH occasion associated with the SS/PBCH indicated by "SS/PBCH index" for the PRACH transmission, according to Subclause 5.1.1 of [8, TS38.321]; otherwise, this field is reserved Reserved bits - 10 bits Otherwise, all remaining fields are set as follows:

Time domain resource assignment - 4 bits as defined in Subclause 5.1.2.1 of [6, TS 38.214]

VRB-to-PRB mapping (virtual resource block-to-physical resource block mapping)

1 bit according to Table 7.3.1.2.2-5

Modulation and coding scheme - 5 bits as defined in Subclause 5.1.3 of [6, TS 38.214]

New data indicator - 1 bit

Redundancy version - 2 bits as defined in Table 7.3.1.1.1-2

HARQ process number - 4 bits

Downlink assignment index - 2 bits as defined in Clause 9.1.3 of [5, TS 38.213], as counter DAI TPC command for scheduled PUCCH (transmission power control command for scheduled PUCCH) - 2 bits as defined in Subclause 7.2.1 of [5, TS 38.213]

PUCCH resource indicator - 3 bits as defined in Subclause 9.2.3 of [5, TS 38.213]

PDSCH-to-HARQ_feedback timing indicator - 3 bits as defined in Subclause 9.2.3 of [5, TS38.213]

A DCI format 1_1 may be used as non-fallback DCI for scheduling a PDSCH, and a CRC in this case may be scrambled by a C-RNTI. The DCI format 1_1 having the CRC scrambled by the C-RNTI may include, for example, information shown in Table 7 below.

TABLE 7

Identifier for DCI formats - 1 bits

The value of this bit field is always set to 1, indicating a DL DCI format

Carrier indicator - 0 or 3 bits as defined in Subclause 10.1 of [5, TS 38.213].

Bandwidth part indicator - 0, 1 or 2 bits as determined by the number of DL BWPs $n_{BWP,RRC}$ configured by higher layers, excluding the initial DL bandwidth part. The bitwidth for this field is determined as $\lceil \log_2(n_{BWP}) \rceil$ bits, where $n_{BWP} = n_{BWP,RRC} + 1$ if $n_{BWP,RRC} \leq 3$, in which case the bandwidth part indicator is equivalent to the ascending order of the higher layer parameter BWP-Id;

otherwise $n_{BWP} = n_{BWP,RRC}$, in which case the bandwidth part indicator is defined in Table 7.3.1.1.2-1;

If a UE does not support active BWP change via DCI, the UE ignores this bit field.

Frequency domain resource assignment - number of bits determined by the following, where $N_{RB}^{DL,BWP}$ is the size of the active DL bandwidth part:

$N_{RBG}$ bits if only resource allocation type 0 is configured, where $N_{RBG}$ is defined in Clause 5.1.2.2.1 of [6, TS38.214], $\lceil \log_2(N_{RB}^{DL,BWP}(N_{RB}^{DL,BWP}+1)/2) \rceil$ bits if only resource allocation type 1 is configured, or $\max(\lceil \log_2(N_{RB}^{DL,BWP}(N_{RB}^{DL,BWP}+1)/2) \rceil, N_{RBG}) + 1$ bits if both resource allocation type 0 and 1 are configured.

If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.

For resource allocation type 0, theNRBG LSBs provide the resource allocation as defined in Subclause 5.1.2.2.1 of [6, TS 38.214].

For resource allocation type 1, the $\lceil \log_2(N_{RB}^{DL,BWP}(N_{RB}^{DL,BWP}+1)/2) \rceil$ LSBs provide the resource allocation as defined in Subclause 5.1.2.2.2 of [6, TS 38.214]

If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.

Time domain resource assignment - 0, 1, 2, 3, or 4 bits as defined in Subclause 5.1.2.1 of [6, TS 38.214]. The bitwidth for this field is determined as $\lceil \log_2(I) \rceil$ bits, where I is the number of entries in the higher layer parameter pdsch-TimeDomainAllocationList if the higher layer parameter is configured; otherwise I is the number of entries in the default table.

TABLE 7-continued

VRB-to-PRB mapping (virtual resource block-to-physical resource block mapping)
0 or 1 bit:
0 bit if only resource allocation type 0 is configured or if interleaved VRB-to-PRB mapping is not configured by high layers;
1 bit according to Table 7.3.1.2.2-5 otherwise, only applicable to resource allocation type 1, as defined in Clause 7.3.1.6 of [4, TS 38.211].
PRB bundling size indicator - 0 bit if the higher layer parameter prb-BundlingType is not configured or is set to 'staticBundling', or 1 bit if the higher layer parameter prb-BundlingType is set to 'dynamicBundling' according to Clause 5.1.2.3 of [6, TS 38.214].
Rate matching indicator - 0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups.
ZP CSI-RS trigger (zero power channel state information reference signal trigger) - 0, 1, or 2 bits as defined in Subclause 5.1.4.2 of [6, TS 38.214]. The bitwidth for this field is determined as $\lceil \log_2(n_{ZP} + 1) \rceil$ bits, where $n_{ZP}$ is the number of aperiodic ZP CSI-RS resource sets configured by higher layer.
For transport block 1 (first transport block):
Modulation and coding scheme - 5 bits as defined in Subclause 5.1.3.1 of [6, TS 38.214]
New data indicator - 1 bit
Redundancy version - 2 bits as defined in Table 7.3.1.1.1-2
For transport block 2 (only present if maxNrofCodeWordsScheduledByDCI equals 2) (second transport block):
Modulation and coding scheme - 5 bits as defined in Subclause 5.1.3.1 of [6, TS 38.214]
New data indicator - 1 bit
Redundancy version - 2 bits as defined in Table 7.3.1.1.1-2
If "Bandwidth part indicator" field indicates a bandwidth part other than the active bandwidth part and the value of maxNrofCodeWordsScheduledByDCI for the indicated bandwidth part equals 2 and the value of maxNrofCodeWordsScheduledByDCI for the active bandwidth part equals 1, the UE assumes zeros are padded when interpreting the "Modulation and coding scheme", "New data indicator", and "Redundancy version" fields of transport block 2 according to Clause 12 of [5, TS38.213], and the UE ignores the "Modulation and coding scheme", "New data indicator", and "Redundancy version" fields of transport block 2 for the indicated bandwidth part.
HARQ process number - 4 bits
Downlink assignment index - number of bits as defined in the following
4 bits if more than one serving cell are configured in the DL and the higher layer parameter pdsch-HARQ-ACK-Codebook = dynamic, where the 2 MSB bits are the counter DAI and the 2 LSB bits are the total DAI;
2 bits if only one serving cell is configured in the DL and the higher layer parameter pdsch-HARQ-ACK-Codebook = dynamic, where the 2 bits are the counter DAI;
0 bits otherwise.
TPC command for scheduled PUCCH
2 bits as defined in Subclause 7.2.1 of [5, TS 38.213]
PUCCH resource indicator - 3 bits as defined in Subclause 9.2.3 of [5, TS 38.213]
PDSCH-to-HARQ_feedback timing indicator (PDSCH-to-HARQ timing indicator)- 0, 1, 2, or 3 bits as defined in Clause 9.2.3 of [5, TS 38.213]. The bitwidth for this field is determined as $\lceil \log_2(I) \rceil$ bits, where I is the number of entries in the higher layer parameter dl-DataToUL-ACK.
Antenna port(s) - 4, 5 or 6 bits as defined by Tables 7.3.1.2.2-1/2/3/4, where the number of CDM groups without data of values 1, 2, and 3 refers to CDM groups {0}, {0, 1}, and {0, 1, 2} respectively. The antenna ports $\{p_0, \ldots, p_{\nu-1}\}$] shall be determined according to the ordering of DMRS port(s) given by Tables 7.3.1.2.2-1/2/3/4.
If a UE is configured with both dmrs-DownlinkForPDSCH-MappingTypeA and dmrs-DownlinkForPDSCH-MappingTypeB, the bitwidth of this field equals $\max\{x_A, x_B\}$, where $x_A$ is the "Antenna ports" bitwidth derived according to dmrs-DownlinkForPDSCH-MappingTypeA and $x_B$ is the "Antenna ports" bitwidth derived according to dmrs-DownlinkForPDSCH-MappingTypeB. A number of $|x_A - x_B|$ zeros are padded in the MSB of this field, if the mapping type of the PDSCH corresponds to the smaller value of $x_A$ and $x_B$.
Transmission configuration indication - 0 bit if higher layer parameter tci-PresentInDCI is not enabled; otherwise 3 bits as defined in Clause 5.1.5 of [6, TS38.214].
If "Bandwidth part indicator" field indicates a bandwidth part other than the active bandwidth part,
if the higher layer parameter tci-PresentInDCI is not enabled for the CORESET used for the PDCCH carrying the DCI format 1_1,
the UE assumes tci-PresentInDCI is not enabled for all CORESETs in the indicated bandwidth part;
otherwise,
the UE assumes tci-PresentInDCI is enabled for all CORESETs in the indicated bandwidth part.
SRS request - 2 bits as defined by Table 7.3.1.1.2-24 for UEs not configured with supplementaryUplink in ServingCellConfig in the cell; 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].
CBG transmission information (CBGTI) (code block group transmission information) - 0 bit if higher layer parameter codeBlockGroupTransmission for PDSCH is not configured, otherwise, 2, 4, 6, or 8 bits as defined in Subclause 5.1.7 of [6, TS38.214], determined by the higher layer parameters maxCodeBlockGroupsPerTransportBlock and maxNrofCodeWordsScheduledByDCI for the PDSCH.
CBG flushing out information (CBGFI) (code block group flushing out information)- 1 bit if higher layer parameter codeBlockGroupFlushIndicator is configured as "TRUE", 0 bit otherwise.
DMRS sequence initialization (demodulation reference signal sequence initialization) - 1 bit.

A time domain resource allocation method for a data channel in a 5G wireless communication system is described in detail below.

A BS may configure, for a terminal, a table regarding time domain resource allocation information for a PDSCH and a PUSCH, via higher layer signaling (e.g., RRC signaling). For the PDSCH, a table consisting of up to maxNrofDL-Allocations=16 entries may be configured, and for the PUSCH, a table consisting of up to maxNrofUL-Allocations=16 entries may be configured. The time domain resource allocation information may include, for example, a PDCCH-to-PDSCH slot timing (corresponds to a time interval in a slot unit between a time point when the PDCCH is received and a time point when the PDSCH scheduled by the received PDCCH is transmitted; indicated by K0), or a PDCCH-to-PUSCH slot timing (corresponds to a time interval in a slot unit between a time point when the PDCCH is received and a time point when the PUSCH scheduled by the received PDCCH is transmitted; indicated by K2), information about a location and length of a start symbol where the PDSCH or PUSCH is scheduled within a slot, and a mapping type of the PDSCH or PUSCH. For example, a plurality of pieces of information, as shown in Table 8 and Table 9, may be notified by the base station to the terminal.

TABLE 8

PDSCH-TimeDomainResourceAllocationList information element

```
PDSCH-TimeDomainResourceAllocationList ::= SEQUENCE (SIZE(1..maxNrofDL-Allocations)) OF PDSCH-
TimeDomainResourceAllocation
PDSCH-TimeDomainResourceAllocation ::= SEQUENCE {
  k0                                  INTEGER(0..32)
OPTIONAL, -- Need S
  (PDCCH-to-PDSCH timing slot unit)
  mappingType                         ENUMERATED {typcA, typeB},
  (PDSCH mapping type)
  startSymbolAndLength                INTEGER (0..127)
  (start symbol and length of PDSCH)
}
```

TABLE 9

PUSCH-TimeDomainResourceAllocation information element

```
PUSCH-TimeDomainResourceAllocationList ::= SEQUENCE (SIZE(1..maxNrofUL-Allocations)) OF PUSCH-
TimeDomainResourceAllocation
PUSCH-TimeDomainResourceAllocation ::= SEQUENCE {
  K2                                  INTEGER(0..32)
OPTIONAL, -- Need S
  (PDCCH-to-PUSCH timing slot unit)
  mappingType                         ENUMERATED {typeA, typeB},
  (PUSCH mapping type)
  startSymbolAndLength                INTEGER (0..127)
  (start symbol and length of PUSCH)
}
```

The BS may notify the terminal of one of the entries in the table of the time domain resource allocation information, via L1 signaling, such as, for example, DCI (e.g., indicated via a 'time domain resource allocation' field within DCI). The terminal may obtain the time domain resource allocation information for the PDSCH or PUSCH, based on the DCI received from the base station.

A frequency domain resource allocation method for a data channel in a 5G wireless communication system is described in greater detail below.

In the 5G wireless communication system, two resource allocation types, (i.e., a resource allocation type 0 and a resource allocation type 1), are supported as a method of indicating frequency domain resource allocation information for a PDSCH and a PUSCH.

Resource Allocation Type 0

RB allocation information may be notified from a base station to a terminal in a form of a bitmap for a resource block group (RBG). Here, the RBG may consist of a set of consecutive virtual RBs (VRBs), and a size P of the RBG may be determined based on a value configured in a higher layer parameter rbg-Size and a size value of a bandwidth part defined in Table 10 below.

TABLE 10

| Nominal RBG size P | | |
|---|---|---|
| Bandwidth Part Size | Configuration 1 | Configuration 2 |
| 1-36 | 2 | 4 |
| 37-72 | 4 | 8 |
| 73-144 | 8 | 16 |
| 145-275 | 16 | 16 |

Total number of RBGs ($N_{RBG}$) of a bandwidth part i having a size of $$N_{BWP,i}^{size}$$

may be defined in Equation (1) below $$N_{RBG} = \lceil N_{BWP,i}^{size} + (N_{BWP,i}^{start} \bmod P))/P \rceil \quad (1)$$

where the size of the first RBG is $$RBG_0^{size} = P - N_{BWP,i}^{start} \bmod P,$$

the size of last RBG is $$RBG_{last}^{size} = (N_{BWP,i}^{start} + N_{BWP,i}^{size}) \bmod P \text{ if } (N_{BWP,i}^{start} + N_{BWP,i}^{size}) \bmod P > 0$$

and P otherwise, the size of all other RBGs is P.

Each bit of a bitmap having a $N_{RBG}$ bit size may correspond to the RBG. The RBGs may be assigned with indexes in an increasing order of a frequency from a lowest frequency of a bandwidth part. Regarding the $N_{RBG}$ RBGs within the bandwidth part, RBG #0 to RBG #($N_{RBG}$−1) may be mapped from a most significant bit (MSB) to a least significant bit (LSB) of an RBG bitmap. When a certain bit value in the bitmap is 1, the terminal may determine that an RBG corresponding to the bit value is allocated, and when a certain bit value in the bitmap is 0, the terminal may determine that an RBG corresponding to the certain bit value is not allocated.

Resource Allocation Type 1

RB allocation information may be notified from the BS to the terminal via information about a start location and length of consecutively allocated VRBs. Here, interleaving or non-interleaving may be additionally applied to the consecutively allocated VRBs. A resource allocation field of the resource allocation type 1 may include a resource indication value (RIV), and the RIV may include a start point ($RB_{start}$) of a VRB and a length ($L_{RBs}$) of consecutively assigned RBs. In detail, the RIV within a bandwidth part having the size of $$N_{BWP}^{size}$$

may be defined as below.

■ if $(L_{RBs} - 1) \leq \lfloor N_{BWP}^{size}/2 \rfloor$ then

◆ $RIV = N_{BWP}^{size}(L_{RBs} - 1) + RB_{start}$

■ else

◆ $RIV = N_{BWP}^{size}(N_{BWP}^{size} - L_{RBS} + 1) + (N_{BWP}^{size} - 1 - RB_{start})$ ■ where $L_{RBs} \geq 1$ and shall not exceed $N_{BWP}^{size} - RB_{start}$ The BS may configure for the terminal a resource allocation type via higher layer signaling (e.g., a higher layer parameter resourceAllocaiton may be configured with one of values among resourceAllocationType0 or resourceAllocationType1). When the terminal is configured with both resource allocation type 0 and 1 (or when the higher layer parameter resourceAllocation is configured with dynamicSwitch), the BS may indicate whether a bit corresponding to a most significant bit (MSB) of a field indicating resource allocation in a DCI format indicating scheduling is resource allocation type 0 or resource allocation type 1. In addition, resource allocation information may be indicated through the remaining bits except for the bit corresponding to the MSB, based on the indicated resource allocation type, and the terminal may interpret the resource allocation field information of the DCI field based on the resource allocation information. When the terminal is configured with one of resource allocation type 0 or resource allocation type 1 (or when the higher layer parameter resourceAllocation is equally configured with one of the values among resourceAllocationType0 or resourceAllocationType1), resource allocation information may be indicated based on the resource allocation type in which a field for indicating resource allocation in the DCI format indicating scheduling is configured, and the terminal may interpret the resource allocation field information based on the resource allocation information.

A modulation and coding scheme (MCS) used in a 5G wireless communication system is described in greater detail below.

In 5G, a plurality of MCS index tables are defined for PDSCH and PUSCH scheduling. Which MCS table the terminal is to assume among the plurality of MCS tables may be configured or indicated through higher layer signaling or L1 signaling from the BS to the terminal, or an RNTI value assumed by the terminal during PDCCH decoding.

An example of MCS index table 1 for PDSCH and CP-OFDM-based PUSCH (or PUSCH without transform precoding) is shown in Table 11 below.

TABLE 11

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3:3223 |

TABLE 11-continued

| MCS Index $I_{MCS}$ | Modulation Order $Q_m$ | Target code Rate R × [1024] | Spectral efficiency |
|---|---|---|---|
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

An example of MCS index table 2 for PDSCH and CP-OFDM-based PUSCH (or PUSCH without transform precoding) is shown in Table 12 below.

TABLE 12

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

An example of MCS index table 3 for PDSCH and CP-OFDM-based PUSCH (or PUSCH without transform precoding) is shown in Table 13 below.

TABLE 13

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |

TABLE 13-continued

| MCS Index $I_{MCS}$ | Modulation Order $Q_m$ | Target code Rate R × [1024] | Spectral efficiency |
|---|---|---|---|
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

An example of MCS index table 1 for DFT-s-OFDM-based PUSCH (or PUSCH without transform precoding) is shown in Table 14 below.

TABLE 14

| MCS Index $I_{MCS}$ | Modulation Order $Q_m$ | Target code Rate R × 1024 | Spectral efficiency |
|---|---|---|---|
| 0 | q | 240/q | 0.2344 |
| 1 | q | 314/q | 0.3077 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

An example of MCS index table 2 for DFT-s-OFDM-based PUSCH (or PUSCH without transform precoding) is shown in Table 15 below.

TABLE 15

| MCS Index $I_{MCS}$ | Modulation Order $Q_m$ | Target code Rate R × 1024 | Spectral efficiency |
|---|---|---|---|
| 0 | q | 60/q | 0.0586 |
| 1 | q | 80/q | 0.0781 |
| 2 | q | 100/g | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | reserved | |
| 29 | 2 | reserved | |
| 30 | 4 | reserved | |
| 31 | 6 | reserved | |

An example of the MCS index table for PUSCH to which transform precoding (transform precoding or Discrete Fourier Transform (DFT) precoding) and 64 QAM is applied is shown in Table 16 below.

TABLE 16

| MCS Index $I_{MCS}$ | Modulation Order $Q_m$ | Target code Rate R × 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |

TABLE 16-continued

| MCS Index $I_{MCS}$ | Modulation Order $Q_m$ | Target code Rate R × 1024 | Spectral efficiency |
|---|---|---|---|
| 30 | 4 | reserved | |
| 31 | 6 | reserved | |

An example of the MCS index table for PUSCH to which transform precoding (transform precoding or Discrete Fourier Transform (DFT) precoding) and 64 QAM is applied is shown in Table 17 below.

TABLE 17

| MCS Index $I_{MCS}$ | Modulation Order $Q_m$ | Target code Rate R × 1024 | Spectral efficiency |
|---|---|---|---|
| 0 | q | 60/q | 0.0586 |
| 1 | q | 80/q | 0.0781 |
| 2 | q | 100/q | 0.0977 |
| 3 | q | 128/q | 0.1250 |
| 4 | q | 156/q | 0.1523 |
| 5 | q | 198/q | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 2 | 679 | 1.3262 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 4 | 658 | 2.5703 |
| 22 | 4 | 699 | 2.7305 |
| 23 | 4 | 772 | 3.0156 |
| 24 | 6 | 567 | 3.3223 |
| 25 | 6 | 616 | 3.6094 |
| 26 | 6 | 666 | 3.9023 |
| 27 | 6 | 772 | 4.5234 |
| 28 | q | reserved | |
| 29 | 2 | reserved | |
| 30 | 4 | reserved | |
| 31 | 6 | reserved | |

A downlink control channel in the 5G wireless communication system is described in greater detail below.

Figure 4:
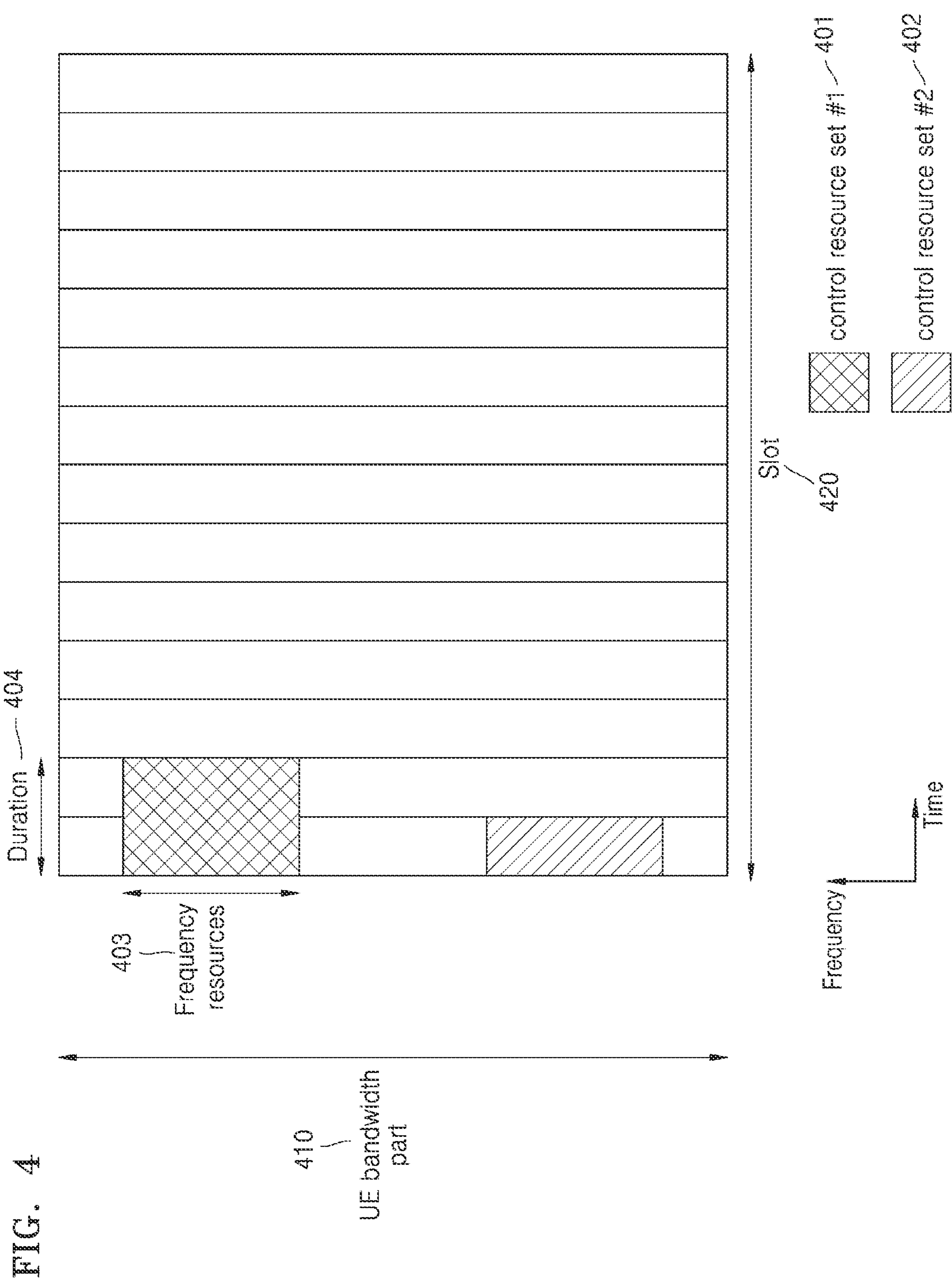
FIG. 4 illustrates an example of a control resource set in which a downlink control channel is transmitted in a 5G wireless communication system.

FIG. 4 illustrates an example of a CORESET in which a downlink control channel is transmitted in a 5G wireless communication system.

Referring to FIG. 4, a UE bandwidth part 410 of a terminal may be configured on a frequency axis, and two CORESETs (CORESET #1 401 and CORESET #2 402) may be configured in one slot 420 on a time axis. The CORESETs 401 and 402 may be configured to a certain frequency resource 403 within the entire UE bandwidth part 410 on the frequency axis. Also, the CORESETs 401 and 402 may be configured with one or more OFDM symbols along the time axis, and may be defined by a CORESET duration 404. Referring to FIG. 4, the CORESSET #1 401 may be configured to have a CORESET duration of two symbols, and the CORESET #2 402 may be configured to have a CORESET duration of one symbol.

The BS may configure for the terminal the CORESETs in a 5G wireless communication system described above through higher layer signaling (e.g., system information, MIB, or RRC signaling). When the control resource set is configured for the terminal, it means that information such as a CORESET identity, a frequency location of the CORESET, and a symbol length of the CORESET is provided to the terminal. For example, the following information of Table 18 may be included.

TABLE 18

```
ControlResourceSet ::=              SEQUENCE {
  -- Corresponds to L1 parameter 'CORESET-ID'
    controlResourceSetId                 ControlResourceSetId,
  (control resource set identity)
    frequencyDomainResources             BIT STRING (SIZE (45)),
  (frequency domain resource allocation information)
    duration                             INTEGER (1..maxCoReSetDuration),
  (time domain resource allocation information)
  cce-REG-MappingType                    CHOICE {
  (CCE-to-REG mapping method)
      interleaved                            SEQUENCE {
        reg-BundleSize                           ENUMERATED {n2, n3, n6},
        (REG bundle size)
        precoderGranularity                    ENUMERATED {sameAsREG-
bundle, allContiguousRBs},
        interleaverSize                        ENUMERATED {n2, n3, n6}
        shiftIndex
        INTEGER (0..maxNrofPhysicalResourceBlocks-1)
        OPTIONAL
          (interleaver shift)
        },
        nonInterleaved              NULL
  },
  tci-StatesPDCCH                   SEQUENCE (SIZE (1...maxNrofTCI-
StatesPDCCH)) OF TCI-StateId   OPTIONAL,
    (QCL configuration information)
  tci-PresentInDCI                        ENUMERATED {enabled}
OPTIONAL, -- Need S
}
```

In Table 18, tci-StatesPDCCH (simply referred to as a transmission configuration indication (TCI) state) configuration information may include information about one or more SS/PBCH block indexes having a QCL association with a DMRS transmitted in the corresponding control resource set or channel state information reference signal (CSI-RS) indexes.

Figure 5:
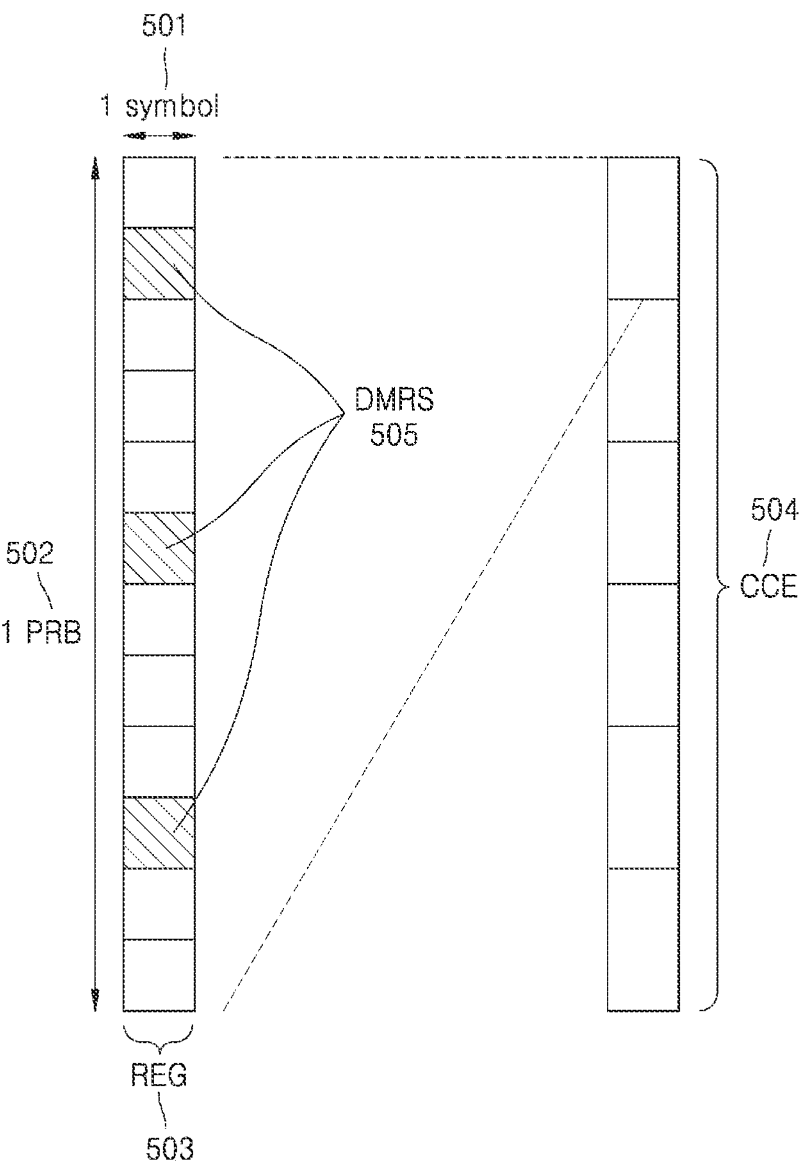
FIG. 5 illustrates a structure of a downlink control channel of a 5G wireless communication system.

FIG. 5 illustrates a structure of a downlink control channel of a 5G wireless communication system.

That is, FIG. 5 illustrates an example of a basic unit of time and frequency resources constituting a DL control channel that is usable in a 5G wireless communication system.

Referring to FIG. 5, the basic unit of the time and frequency resources constituting the control channel may be referred to as a resource element group (REG) 503. The REG 503 may be defined as one OFDM symbol 501 on a time axis and one physical resource block (PRB) 502, that is, 12 subcarriers, on a frequency axis. The BS may configure a downlink control channel allocation unit by concatenating the REG 503.

As illustrated in FIG. 5, when a basic unit of allocating the downlink control channel is called a control channel element (CCE) 404 in a 5G wireless communication system, the one CCE 404 may be comprised of multiple REGs 403. In the example illustrated in FIG. 5, when the REG 503 includes 12 REs, and one CCE 504 includes 6 REGs 503, one CCE 504 may include 72 REs. When a DL CORESET is configured, the DL CORESET may include a plurality of CCEs 504. A certain downlink control channel may be mapped to one or more CCEs 504 according to an aggregation level (AL) in the control resource set to be transmitted. The CCEs 504 in the control resource set may be identified by numbers. In this case, the numbers may be assigned to the CCEs 504 according to a logical mapping scheme.

The basic unit of the DL control channel illustrated in FIG. 5, that is, the REG 503, may include both of REs to which the DCI is mapped and regions to which a DMRS 505, which is a reference signal for decoding the same, is mapped. As illustrated in FIG. 5, three DMRSs 505 may be transmitted in one REG 503. The number of CCEs required to transmit a PDCCH may be 1, 2, 4, 8, or 16 depending on an AL, and the different numbers of CCEs may be used to implement link adaptation of a DL control channel. For example, when AL=L, a single DL control channel may be transmitted in L CCEs. The terminal has to detect a signal in a state in which the terminal does not know information about the DL control channel. A search space representing a set of CCEs may be used for blind decoding. The search space is a set of DL control channel candidates including CCEs that the terminal has to attempt to decode on a given AL. Because there are various ALs that make 1, 2, 4, 8, or 16 CCEs into one bundle, the terminal may have a plurality of search spaces. A search space set may be defined as a set of search spaces at all the configured ALs.

The search spaces may be classified into common search spaces and UE-specific search spaces. A certain group of terminals or all the terminals may monitor a common search space of the PDCCH to receive dynamic scheduling with respect to system information or cell-common control information, such as a paging message. For example, a terminal may receive PDSCH scheduling allocation information for transmitting a SIB including cell operator information or the like, by monitoring the common search space of the PDCCH. For the common search space, a certain group of terminals or all the terminals need to receive the PDCCH, and thus the common search space may be defined as a set of pre-appointed CCEs. Scheduling allocation information for a UE-specific PDSCH or PUSCH may be received by monitoring a UE-specific search space of a PDCCH. The UE-specific search space may be UE-specifically defined as a function of various system parameters and an identity of the terminal.

In the 5G wireless communication system, parameters of the search space of the PDCCH may be configured by the base station for the terminal in higher layer signaling (e.g., SIB, MIB, or RRC signaling). For example, the base station may configure, in the terminal, the number of PDCCH candidates at each aggregation level L, a monitoring period for the search space, a monitoring occasion of a symbol unit within a slot for the search space, a search space type (i.e., a common search space or a UE-specific search space), a combination of an RNTI and a DCI format to be monitored in the search space, and an index of a control resource set for monitoring the search space. For example, the parameters for the search space of the PDCCH may include the following information shown in Table 19.

TABLE 19

```
SearchSpace ::= SEQUENCE {
  -- Identity of the search space. SearchSpaceId = 0 identifies the SearchSpace configured
via PBCH (MIB) or ServingCellConfigCommon.
      searchSpaceId                          SearchSpaceId,
    (search space identifier)
      controlResourceSetId                   ControlResourceSetId,
    (control resource set identifier)
      monitoringSlotPeriodicityAndOffset     CHOICE {
        sl1                                        NULL,
        sl2                                        INTEGER (0..1),
        sl4                                        INTEGER (0..3),
        sl5                                        INTEGER (0..4),
        sl8                                        INTEGER (0..7),
        sl10                                       INTEGER (0..9),
        sl16                                       INTEGER (0..15),
        sl20                                       INTEGER (0..19),
  }
OPTIONAL,
  duration (monitoring duration)                   INTEGER (2..2559)
  monitoringSymbols WithinSlot              BIT STRING (SIZE (14))
OPTIONAL,
  (monitoring symbol in slot)
  nrofCandidates                            SEQUENCE {
  (number of PDSCCH candidates per aggregation level)
        aggregationLevel1                         ENUMERATED {n0, n1, n2, n3,
n4, n5, n6, n8},
        aggregationLevel2                         ENUMERATED {n0, n1, n2, n3,
n4, n5, n6, n8},
        aggregationLevel4                         ENUMERATED {n0, n1, n2, n3,
n4, n5, n6, n8},
        aggregationLevel8                         ENUMERATED {n0, n1, n2, n3,
n4, n5, n6, n8},
        aggregationLevel16                        ENUMERATED {n0, n1, n2, n3,
n4, n5, n6, n8}
  },
  searchSpaceType                           CHOICE {
  (search space type)
  -- Configures this search space as common search space (CSS) and DCI formats to
monitor.
    common                                         SEQUENCE {
          (common search space)
          }
    ue-Specific                                    SEQUENCE {
    (UE-specific search space)
          -- Indicates whether the UE monitors in this USS for DCI formats 0-0 and 1-
0 or for formats 0-1 and 1-1.
          formats                      ENUMERATED {formats0-0-And-1-0,
formats0-1-And-1-1},
      ...
    }
```

The BS may configure one or more search space sets in the terminal according to the configuration information. According to an embodiment, the BS may configure, for the terminal, search space set 1 and search space set 2, may configure DCI format A scrambled by an X-RNTI in the search space set 1 to be monitored in the common search space, and may configure DCI format B scrambled by a Y-RNTI in the search space set 2 to be monitored in the UE-specific search space.

According to the configuration information, one or more search space sets may exist in the common search space or the UE-specific search space. For example, a search space set #1 and a search space set #2 may be configured in the common search space, and a search space set #3 and a search space set #4 may be configured in the UE-specific search space.

In the common search space, the following combinations of DCI formats and RNTIs may be monitored. However, the disclosure is not limited to the examples below.

DCI format 0_0/1_0 with CRC scrambled by C-RNTI, CS-RNTI, MCS-C-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of DCI formats and RNTIs may be monitored. However, the disclosure is not limited to the examples below.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

Specified RNTIs may comply with the following definitions and uses.

C-RNTI: used for UE-specific PDSCH scheduling

MCS-C-RNTI: used for UE-specific PDSCH scheduling

TC-RNTI (Temporary Cell RNTI): used for UE-specific PDSCH scheduling

CS-RNTI: used for semi-statically configured UE-specific PDSCH scheduling

RA-RNTI: used for PDSCH scheduling in a random access process

P-RNTI: used for scheduling a PDSCH on which paging is transmitted

SI-RNTI (System Information RNTI): used for scheduling a PDSCH on which system information is transmitted INT-RNTI (Interruption RNTI): used for indicating whether to puncture the PDSCH TPC-PUSCH-RNTI (Transmit Power Control for PUSCH RNTI): used for indicating power control command for a PUSCH TPC-PUCCH-RNTI (Transmit Power Control for PUCCH RNTI): used for indicating power control command for a PUCCH TPC-SRS-RNTI (Transmit Power Control for SRS RNTI): used for indicating power control command for an SRS The above specified DCI formats may comply with the following definitions shown in Table 20.

TABLE 20

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and ' OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In a 5G wireless communication system, a search space of an aggregation level L in a control resource set p and a search space set s may be expressed as in Equation (2) below.

$$L\cdot\left\{\left(Y_{p,n^{\mu}_{s,f}}+\left\lfloor\frac{m_{s,n_{CI}}\cdot N_{CCE,p}}{L\cdot M^{(L)}_{p,s,max}}\right\rfloor+n_{CI}\right)\bmod\lfloor N_{CCE,p}/L\rfloor\right\}+i \tag{2}$$

L: aggregation level $n_{CI}$: carrier index $N_{CCE,p}$: Total Number of CCEs present within CORESET p $n^{\mu}_{s,f}$: slot index $M^{(L)}_{p,s,max}$: the number of PDCCH candidates at aggregation level L $m_{snCI}=0, \ldots, M^{(L)}_{p,s,max}-1$: the number of PDCCH candidates at aggregation level L $i=0, \ldots, L-1$ $$Y_{p,n^{\mu}_{s,f}}=\left(A_p\cdot Y_{p,n^{\mu}_{s,f}-1}\right)\bmod D,$$

$Y_{p,-1}=n_{RNTI}\neq 0$, $A_0=39827$, $A_1=39829$, $A_2=39839$, $D=65537$ $n_{RNTI}$: terminal identity $$Y\_(p, n^{\mu}_{s,f})$$

may be U in a common search space.

In a UE-specific search space, Y_(p,n^μs,f) may vary according to an identity of a terminal (a C-RNTI or an ID configured for the terminal by a base station) and a time index.

Figure 6:
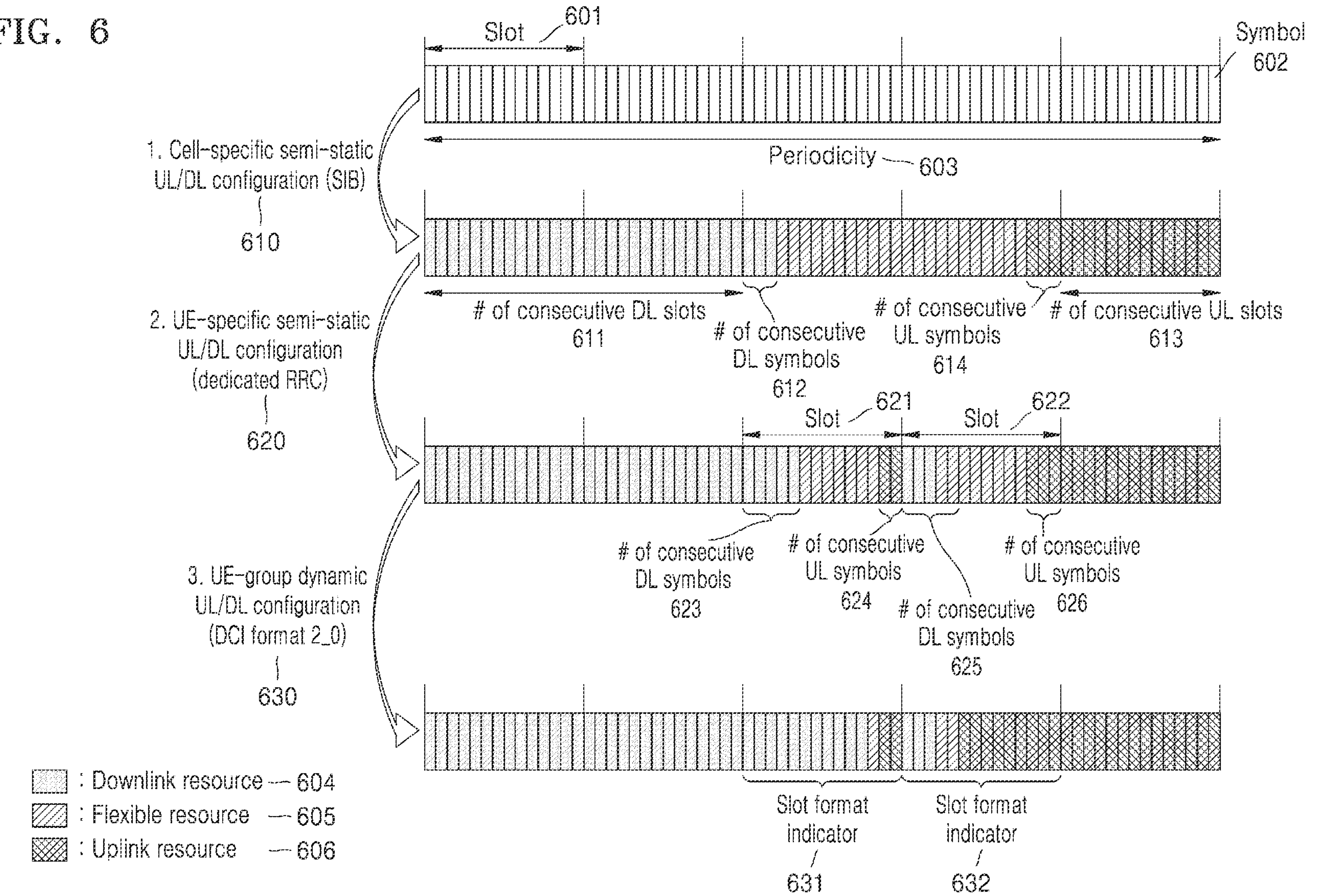
FIG. 6 illustrates an example of an uplink and a downlink resource configuration method of a 5G wireless communication system.

FIG. 6 illustrates an example of an uplink and downlink resource configuration method of a 5G wireless communication system, according to an embodiment.

Referring to FIG. 6, a slot 601 may include 14 symbols 602. Uplink-downlink configuration of symbols/slots in the 5G wireless communication system may be configured in three steps. First, semi-statically, uplink-downlink of a symbol/slot may be configured through cell-specific configuration information 610 through system information in a symbol unit. In detail, the uplink-downlink configuration information may include uplink-downlink pattern information and reference subcarrier information. In the uplink-downlink pattern information, a pattern periodicity 603, a number 611 of consecutive DL slots from a start point of each pattern, a number 612 of symbols of a next slot, a number 613 of consecutive UL slots from an end of the pattern, and a number 614 of symbols of a next slot may be indicated. Here, slots and symbols not indicated as UL resource 606 and DL resource 604 may be determined as flexible resource 605 (e.g., flexible slots/symbols).

Second, through UE-specific configuration information through dedicated higher layer signaling 620, slots 621 and 622 including flexible slots or flexible symbols may be respectively indicated as the number of consecutive DL symbols 623 and 625 from each start symbol of slots 621 and 622 and the numbers of consecutive UL symbols 624 and 626 from each end of slot 621 and 622 or may be indicated by a full DL slot or a full UL slot.

Finally, in order to dynamically switch a DL signal transmission interval and an UL signal transmission interval, symbols indicated as flexible symbols in each slot (that is, symbols that are not indicated by downlink and uplink) may be indicated as to whether each symbol is a DL symbol, an UL symbol, or a flexible symbol, through slot format indicators (SFI) 631 and 632 included in a DL control channel 630 (e.g., DCI format). The slot format indicator may be selected as one index from a table in which an UL-DL configuration of 14 symbols in one slot is preset as shown in Table 21 below.

TABLE 21

| | Symbol number in q slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |

TABLE 21-continued

| Format | Symbol number in q slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | F | U | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on TDD-UL-DL-ConfigurationCommon or TDD-UL-DL-ConfigDedicated and, if any, on detected DCI formats | | | | | | | | | | | | | |

In Regard to XDD

In 5G mobile communication services, an additional coverage extension technology is introduced compared to LTE communication services, but in actual 5G mobile communication services, a time division duplex (TDD) system which is suitable for a service with a high proportion of downlink traffic may be generally utilized. In addition, as a center frequency is increased to increase the frequency band, the coverage of the BS and the terminal is reduced. Thus, coverage enhancement is a key requirement of 5G mobile communication services. In particular, in order to support a service in which the transmission power of the terminal is generally lower than that of the BS and a proportion of downlink traffic is high, and because the ratio of the DL in a time domain is higher than that of the UL, the coverage enhancement of an UL channel is a key requirement of 5G mobile communication services. As a method of physically improving the coverage of the UL channel between the BS and the terminal, there may be a method of increasing time resources of the UL channel, lowering the center frequency, or increasing the transmission power of the terminal. However, switching the frequency may be limited because the frequency band is determined for each network operator. In addition, because a maximum transmission power of the terminal is regulated in order to reduce interference, there may be restrictions in increasing the maximum transmission power of the terminal to enhance coverage.

Therefore, in order to enhance the coverage of the BS and the terminal, as in the TDD system, in addition to dividing the UL and DL resources in a time domain according to a proportion of UL and DL traffic, like in a frequency division duplex (FDD) system, the UL and DL resources may also be divided in a frequency domain. In an embodiment, a system in which UL resources and DL resources may be flexibly divided in a time domain and a frequency domain may be referred to as an XDD system, a flexible TDD system, a hybrid TDD system, a TDD-FDD system, a hybrid TDD-FDD system, etc., and for convenience of description, the XDD system will be described as the system in the disclosure. X in XDD may refer to time or frequency.

Figure 7:
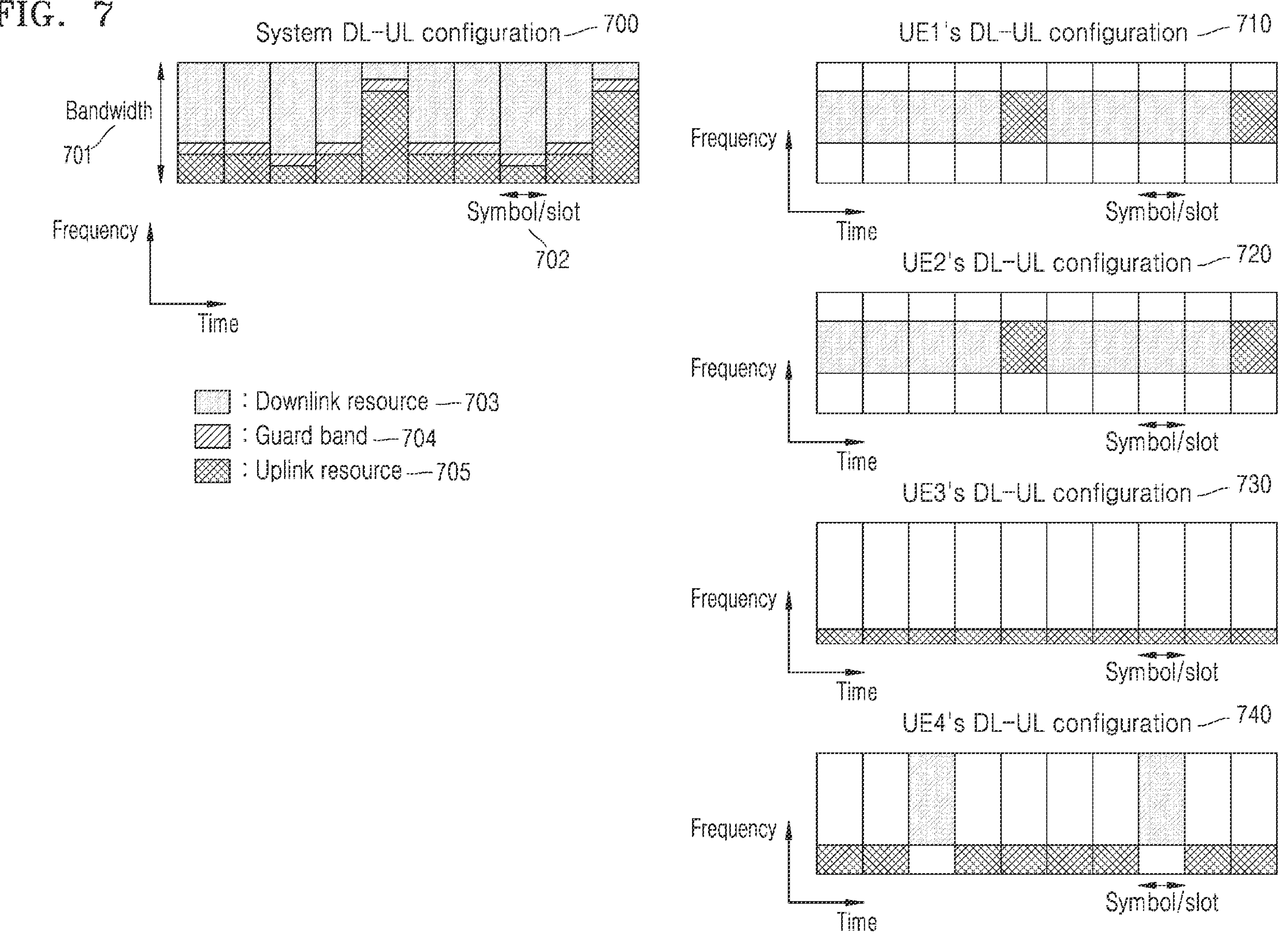
FIG. 7 illustrates an example of an uplink and a downlink resource configuration method, according to an embodiment.

FIG. 7 illustrates UL-DL resource configuration of an XDD system according to an embodiment, in which UL and DL resources are flexibly divided in a time domain and a frequency domain.

Referring to FIG. 7, in an UL-DL configuration 700 of the entire XDD system from a viewpoint of the BS, resources may be flexibly allocated to each symbol or slot 702 with respect to the entire frequency band 701, according to traffic proportions of UL and DL. However, this is merely an example, and a unit whereby resources are allocated is not limited to the symbol or the slot 702, and resources may also be flexibly allocated according to a unit such as a mini slot. A guard band 704 may be allocated between frequency bands of a DL resource 703 and an UL resource 705. The guard band 704 may be allocated as a measure for reducing an interference applied to an UL channel or signal reception, by out-of-band emission that occurs when a BS transmits a DL channel or signal in the DL resource 703. Here, as an example, a terminal 1 and a terminal 2, in which downlink traffic is generally larger than uplink traffic, may be allocated with a resource ratio of 4:1 between DL and UL in a time domain according to a UE1's DL-UL configuration 710 and UE2's DL-UL configuration 720 by the BS. At the same time, a terminal 3, which operates at the cell edge and lacks uplink coverage, may be allocated with only UL resources in a certain time interval by the UE3's DL-UL configuration 730 by the BS. Additionally, a terminal 4, which operates at the cell edge and lacks UL coverage but has a relatively large amount of DL traffic and UL traffic, may be allocated with a large amount of UL resources in a time domain for UL coverage and a large amount of DL resources in a frequency band by the UE4's DL-UL configuration 740 by the BS. As in the example described above, more DL resources may be allocated, in a time domain, to terminals that operate relatively in a cell center and have more DL traffic, and more UL resources may be allocated, in the time domain, to terminals that operate relatively at a cell edge and have insufficient uplink coverage.

Figure 8:
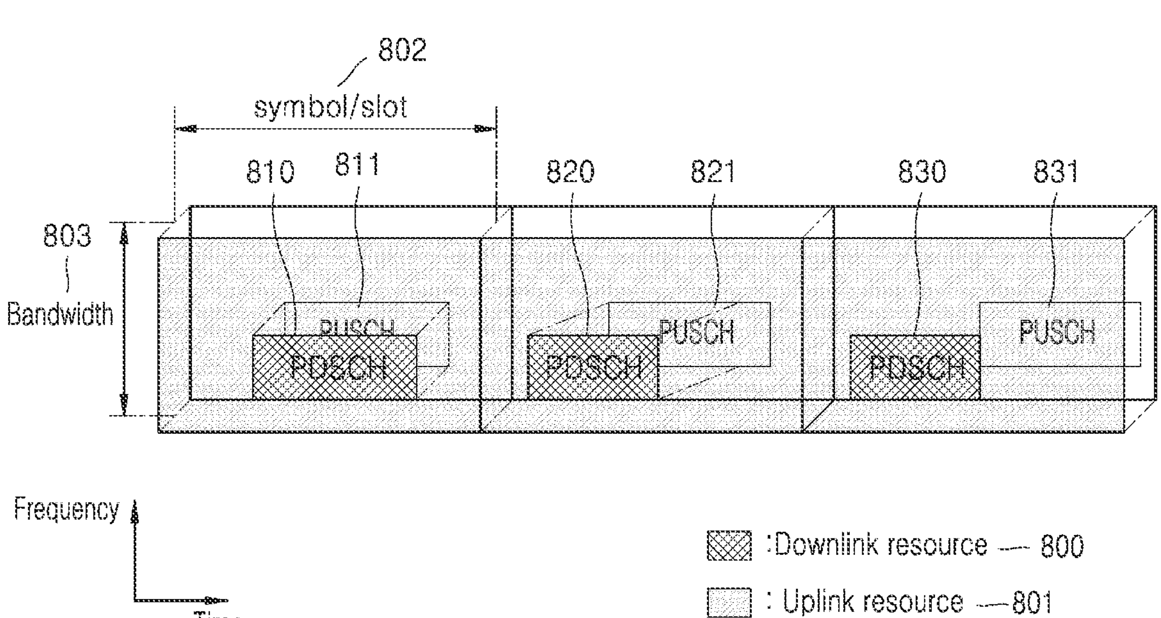
FIG. 8 illustrates an example of an uplink and a downlink resource configuration method, according to an embodiment.

FIG. 8 illustrates UL-DL resource configuration of a full duplex system according to an embodiment, in which UL and DL resources are flexibly divided in a time domain and a frequency domain.

In the example of FIG. 8, all or a portion of a DL resource 800 and an UL resource 801 may be configured to overlap in time and frequency domains. In a region configured with the DL resource 800, DL transmission from a BS to a terminal may be conducted, and in a region configured with the UL resource 801, UL transmission from the terminal to the BS may be conducted.

In the example of FIG. 8, all of a DL resource 810 and an UL resource 811 may be configured to overlap in a time resource corresponding to a symbol or slot 802 and a frequency resource corresponding to a bandwidth 803. As the DL resource 810 and the UL resource 811 overlap in time and frequency, DL and UL transmission and reception of the BS or the terminal may occur simultaneously in the same time and frequency resource.

In another example of FIG. 8, a DL resource 820 and an UL resource 821 may be configured to partially overlap in the time resource corresponding to the symbol or slot 802 and a frequency resource corresponding to the bandwidth 803. In a partial region where the DL resource 820 and the UL resource 821 overlap, the DL and UL transmission and reception of the BS or the terminal may occur simultaneously.

In another example of FIG. 8, a DL resource 830 and an UL resource 831 may be configured not to overlap in the time resource corresponding to a symbol or slot 802 and the frequency resource corresponding to the bandwidth 803.

Figure 9:
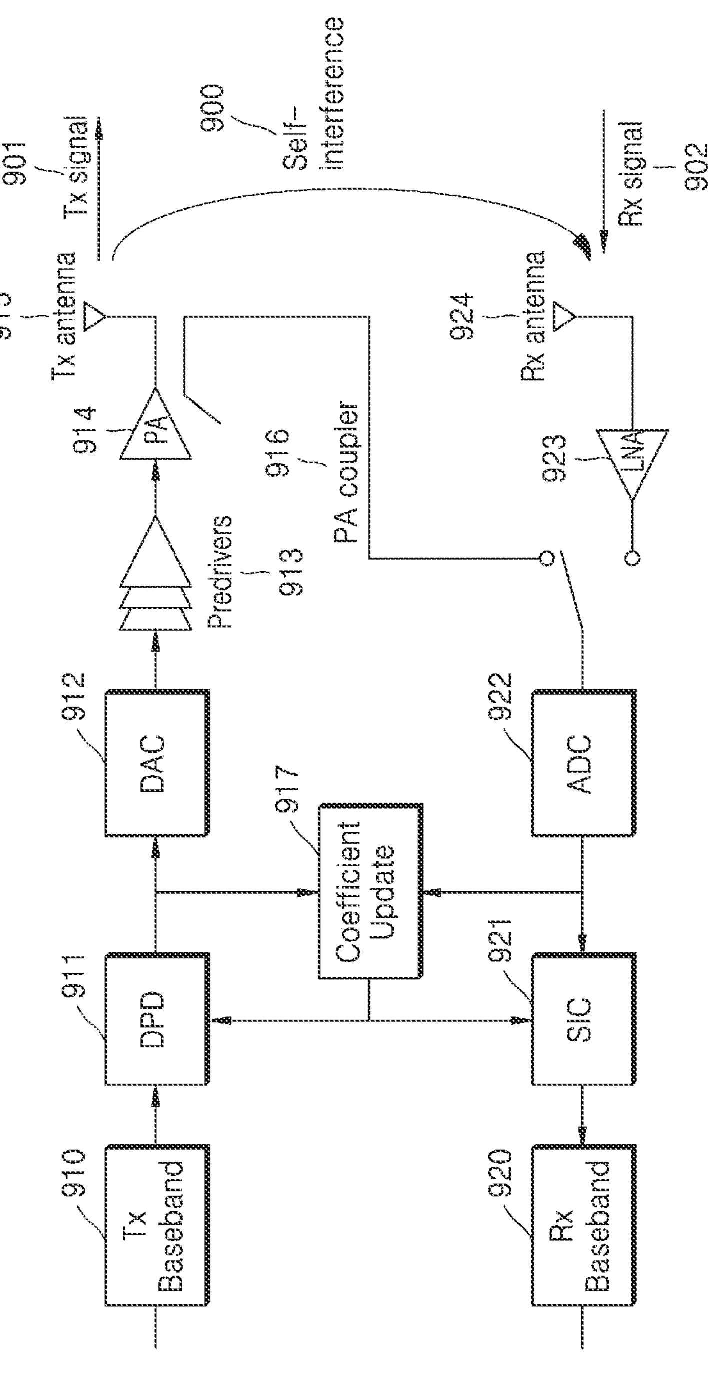
FIG. 9 illustrates a structure of a transmitting end and a structure of a receiving end, according to an embodiment.

FIG. 9 illustrates a transmission and reception structure for a duplex method, according to an embodiment.

The transmission and reception structure illustrated in FIG. 9 may be used in a BS device or a terminal device. According to the transmission and reception structure illustrated in FIG. 9, a transmitting end may be configured with units such as a transmission baseband unit (Tx Baseband) 910, a digital pre-distortion unit (DPD) 911, a digital-to-analog converter (DAC) 912, a pre-driver 913, a power amplifier (PA) 914, a transmission antenna (Tx Antenna) 915, and the like. Each unit may perform the following function.

Tx baseband 910: digital processing unit for a transmission signal

DPD unit 911: pre-distortion of a digital transmission signal

DAC 912: converts a digital signal to an analog signal

Pre-driver 913: progressive power amplification of an analog transmission signal PA 914: amplifies power of an analog transmission signal Tx antenna 915: an antenna for transmitting a signal According to the transmission and reception structure illustrated in FIG. 9, a receiving end may be configured with units such as a reception antenna (Rx Antenna) 924, a low noise amplifier (LNA) 923, an analog-to-digital converter (ADC) 922, a successive interference canceller 921, and a reception baseband unit (Rx Baseband) 920. Each unit may perform the following function.

Rx antenna 924: an antenna for receiving a signal

LNA 923: minimizes amplification of noise while amplifying the power of an analog reception signal ADC 922: converts an analog signal to a digital signal Successive interference canceller 921: interference canceller for a digital signal Rx baseband unit 920: digital processing unit for a reception signal According to the transmission and reception structure illustrated in FIG. 9, a PA coupler 916 and a constant update unit (coefficient update) 917 may exist for additional signal processing between the transmitting end and the receiving end. Each unit may perform the following function.

PA coupler 916: a unit for observing, at the receiving end, a waveform of an analog transmission signal passing through the power amplifier Constant update unit 917: updates various constants necessary for digital domain signal processing of the transmitting end and the receiving end, wherein constants calculated hereby may be used to set various parameters in the DPD unit 911 of the transmitting end and the SIC unit 921 of the receiving end.

The transmission and reception structure illustrated in FIG. 9 may be utilized for the purpose of effectively controlling interference between a transmission signal and a reception signal when transmission and reception operations are simultaneously performed in a base station or a terminal device. For example, when transmission and reception occur at the same time in an arbitrary device, a transmission signal 901 transmitted through the transmission antenna 915 of the transmitting end may be received through the receiving antenna 924 of the receiving end, and in this case, the transmission signal 901 received by the receiving end may interfere with (900) the reception signal 902 that is originally intended to be received by the receiving end. Interference between the transmission signal 901 and the reception signal 902 that are received by the receiving end is called self-interference 900. For example, in detail, when the BS device performs DL transmission and UL reception at the same time, a downlink signal transmitted by the BS may be received by a receiving end of the BS, and accordingly, at the receiving end of the BS, interference may occur between the DL signal transmitted by the BS and an UL signal that the BS originally intended to receive at the receiving end. When the terminal device simultaneously performs DL reception and UL transmission at the same time, an UL signal transmitted by the terminal may be received at the receiving end of the terminal, and accordingly, at the receiving end of the terminal, interference may occur between the UL signal transmitted by the terminal and a DL signal that the terminal originally intended to receive at the receiving end. As described above, interference between links in different directions from each other in a BS device and a terminal device, that is, interference between a DL signal and an UL signal is also called cross-link interference.

In an embodiment, self-interference between a transmission signal (or a DL signal) and a reception signal (or an UL signal) may occur in a system in which transmission and reception may be performed simultaneously.

For example, self-interference may occur in the XDD system described above.

Figure 10:
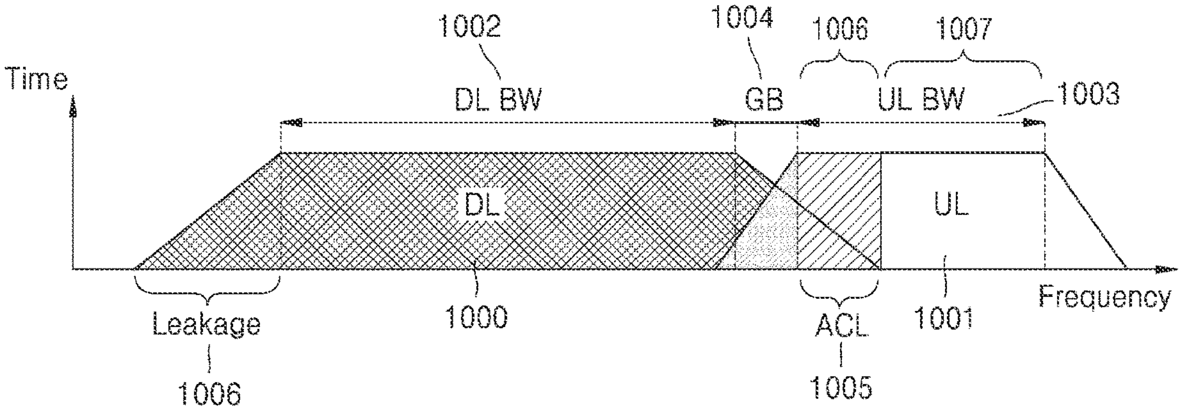
FIG. 10 illustrates an example of uplink and downlink resource configuration and self-interference, according to an embodiment.

FIG. 10 is a diagram describing an example of DL and UL resource configuration in an XDD system.

In XDD, a DL resource 1000 and an UL resource 1001 may be distinguished from each other in a frequency domain, and there may be a guard band (GB) 1004 between the DL resource 1000 and the UL resource 1001. Actual DL transmission may be performed within a DL bandwidth 1002, and UL transmission may be performed within an actual UL bandwidth 1003. Here, leakage 1006 may occur outside UL or DL transmission bands. In a region where the DL resource 1000 and the UL resource 1001 are adjacent to each other, interference may occur due to the leakage (this may be referred to as adjacent carrier leakage (ACL) 1005)). FIG. 10 illustrates an example in which the ACL 1005 from the DL resource 1000 to the UL resource 1001 occurs. The more adjacent the DL bandwidth 1002 and the UL bandwidth 1003 are to each other, the influence of signal interference caused by the ACL 1005 may increase, thus, deteriorating performance. For example, as illustrated in FIG. 10, in some resource regions 1006 in the UL bandwidth 1003 adjacent to the DL bandwidth 1002, the influence of interference caused by the ACL 1005 may be relatively great. In some resource regions 1007 within the UL band 1003 that are relatively far from the DL band 1002, the influence of the interference caused by the ACL 1005 may be relatively small. That is, in the UL band 1003, there may be the resource region 1006 that is relatively heavily affected by interference and the resource region 1007 that is relatively less affected by interference. The GB 1004 may be inserted between the downlink bandwidth 1002 and the UL bandwidth 1003 in order to reduce performance degradation caused by the ACL 1005. As the size of the GB 1004 increases, there is an advantage in that the interference effect due to the ACL 1005 between the DL bandwidth 1002 and the UL bandwidth 1003 may be reduced, but as the size of the GB 1004 increases, resources available for transmission and reception are reduced, and thus, there may be a disadvantage of lower resource efficiency. Conversely, as the size of the GB 1004 decreases, the amount of resources that may be used for transmission and reception may increase, which has the advantage of increasing resource efficiency, but the influence of interference due to the ACL 1005 between the DL bandwidth 1002 and the UL bandwidth 1003 may be increased. Thus, it may be important to determine an appropriate size of the GB 1004 by considering the trade-off.

PUSCH: Related to Transmission Method

A scheduling scheme of PUSCH transmission is described in greater detail below. PUSCH transmission may be dynamically scheduled by an UL grant in DCI or may be operated by configured grant Type 1 or Type 2. Dynamic scheduling indication for PUSCH transmission is possible in DCI format 0_0 or 0_1.

Configured grant Type 1 PUSCH transmission may not involve reception of UL grant through DCI, but may be semi-statically configured through reception of configuredGrantConfig including rrc-ConfiguredUplinkGrant of Table 22 through higher layer signaling. Configured grant Type 2 PUSCH transmission may be semi-persistently scheduled by UL grant in DCI after receiving configuredGrantConfig that does not include the rrc-ConfiguredUplinkGrant of Table 22 through higher layer signaling. When PUSCH transmission is operated by a configured grant, parameters applied to PUSCH transmission may be applied through configuredGrantConfig of is Table 22, which received through higher layer signaling, except for dataScramblingIdentityPUSCH, txConfig, codebookSubset, maxRank, scaling of UCI-OnPUSCH provided by pusch-Config of Table 23. When the terminal has received transformPrecoder in configuredGrantConfig of Table 22 through higher layer signaling, the terminal applies tp-pi2BPSK in pusch-Config of Table 23 for PUSCH transmission operated by the configured grant.

TABLE 22

```
ConfiguredGrantConfig ::=                SEQUENCE {
   frequencyHopping                             ENUMERATED {intraSlot, interSlot}
OPTIONAL, -- Need S
   cg-DMRS-Configuration                        DMRS-UplinkConfig,
   mcs-Table                                        ENUMERATED {qam256,
qam64LowSE}                                                         OPTIONAL, -- Need
S
   mcs-TableTransformPrecoder               ENUMERATED {qam256, qam64LowSE}
OPTIONAL, -- Need S
   uci-OnPUSCH                                        SetupRelease { CG-UCI-OnPUSCH }
OPTIONAL, -- Need M
   resourceAllocation                       ENUMERATED
{ resourceAllocationType0, resourceAllocationType1, dynamicSwitch },
   rbg-Size                                         ENUMERATED {config2}
OPTIONAL, -- Need S
   powerControlLoopToUse                              ENUMERATED {n0, n1},
   p0-PUSCH-Alpha                                         P0-PUSCH-AlphaSetId,
   transformPrecoder                          ENUMERATED {enabled, disabled}
OPTIONAL, -- Need S
   nrofHARQ-Processes                           INTEGER(1..16),
   repK                                             ENUMERATED {n1, n2, n4, n8},
   repK-RV                                            ENUMERATED {s1-0231, s2-0303, s3-
0000}                                      OPTIONAL, -- Need R
   periodicity                              ENUMERATED {
                                                              sym2, sym7, sym1x14,
sym2x14, sym4x14, sym5x14, sym8x14, sym10x14, sym16x14, sym20x14,
                                                              sym32x14, sym40x14,
sym64x14, sym80x14, sym128x14, sym160x14, sym256x14, sym320x14, sym512x14,
                                                              sym640x14, sym1024x14,
sym1280x14, sym2560x14, sym5120x14,
                                                              sym6, sym1x12, sym2x12,
sym4x12, sym5x12, sym8x12, sym10x12, sym16x12, sym20x12, sym32x12,
                                                              sym40x12, sym64x12,
sym80x12, sym128x12, sym160x12, sym256x12, sym320x12, sym512x12, sym640x12,
                                                              sym1280x12, sym2560x12
   },
   configuredGrantTimer                     INTEGER (1..64)
OPTIONAL, -- Need R
   rrc-ConfiguredUplinkGrant                SEQUENCE {
      timeDomainOffset                                INTEGER (0..5119),
      timeDomainAllocation                        INTEGER (0..15),
      frequencyDomainAllocation               BIT STRING (SIZE(18)),
      antennaPort                                 INTEGER (0..31),
      dmrs-SeqInitialization                INTEGER (0..1)
```

TABLE 22-continued

```
OPTIONAL, -- Need R
     precodingAndNumberOfLayers                INTEGER (0..63),
     srs-ResourceIndicator                 INTEGER (0..15)
OPTIONAL, -- Need R
     mcsAndTBS                                 INTEGER (0..31),
     frequencyHoppingOffset               INTEGER (1..
maxNrofPhysicalResourceBlocks-1)                          OPTIONAL, --
Need R
     pathlossReferenceIndex             INTEGER (0..maxNrofPUSCH-
PathlossReferenceRSs-1),
     ...
}
OPTIONAL, -- Need R
     ...
}
```

A PUSCH transmission method is described in greater detail below. A DRMS antenna port for PUSCH transmission is the same as an antenna port for SRS transmission. PUSCH transmission may use a codebook-based transmission method and a non-codebook-based transmission method, respectively, depending on whether a value of txConfig in pusch-Config of Table 23, which is higher layer signaling, is ‘codebook’ or ‘nonCodebook’.

As described above, PUSCH transmission may be dynamically scheduled through DCI format 0_0 or 0_1, and may be semi-statically configured by a configured grant. When the terminal is indicated to schedule PUSCH transmission through DCI format 0_0, the terminal may perform beam configuration for PUSCH transmission, by using pucch-spatialRelationInfoID corresponding to a UE-specific PUCCH resource corresponding to the minimum ID in the uplink BWP activated in a serving cell, and the PUSCH transmission here is based on a single antenna port. The terminal does not expect scheduling of PUSCH transmission through DCI format 0_0 within the BWP in which the PUCCH resource including the pucch-spatialRelationInfo is not configured. When the terminal is not configured with txConfig in pusch-Config of Table 23, the terminal does not expect to be scheduled in DCI format 0_1.

TABLE 23

```
PUSCH-Config ::=                          SEQUENCE {
  dataScramblingIdentityPUSCH               INTEGER (0..1023)
OPTIONAL, -- Need S
  txConfig                                    ENUMERATED {codebook,
nonCodebook}                                       OPTIONAL, -- Need S
  dmrs-UplinkForPUSCH-MappingTypeA             SetupRelease { DMRS-
UplinkConfig }                                     OPTIONAL, -- Need M
  dmrs-UplinkForPUSCH-MappingTypeB             SetupRelease { DMRS-
UplinkConfig }                                     OPTIONAL, -- Need M
  pusch-PowerControl                        PUSCH-PowerControl
OPTIONAL, -- Need M
  frequencyHopping                            ENUMERATED {intraSlot,
interSlot}                                    OPTIONAL, -- Need S
  frequencyHoppingOffsetLists              SEQUENCE (SIZE (1..4)) OF
INTEGER (1..maxNrofPhysicalResourceBlocks-1)
OPTIONAL, -- Need M
  resourceAllocation                       ENUMERATED
{ resourceAllocationType0, resourceAllocationType1, dynamicSwitch },
  pusch-TimeDomainAllocationList            SetupRelease { PUSCH-
TimeDomainResourceAllocationList }                 OPTIONAL, -- Need M
  pusch-AggregationFactor                   ENUMERATED { n2, n4, n8 }
OPTIONAL, -- Need S
  mcs-Table                                    ENUMERATED {qam256,
qam64LowSE}                                             OPTIONAL, -- Need S
  mcs-TableTransformPrecoder                  ENUMERATED {qam256,
qam64LowSE}                                             OPTIONAL, -- Need S
  transformPrecoder                           ENUMERATED {enabled, disabled}
OPTIONAL, - Need S
  codebookSubset                               ENUMERATED
{fullyAndPartialAndNonCoherent, partialAndNonCoherent,nonCoherent}
OPTIONAL, -- Cond codebookBased                 INTEGER (1..4)
  maxRank
OPTIONAL, -- Cond codebookBased             ENUMERATED { config2}
  rbg-Size
OPTIONAL, -- Need S                              SetupRelease { UCI-OnPUSCH}
  uci-OnPUSCH
OPTIONAL, -- Need M
  tp-pi2BPSK                                   ENUMERATED {enabled}
OPTIONAL, -- Need S
  ...,
}
```

Codebook-based PUSCH transmission is described in greater detail below. Codebook-based PUSCH transmission may be dynamically scheduled through DCI format 0_0 or 0_1, and may operate semi-statically by a configured grant. When the codebook-based PUSCH is dynamically scheduled by DCI format 0_1 or is configured semi-statically by a configured grant, the terminal determines a precoder for PUSCH transmission based on an SRS Resource Indicator (SRI), a Transmission Precoding Matrix Indicator (TPMI), and a transmission rank (number of PUSCH transmission layers).

Here, the SRI may be given through a field 'SRS resource indicator' in DCI or may be configured through srs-ResourceIndicator, which is higher layer signaling. The terminal is configured with at least one SRS resource when transmitting a codebook-based PUSCH, and may be configured with up to two. When the terminal is provided with an SRI through DCI, the SRS resource indicated by the corresponding SRI refers to an SRS resource corresponding to the SRI among SRS resources transmitted before the PDCCH including the corresponding SRI. In addition, TPMI and a transmission rank may be given through a field 'precoding information and number of layers' in DCI or may be configured through precodingAndNumberOfLayers, which is higher layer signaling. TPMI is used to indicate a precoder applied to PUSCH transmission. When the terminal is configured with one SRS resource, the TPMI is used to indicate a precoder to be applied in the configured one SRS resource. When the terminal is configured with a plurality of SRS resources, the TPMI is used to indicate a precoder to be applied in an SRS resource indicated through the SRI.

A precoder to be used for PUSCH transmission is selected from an uplink codebook having the same number of antenna ports as a value of nrofSRS-Ports in SRS-Config, which is higher layer signaling. In the codebook-based PUSCH transmission, the terminal determines a codebook subset based on the TPMI and codebookSubset in pusch-Config, which is higher layer signaling. CodebookSubset in pusch-Config, which is higher layer signaling, may be configured to one of 'fullyAndPartialAndNonCoherent', 'partialAndNonCoherent', or 'nonCoherent' based on the UE capability reported by the terminal to the base station. When the terminal reports 'partialAndNonCoherent' as UE capability, the terminal does not expect that a value of codebookSubset, which is higher level signaling, is configured to 'fullyAndPartialAndNonCoherent'. In addition, when the terminal reports 'nonCoherent' as UE capability, the terminal does not expect that the value of codebookSubset, which is higher layer signaling, is configured to 'fullyAndPartialAndNonCoherent' or 'partialAndNonCoherent'. When nrofSRS-Ports in SRS-ResourceSet, which is higher layer signaling, indicates two SRS antenna ports, the terminal does not expect that the value of codebookSubset, which is higher layer signaling, is configured to 'partialAndNonCoherent'.

The terminal may be configured with one SRS resource set in which a value of usage in SRS-ResourceSet, which higher layer signaling, is configured to 'codebook', and one SRS resource in the corresponding SRS resource set may be indicated through SRI. When several SRS resources are configured in the SRS resource set in which the value of usage in SRS-ResourceSet, which is higher layer signaling, is configured to 'codebook', the terminal expects the same value of nrofSRS-Ports in the SRS-Resource, which is higher layer signaling, to be configured for all SRS resources.

The terminal transmits to the BS one or a plurality of SRS resources included in the SRS resource set in which the value of usage is configured to 'codebook' according to higher level signaling, and the BS selects one of the SRS resources transmitted by the terminal and indicates such that the terminal may perform PUSCH transmission by using transmission beam information of the corresponding SRS resource. Here, in the codebook-based PUSCH transmission, SRI is used as information for selecting an index of one SRS resource, and SRI may be included in DCI. Additionally, the BS includes, in the DCI, information indicating the TPMI and a rank to be used by the terminal for PUSCH transmission. By using the SRS resource indicated by the SRI, the terminal performs PUSCH transmission by applying the rank indicated based on the transmission beam of the corresponding SRS resource and a precoder indicated by the TPMI.

Next, non-codebook-based PUSCH transmission is described. Non-codebook-based PUSCH transmission may be dynamically scheduled through DCI format 0_0 or 0_1, and may operate semi-statically by a configured grant. When at least one SRS resource is configured in the SRS resource set in which the value of usage in the SRS-ResourceSet, which is higher layer signaling, is configured to 'nonCodebook', the terminal may be scheduled with a non-codebook-based PUSCH transmission through DCI format 0_1.

The terminal may be configured with, through higher layer signaling, one connected non-zero power (NZP) CSI-RS resource that is associated with the SRS resource set in which the value of usage in the SRS-ResourceSet is configured to 'nonCodebook'. The terminal may perform calculation of a precoder for SRS transmission by measuring the NZP CSI-RS resource associated with the SRS resource set. When a difference between a last received symbol of an aperiodic NZP CSI-RS resource associated with the SRS resource set and a first symbol of an aperiodic SRS transmission in the terminal is less than 42 symbols, the terminal does not expect that information about the precoder for SRS transmission is updated.

When a value of resourceType in the SRS-ResourceSet, which is higher layer signaling, is configured as 'aperiodic', the connected NZP CSI-RS is indicated by an SRS request, which is a field in DCI format 0_1 or 1 1. Here, when the connected NZP CSI-RS resource is an aperiodic NZP CSI-RS resource, and a value of a field SRS request in DCI format 0_1 or 1_1 is not '00', it may indicate that there is a NZP CSI-RS associated with the SRS resource set. Here, the DCI should not indicate cross carrier or cross BWP scheduling. In addition, when a value of the SRS request indicates the existence of an NZP CSI-RS, the corresponding NZP CSI-RS is located in a slot in which a PDCCH including the SRS request field is transmitted. In this case, TCI states configured in a scheduled subcarrier are not configured to QCL-TypeD.

When a periodic or semi-persistent SRS resource set is configured, the connected NZP CSI-RS may be indicated through associatedCSI-RS in the SRS-ResourceSet, which is higher layer signaling. For non-codebook-based transmission, the terminal does not expect that spatialRelationInfo, which is higher layer signaling for SRS resource, and associatedCSI-RS in SRS-ResourceSet, which is higher layer signaling, are configured together.

When the terminal is configured with a plurality of SRS resources, the terminal may determine a precoder to be applied to PUSCH transmission and a transmission rank, based on SRI indicated by the base station. Here, the SRI may be indicated through a field 'SRS resource indicator' in DCI or may be configured through srs-ResourceIndicator, which is higher layer signaling. Like in the codebook-based PUSCH transmission described above, when the terminal is provided with SRI through DCI, the SRS resource indicated by the SRI refers to an SRS resource corresponding to the SRI among SRS resources transmitted before a PDCCH including the SRI. The terminal may use one or a plurality of SRS resources for SRS transmission, and the maximum number of SRS resources and the minimum number of SRS resources that may be simultaneously transmitted on the same symbol in one SRS resource set are determined by the UE capability reported by the terminal to the base station. Here, the SRS resources simultaneously transmitted by the terminal occupy the same RB. The terminal configures one SRS port for each SRS resource. Only one SRS resource set in which a value of usage in the SRS-ResourceSet, which is higher layer signaling, is configured to 'nonCodebook' may be configured, and up to four SRS resources for non-codebook-based PUSCH transmission may be configured.

The base station transmits one NZP-CSI-RS associated with the SRS resource set to the terminal, and the terminal calculates, based on a measurement result obtained when receiving the NZP-CSI-RS, a precoder to be used when transmitting one or a plurality of SRS resources in the corresponding SRS resource set. The terminal applies the calculated precoder when transmitting, to the BS, one or a plurality of SRS resources in the SRS resource set in which the usage is configured to 'nonCodebook', and the base station selects one or a plurality of SRS resources among the received one or plurality of SRS resources. Here, in the non-codebook-based PUSCH transmission, the SRI indicates an index capable of expressing one SRS resource or a combination of a plurality of SRS resources, and the SRI is included in the DCI. Here, the number of SRS resources indicated by the SRI transmitted by the base station may be the number of transmission layers of the PUSCH, and the terminal transmits a PUSCH by applying a precoder applied to the SRS resource transmission to each layer.

PUSCH: Preparation Procedure Time

A PUSCH preparation procedure time is described in greater detail below. When the BS schedules the terminal to transmit a PUSCH by using DCI format 0_0 or DCI format 0_1, the terminal may require a PUSCH preparation procedure time for transmitting a PUSCH by applying a transmission method indicated through DCI (a transmission precoding method of an SRS resource, the number of transmission layers, a spatial domain transmission filter). In NR, the PUSCH preparation procedure time is defined in consideration of the above. The PUSCH preparation procedure time of the terminal may be according to Equation (3) below.

$$T_{proc,2} = \max((N_2 + d_{2,1} + d_2)(2048 + 144)\kappa 2^{-\mu} T_c + T_{ext} + T_{switch}, d_{2,2}) \quad (3)$$

In $T_{proc,2}$ described above, each variable may have the following meaning.

$N_2$: the number of symbols determined according to the UE processing capability 1 or 2 and the numerology u according to the capability of the terminal. When reported as UE processing capability 1 according to the capability report of the terminal, $N_2$ may have the values of Table 24, and when reported as UE processing capability 2, and it is configured through higher layer signaling that UE processing capability 2 may be used, $N_2$ may have the values of Table 25.

TABLE 24

| μ | PUSCH preparation time $N_2$ [symbols] |
|---|---|
| 0 | 10 |
| 1 | 12 |
| 2 | 23 |
| 3 | 36 |

TABLE 25

| μ | PUSCH preparation time $N_2$ [symbols] |
|---|---|
| 0 | 5 |
| 1 | 5.5 |
| 2 | 11 for frequency range 1 |

$d_{2,1}$: the number of symbols that are set to 0 when resource elements of a first OFDM symbol of PUSCH transmission are configured to consist of only DM-RS, and set to 1 otherwise.

κ: 64

μ: a value among $\mu_{DL}$ Or $\mu_{UL}$, according to which $T_{proc,2}$ is greater is followed. UDL denotes numerology of DL on which a PDCCH including DCI for scheduling a PUSCH is transmitted, and, HUL denotes numerology of UL on which a PUSCH is transmitted.

$T_c$: $1/(\Delta f_{max} \cdot N_f)$, $\Delta f_{max}$=480. 103 Hz, $N_f$=4096.

$d_{2,2}$: When the DCI scheduling PUSCH indicates BWP switching, $d_{2,2}$ follows the BWP switching time, and otherwise, $d_{2,2}$ has a value of 0.

$d_2$: when OFDM symbols of PUCCH and PUSCH having a high priority index and a PUCCH having a low priority index overlap in time, a value $d_2$ of PUSCH having the high priority index is used. Otherwise, $d_2$ is 0.

$T_{ext}$: When the terminal uses a sharing spectrum channel connection method, the terminal may calculate $T_{ext}$ and apply the same to the PUSCH preparation procedure time. Otherwise, $T_{ext}$ is assumed to be 0.

$T_{switch}$: When an uplink switching interval is triggered, $T_{switch}$ is assumed to be a switching interval time. Otherwise, $T_{switch}$ is assumed to be 0.

Considering time axis resource mapping information of the PUSCH scheduled through DCI and the timing advance (TA) effect between UL and DL, when, from the last symbol of the PDCCH including the DCI scheduled for the PUSCH and after $T_{proc,2}$, the first symbol of the PUSCH starts earlier than the first uplink symbol where the CP starts, the base station and the terminal determine that the PUSCH preparation procedure time is not sufficient. Otherwise, the base station and the terminal determine that the PUSCH preparation procedure time is sufficient. The terminal transmits a PUSCH only when the PUSCH preparation procedure time is sufficient, and when the PUSCH preparation procedure time is insufficient, the terminal may ignore the DCI for scheduling the PUSCH.

PUSCH repetition transmission is described in greater detail below. When the terminal is scheduled for PUSCH transmission in DCI format 0_1 in a PDCCH including CRC scrambled by C-RNTI, MCS-C-RNTI, or CS-RNTI, and the terminal is configured with higher layer signaling pusch-AggregationFactor, the same symbol allocation is applied in consecutive slots as many as pusch-AggregationFactor, and PUSCH transmission is limited to single rank transmission. For example, the terminal should repeat the same TB in consecutive slots as many as pusch-AggregationFactor, and apply the same symbol allocation to each slot. Table 26 shows the redundancy version applied to PUSCH repetition transmissions for each slot. When the terminal is scheduled, through DCI format 0_1, for PUSCH repetition transmission in a plurality of slots, and at least one symbol among slots, in which PUSCH repetition transmission is performed according to information of higher layer signaling tdd-UL-DL-ConfigurationCommon or tdd-UL-DL-Configuration-Dedicated, is indicated as a DL symbol, the terminal does not perform PUSCH transmission in a slot in which the corresponding symbol is located.

TABLE 26

| $rv_{id}$ indicated by the DCI | $rv_{id}$ to be applied to $n^{th}$ transmission occasion | | | |
|---|---|---|---|---|
| scheduling the PUSCH | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

PUSCH: Related to Repetition Transmission

Repetition transmission of an uplink data channel in a 5G system is described in greater detail below. The 5G system supports two types that are PUSCH repetition transmission type A and PUSCH repetition transmission type B, as a repetition transmission method of a uplink data channel. The terminal may be configured with one of PUSCH repetition transmission type A or B through higher layer signaling.

PUSCH Repetition Transmission Type A

As described above, as a time domain resource allocation method in one slot, a symbol length and a position of a start symbol of an UL data channel may be determined, and the BS may notify the terminal of the number of times of repetition transmission via higher layer signaling (e.g., RRC signaling) or L1 signaling (e.g., DCI).

The terminal may repeatedly transmit the same UL data channel in consecutive slots of a repetition transmission interval identified based on a length of the UL data channel configured based on the start symbol and the number of times of repetition transmission. Here, when a slot is configured by the BS for the terminal as downlink in a repetition transmission interval or when there is at least one symbol configured as downlink among symbols of the UL data channel configured for the terminal, the terminal omits transmission of the UL data channel in the corresponding slot or symbol, but counts the number of times of repetition transmission of the uplink data channel.

PUSCH Repetition Transmission Type B

As described above, as a time domain resource allocation method in one slot, a start symbol and length of an UL data channel may be determined, and the BS may notify the terminal of the number of times of repetition transmission (numberofrepetitions) via higher layer signaling (e.g., RRC signaling) or L1 signaling (e.g., DCI).

A nominal repetition of the UL data channel is determined as below, based on the previously configured start symbol and length of the uplink data channel. A slot in which an nth nominal repetition is started is given by $$K_s + \left\lfloor \frac{S + n \cdot L}{N_{symb}^{slot}} \right\rfloor,$$

and a symbol starting in the slot is given by $$\mathrm{mod}\left(S + n \cdot L,\ N_{symb}^{slot}\right).$$

A slot in which the nth nominal repetition is ended is given by $$K_s + \left\lfloor \frac{S + (n+1) \cdot L - 1}{N_{symb}^{slot}} \right\rfloor,$$

and a symbol ending in the slot is given by $$\mathrm{mod}\left(S + (n+1) \cdot L - 1,\ N_{symb}^{slot}\right).$$

Here, n=0, . . . , numberofrepetitions-1, where S indicates a start symbol of a configured UL data channel, and L indicates a symbol length of the configured uplink data channel. $K_s$ indicates a slot in which PUSCH transmission starts, and $$N_{symb}^{slot},$$

indicates the number of symbols per slot.

The terminal may determine a certain OFDM symbol as an invalid symbol in the following cases for PUSCH repetition transmission type B.

1. A symbol configured as downlink by tdd-UL-DL-ConfigurationCommon or tdd-UL-DL-ConfigurationDedicated may be determined as an invalid symbol for the PUSCH repetition transmission type B.

2. For SSB reception in unpaired spectrum (TDD spectrum), symbols indicated by ssb-PositionsInBurst in SIB1 or ssb-PositionsInBurst in ServingCellConfigCommon, which is higher layer signaling, may be determined as invalid symbols for PUSCH repetition transmission type B.

3. In order to transmit a CORESET associated with the Type0-PDCCH CSS set in an unpaired spectrum (TDD spectrum), the symbols indicated through pdcch-ConfigSIB1 in the MIB may be determined as invalid symbols for PUSCH repetition transmission type B.

4. In an unpaired spectrum (TDD spectrum), when numberOfInvalidSymbolsForDL-UL-Switching, which is higher layer signaling, is configured, symbols corresponding to numberOfInvalidSymbolsForDL-UL-Switching from symbols configured as downlink by tdd-UL-DL-Configuration-Common or tdd-UL-DL-ConfigurationDedicated may be determined as invalid symbols.

Additionally, an invalid symbol may be configured by a higher layer parameter (e.g., InvalidSymbolPattern). The higher layer parameter (e.g., InvalidSymbolPattern) may provide a symbol level bitmap extending over one slot or two slots, thereby configuring the invalid symbol. When the bitmap indicates 1, 1 indicates the invalid symbol. In addition, a period and pattern of the bitmap may be configured by a higher layer parameter (e.g., periodicityAndPattern). When the higher layer parameter (e.g., InvalidSymbolPattern) is configured, and InvalidSymbolPatternIndicator-ForDCIFormat0_1 parameter or InvalidSymbolPatternIndicator-ForDCIFormat0_2 parameter indicates 1, the terminal applies an invalid symbol pattern, and when the parameter indicates 0, the terminal does not apply the invalid symbol pattern. When the higher layer parameter (e.g., InvalidSymbolPattern) is configured, and InvalidSymbolPatternIndicator-ForDCIFormat0_1 parameter or InvalidSymbolPattern-Indicator-ForDCIFormat0_2 parameter is not configured, the terminal applies the invalid symbol pattern.

After the invalid symbol is determined, the terminal may consider, with respect to each nominal repetition, other symbols than the invalid symbols as valid symbols. When one or more valid symbols are included in each nominal repetition, nominal repetition may include one or more actual repetitions. Here, each actual repetition may include a set of consecutive valid symbols being usable in one slot for the PUSCH repetition transmission type B. When a length of an OFDM symbol of nominal repetition is not 1, and when a length of actual repetition becomes 1, the terminal may ignore transmission for the corresponding actual repetition.

Figure 11:
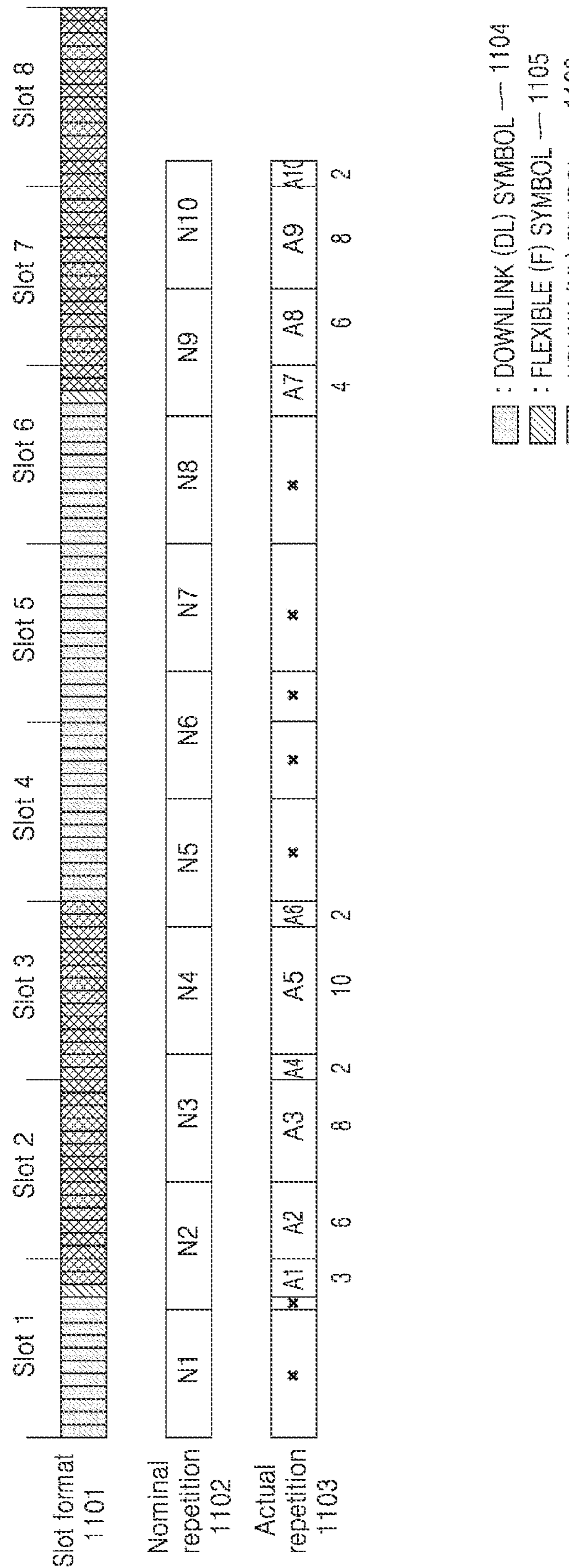
FIG. 11 illustrates an example of physical uplink shared channel (PUSCH) repetition type B, according to an embodiment.

FIG. 11 illustrates an example of PUSCH repetition type B, according to an embodiment.

In FIG. 11, an example is shown, in which, for nominal repetition, the terminal may be configured with a transmission start symbol S set to 0, a transmission symbol length L set to 10, and the number of times of repetition transmissions set to 10, and in the drawing, the nominal repetitions may be expressed as N1 to N10 1102. Here, the terminal may determine actual repetition by determining the invalid symbol in consideration of a slot format 1101, and the actual repetitions may be expressed as A1 to A10 in the drawing 1103. Here, according to the above-described invalid symbol and actual repetition determination method, PUSCH repetition type B is not transmitted in a symbol whose slot format is determined to be downlink (DL) 1104, and when there is a slot boundary within nominal repetition, nominal repetition may be divided into two actual repetitions with respect to the slot boundary to be transmitted. For example, A1, which means first actual repetition, consists of three OFDM symbols, and A2 that may be transmitted thereafter may consist of six OFDM symbols.

In addition, with respect to PUSCH repetition transmission, in NR Release 16, additional methods may be defined for UL grant-based PUSCH transmission and configured grant-based PUSCH transmission beyond the slot boundary.

Method 1 (mini-slot level repetition): Through one UL grant, two or more PUSCH repetition transmissions are scheduled within one slot or beyond the boundary of consecutive slots. Also, for Method 1, time domain resource allocation information in DCI indicates a resource of a first repetition transmission. In addition, time domain resource information of the first repetition transmission and time domain resource information of the remaining repetition transmissions may be determined according to an UL or DL direction determined for each symbol of each slot. Each repetition transmission occupies consecutive symbols.

Method 2 (multi-segment transmission): Two or more PUSCH repetition transmissions are scheduled in consecutive slots through one UL grant. Here, one transmission is designated for each slot, and different start points or repetition lengths may be different for each transmission. Also, in Method 2, time domain resource allocation information in DCI indicates a start point and a repetition length of all repetition transmissions. In addition, in the case when repetition transmission is performed in a single slot through Method 2, when there are multiple bundles of consecutive UL symbols in the corresponding slot, each repetition transmission is performed for each bundle of UL symbols. When a bundle of consecutive UL symbols is uniquely present in the corresponding slot, one PUSCH repetition transmission is performed according to the scheme of NR Release 15.

Method 3: Two or more PUSCH repetition transmissions are scheduled in consecutive slots through two or more UL grants. Here, one transmission is designated for each slot, and the n-th UL grant may be received before PUSCH transmission scheduled with the (n−1)-th UL grant ends.

Method 4: Through one UL grant or one configured grant, one or several PUSCH repetition transmissions may be supported in a single slot, or two or more PUSCH repetition transmissions may be supported across the boundary of consecutive slots. The number of times of repetitions indicated by the base station to the terminal is only a nominal value, and the number of times of PUSCH repetition transmissions actually performed by the terminal may be more than a nominal number of repetitions. The time domain resource allocation information in DCI or in a configured grant refers to a resource of the first repetition transmission indicated by the base station. Time domain resource information of the remaining repetition transmissions may be determined by referring to at least the resource information of first repetition transmission or the UL or DL direction of the symbols. When the time domain resource information of the repetition transmission indicated by the base station spans the slot boundary or includes an UL/DL switching point, the repetition transmission may be divided into a plurality of repetition transmissions. Here, one repetition transmission may be included for each uplink period in one slot.

In an embodiment, a transmitting/receiving end structure in a special form for effectively processing self-interference between a transmission signal (or a DL signal) and a reception signal (or an UL signal) may be required. For example, the transmitting/receiving end structure illustrated in FIG. 9 may be considered. In the structure of the transmitting end and the receiving end, illustrated in FIG. 9, various methods may be used to process the self-interference described above. As an example, the DPD unit 911 of the transmitting end pre-distorts the transmission signal 901 in a digital domain, thereby minimizing leakage power emitted to an adjacent band (which may correspond to, for example, adjacent carrier leakage (ACL, 1005) shown in FIG. 10). As another example, the SIC unit 921 of the transmitting end may perform a function of removing, from the received signal, a transmission signal that is self-interference received at the receiving end. In addition, various transmission/reception techniques for effective interference control may be applied. Here, in order to effectively process the interference between the transmitting and receiving ends in the base station device or the terminal device, it is necessary to set the parameter values of the respective transmitting/receiving end units to certain values. Here, optimal parameter values of the respective transceiver units for effectively processing interference may be different depending on the UL and DL transmission resource patterns, and accordingly, when the UL and DL transmission resource patterns are different, in each device, there may be a latency of a certain amount of time for switching the pattern.

Various embodiments of configuring resources for UL and DL transmission/reception in time and frequency domains are provided, and a method of carrying out a switch from certain UL and DL transmission/reception resource patterns to different uplink and downlink transmission/reception resource patterns is provided.

Higher layer signaling may be signaling corresponding to at least one or a combination of one or more of the following.

MIB
SIB or SIB X (X=1, 2, . . . )
RRC
MAC (Medium Access Control) CE (Control Element)
UE Capability Reporting
UE assistance information message Also, L1 signaling may be signaling corresponding to at least one or one or more combinations of physical layer channels or signaling methods below.

PDCCH
DCI
UE-specific DCI
Group common DCI
Common DCI
Scheduling DCI (for example, DCI used for the purpose of scheduling downlink or uplink data)
Non-scheduling DCI (for example, DCI which is not for the purpose of scheduling downlink or uplink data)
PUCCH (Physical Uplink Control Channel)
UCI (Uplink Control Information) Resource configuration method in XDD According to an embodiment, a method and apparatus are provided for configuring resources for transmission/reception of UL or DL in a time domain and a frequency domain through cell-specific configuration information in an XDD system. According to the method of configuring resources for UL or DL transmission and reception, the terminal may be configured with UL resources and DL resources in different frequency domains within the same time domain. Accordingly, time domain resources whereby the terminal may perform UL transmission or DL reception may increase, and accordingly, UL coverage of the terminal and the base station may be improved as described above. Hereinafter, for convenience of description, configuration of resources for UL or DL transmission/reception will be referred to as UL-DL configuration.

In detail, as described above, in the XDD system, because the terminal may be allocated with resources for UL and DL transmission and reception in a separate manner not only in a time domain but also in a frequency domain, like in the TDD system, configuration of resources for UL or DL transmission or reception may be configured not only in a time domain but also in the time domain and the frequency domain, respectively. The base station may configure, for the terminal, a guard band through resource configuration for UL or DL transmission and reception in the time domain and the frequency domain as described above, thereby controlling the effect of interference due to out-of-band (OOB) emission caused as the frequency bands of the UL and DL resources are relatively close to each other compared to FDD. In addition, even when the UL BWP and the DL BWP have the same center frequency through resource configuration for uplink or downlink transmission and reception in the time domain and the frequency domain, the terminal may determine in which frequency band scheduling is carried out and transmission and reception is performed.

Hereinafter, an UL or DL configuration method in a time domain and a frequency domain of an XDD system is provided.

The following methods may be considered as a resource configuration method for uplink or downlink transmission and reception in the time domain and the frequency domain of the XDD system.

In a first method, the base station divides the entire frequency band into n pieces for resource configuration for UL or DL transmission/reception in the time domain and the frequency domain to the terminal (a method of dividing into n pieces is proposed in a second embodiment), and indicates, to the terminal, UL-DL configuration in the time domain for each frequency band. Each of the n frequency bands may be composed of a group of consecutive resource blocks, which may be referred to as a resource block set (RBS) or a RBG, and for convenience of description, it is described as RBS in the disclosure. In each frequency band, UL-DL configuration information may include UL-DL pattern information and reference subcarrier information. In the UL-DL pattern information, a pattern periodicity in a time domain, a number of consecutive downlink slots from a start point of each pattern, a number of symbols of a next slot thereto, a number of consecutive UL slots from an end of the pattern, and a number of symbols of a next slot thereto may be indicated. Here, slots and symbols not indicated as UL or DL may be determined as flexible slots/symbols.

FIG. 12 illustrates UL-DL configuration in a time domain and a frequency domain in an XDD system, according to an embodiment.

Referring to FIG. 12, the entire frequency band 1204 is divided into n=4 RBSs 1210, 1220, 1230, and 1240, and UL-DL in each time domain is configured for each RBS. For example, a pattern periodicity of RBS 1 1210 may be five slots (1215, or 5 ms based on subcarrier spacing of 15 kHz), the number of DL slots consecutive from a start point of the pattern may be configured to three slots 1211, the number of DL symbols in a next slot 1201 thereto may be configured to four symbols 1212, the number of consecutive UL slots from an end of the pattern may be configured to one slot 1213, and the number of UL symbols of a next slot 1201 thereto may be configured to three symbols 1214. The UL-DL configuration of RBS 2 1220 may be the same as that of RBS 1 1210. For example, a pattern periodicity of RBS 1 1220 may be five slots (1225, or 5 ms based on subcarrier spacing of 15 kHz), the number of DL slots consecutive from a start point of the pattern may be configured to three slots 1221, the number of DL symbols in a next slot 1201 thereto may be configured to four symbols 1222, the number of consecutive UL slots from an end of the pattern may be configured to one slot 1223, and the number of UL symbols of a next slot 1201 thereto may be configured to three symbols 1224. An UL-DL pattern periodicity of RBS 3 1230 may be two slots 1235, or 2 ms based on subcarrier spacing of 15 kHz, the number of consecutive DL slots from a start point of the pattern may be configured to 0 slots, the number of DL symbols in a next slot thereto may be configured to six symbols 1232, the number of consecutive UL slots from an end of the pattern may be configured to one slot 1233, and the number of UL symbols of a next slot 1201 thereto may be configured to four symbols 1234. Finally, an UL-DL pattern periodicity of RBS 4 1240 may be two slots 1245, or 2 ms based on subcarrier spacing 15 kHz, the number of consecutive DL slots from a start point of the pattern may be configured to 0 slots, the number of DL symbols in a next slot 1201 thereto may be configured to 0 symbols, the number of consecutive UL slots from an end of the pattern may be configured to two slots 1243, and the number of UL symbols of a next slot 1201 thereto may be configured to 0 symbols.

For UL-DL configuration, as UL-DL is configured for each RBS within a limited overhead, UL resources 1207 or DL resources 1205 may be relatively flexibly configured in the time domain.

In a second method, the base station indicates the terminal to configure the UL-DL in a frequency domain by dividing the entire frequency band into n pieces when configuring the UL-DL in a time domain and the frequency domain. In each of the patterns, UL-DL configuration information may include UL-DL pattern information and reference subcarrier information. In the UL-DL pattern information, the number of slot(s)/symbol(s) that are in the time domain and have the same pattern, the number of consecutive downlink RBSs from a start point of the entire frequency band, the number of downlink RBs of the next RBS, the number of consecutive uplink RBSs from an end of the entire frequency band, and the number of uplink RBs of the next RBS may be indicated. Here, RBS and RB not indicated as UL and DL may be determined as flexible RBS/RB 1206.

Figure 13:
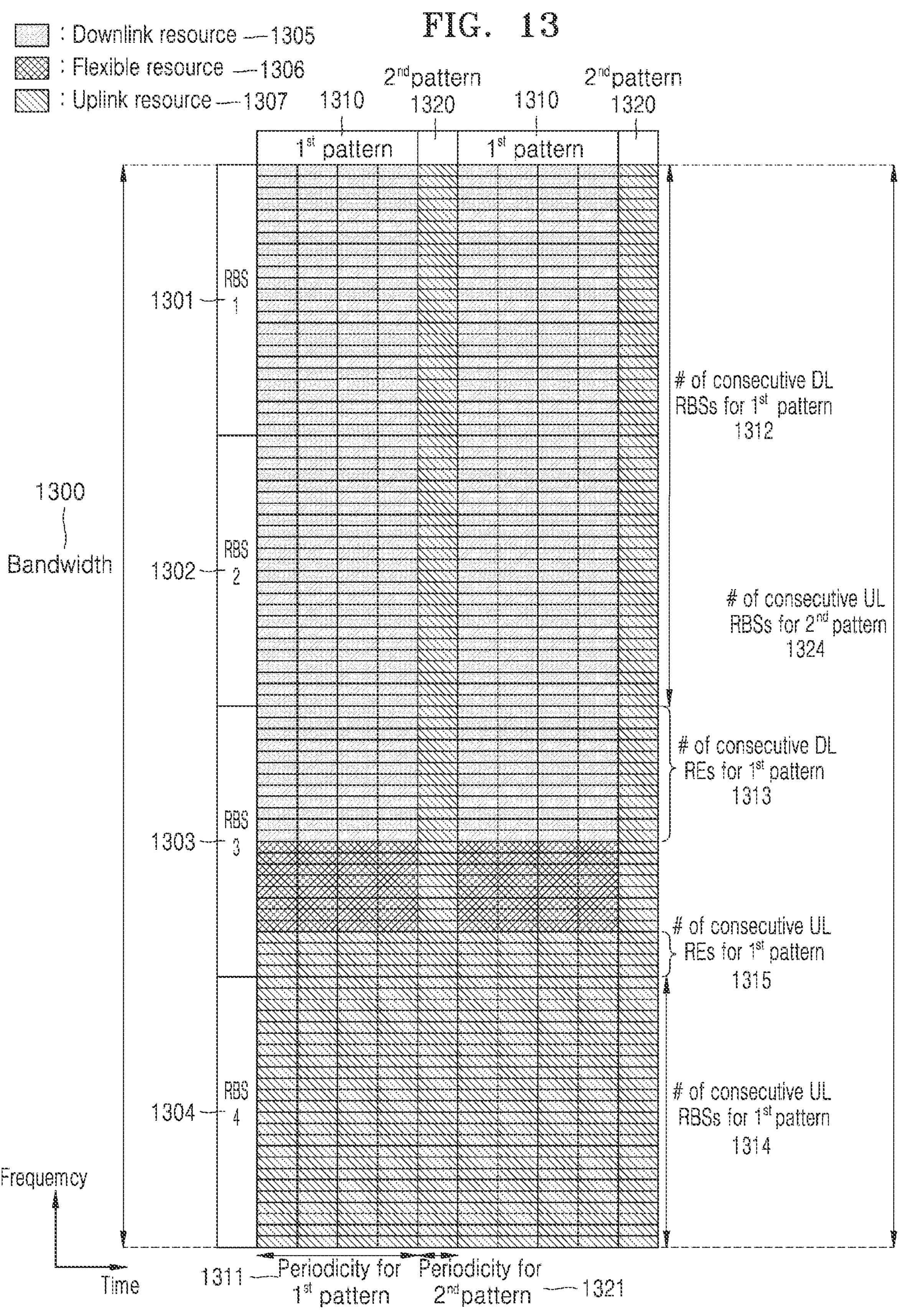
FIG. 13 illustrates uplink-downlink configuration in time and frequency domains in cross division duplex (XDD) systems, according to an embodiment.

FIG. 13 illustrates UL-DL configuration of time and frequency in an XDD system, according to an embodiment.

Referring to FIG. 13, by dividing an entire frequency band 1300 into n=4 RBSs 1301, 1302, 1303, and 1304, 24 RBs are included in each RBS, and a flexible resource 1306, UL resource 1307 and DL resource 1305 in a frequency domain are established for each pattern. For example, a periodicity of a first pattern 1310 is four slots 1311, or 4 ms based on subcarrier spacing of 15 kHz, the number of consecutive DL RBSs from a start point of the entire frequency band may be configured to two RBSs 1312, and the number of DL RBs of the next RBS may be configured to twelve RBs 1313, the number of consecutive UL RBSs from an end of the entire frequency band may be configured to one RBS 1314, and the number of UL RBs of the next RBS may be configured to four RBs 1315. A periodicity of a second pattern 1320 may be one slot 1321, or 1 ms based on subcarrier spacing of 15 kHz, and the number of consecutive UL RBSs from an end of the entire frequency band may be configured to four RBSs 1324.

Because UL-DL is configured in the frequency domain with a periodicity of the time domain for each pattern within a limited overhead for UL-DL configuration, UL or DL may be configured relatively flexibly in the frequency domain. Here, in the XDD system, a guard band may be efficiently configured as a measure for reducing an interference of an UL channel or signal reception, by out-of-band emission that occurs when a base station transmits a downlink channel or a signal in a DL resource.

Frequency Band Identifying Method in XDD System

According to an embodiment, a method is provided for dividing an entire frequency band into n pieces. In detail, instead of dividing UL and DL resources only in time like in the TDD system, in the XDD system, it is necessary to divide frequency resources into certain units in order to configure UL-DL resources. In particular, when the entire frequency band is 100 MHZ, and a subcarrier spacing is 30 kHz, the frequency band may be composed of 273 RBs. In this case, when each of the 273 RBs is configured as an uplink or downlink resource, significant overhead may occur.

Accordingly, the following methods may be considered as a method of dividing a frequency band into groups for UL-DL configuration of a time domain and a frequency domain in the XDD system.

In a first method, RBs of a frequency band may be composed of n groups of RBs of a certain number. The number of RBs per group may be composed of n groups through UL-DL pattern configuration or based on a mutually agreed number in advance. For example, when the subcarrier spacing (SCS) is 30 kHz and the entire frequency band is 100 MHz, the total number of RBs is 273. Here, the number of RBs per group is 24, which is included in the UL-DL pattern configuration and indicated, or when the mutually agreed number is set to 24, a total of n groups may be formed.

$$\left(\text{Herein, } n \text{ (the total number of groups)} = \left\lceil \frac{\text{the total number of } RBs}{\text{the number of } RBs \text{ per group}} \right\rceil = \lceil 273/24 \rceil = 12\right).$$

This may be efficiently determined in order to reduce overhead for UL-DL configuration in the frequency domain as described above.

The method is for configuring RBs of a frequency band into n groups of a certain number of RBs, and the number of RBs configured for each group is not limited to that determined by UL-DL pattern configuration or a mutually agreed value, and information necessary for configuring the number of RBs per group may also be included in system information block, user-specific configuration information through dedicated higher layer signaling, MAC CE, or downlink control information which is L1 signaling.

In a second method, an entire frequency band may be composed of n groups of a certain frequency band. A certain frequency band value for each group may be configured into n groups through UL-DL pattern configuration or based on a mutually agreed number. For example, when the entire frequency band is 100 MHz and a frequency band for each group is 20 MHz and included in the UL-DL pattern configuration and indicated, or when a mutually agreed frequency band is configured to 20 MHz, a total of n groups may be configured.

$$\left(\text{Herein, } n \text{ (the total number of groups)} = \left\lceil \frac{\text{the entire frequency band}}{\text{the frequency band for each group}} \right\rceil = \lceil 100/20 \rceil = 5\right).$$

This may be efficiently determined in order to reduce overhead for UL-DL configuration in the frequency domain as described above.

The method is for configuring a frequency band into n groups of a certain frequency band, and the method of receiving a configuration with a frequency band value for each group is not limited to configuring an UL-DL pattern, and the frequency band value for each group may be configured to a mutually agreed number of RBs, or information necessary for configuring the frequency band value per group may also be included in system information block, user-specific configuration information through dedicated higher layer signaling, MAC CE, or downlink control information which is L1 signaling.

An entire frequency band may be composed of two groups with respect to a GB. A frequency band of the GB may be indicated through UL-DL pattern configuration, and two groups, that is, a lower frequency band lower than the GB and a higher frequency band may be configured with respect to the GB. For example, when a starting position and size of the GB in the entire frequency band of 100 MHz is configured to 50 CRBs based on the 100th CRB as a starting point with respect to Point A, from Point A to the $99^{th}$ CRB, which is a frequency band lower than the GB, may be identified as a first group, and from $150^{th}$ CRBs to the last CRB may be identified as a second group. This may be efficiently determined in order to reduce overhead for UL-DL configuration in the frequency domain as described above. In particular, it is very difficult for a base station to allocate resources such that DL or UL is not continuous at the same time point, and as described above, interference by OOB may occur between UL and DL. Thus, when DL or UL is to be always continuously configured, two groups may be efficiently grouped by a GB configured between the DL and the UL.

The method is for configuring a frequency band as two groups based on a frequency band, and a method of receiving a configuration related to a GB is not limited to configuring an UL-DL pattern, and the GB may be configured to a previously mutually agreed RB number, or information used in configuring the GB may be included in system information block, user-specific configuration information via dedicated higher layer signaling, MAC CE, or downlink control information which is L1 signaling.

UL-DL Configuration Method in XDD

According to an embodiment, UL and DL resources may be flexibly configured in time and frequency domains. That is, arbitrary time and frequency resources may be configured as UL or DL. Hereinafter, an UL or DL configuration in arbitrary time and frequency resources will be referred to as "UL-DL configuration (UL_DL_Configuration)". The UL-DL configuration may include a DL symbol, an UL symbol, a flexible symbol, and the like.

The UL-DL configuration may be statically, semi-statically, or dynamically modified. The BS may configure or indicate the terminal to configure UL-DL configuration information through higher layer signaling or L1 signaling, or a combination of higher layer signaling and L1 signaling, or the like. For example, the BS may perform UL-DL configuration for the terminal through higher layer signaling. As another example, the BS may configure one or more UL-DL configurations for the terminal through higher layer signaling, and may activate one of the UL-DL configurations, through higher layer signaling (for example, MAC CE) or L1 signaling. The terminal may obtain UL-DL configuration information from the BS, expect to receive a signal in a resource configured for DL, and expect to transmit a signal from a resource configured for UL. Various, specific methods of UL-DL configuration may follow, for example, the embodiments described above.

The UL-DL configuration may be switched based on L1 signaling (e.g. DCI). In detail, the BS may transmit, to the terminal through a PDCCH, a DCI format including an indicator for changing any UL-DL configuration A to any UL-DL configuration B. The terminal may receive a DCI format including an indicator for switching the UL-DL configuration from the BS, and may switch any uplink configuration A to any uplink configuration B based on details indicated by the received DCI format.

A table consisting of a plurality of UL-DL configurations for switching the UL-DL configuration may be predefined or configured by a BS for a terminal through higher layer signaling. For example, an "UL-DL configuration table" consisting of N UL-DL configurations, {UL-DL configuration #1, UL-DL configuration #2, UL-DL configuration #3, . . . , UL-DL configuration #N} may be predefined or configured by a BS for a terminal through higher layer signaling. The BS may transmit an indicator for activating any UL-DL configuration #X in the UL-DL configuration table to the terminal through L1 signaling (e.g., DCI format). The terminal may activate UL-DL configuration #X indicated by L1 signaling (e.g., DCI format) received from the BS based on a predefined or preset UL-DL configuration.

When the UL-DL configuration is switched, an additional switch delay time (Tdelay) may be considered. As described above, optimal parameter values of each of transmitting and receiving end blocks for effectively processing interference between DL and UL may be different depending on UL and DL transmission resource patterns, and accordingly, a certain period of delay time ($T_{delay}$) for changing the transmitting and receiving end parameter values may occur according to a switch in the UL-DL configuration.

Figure 14:
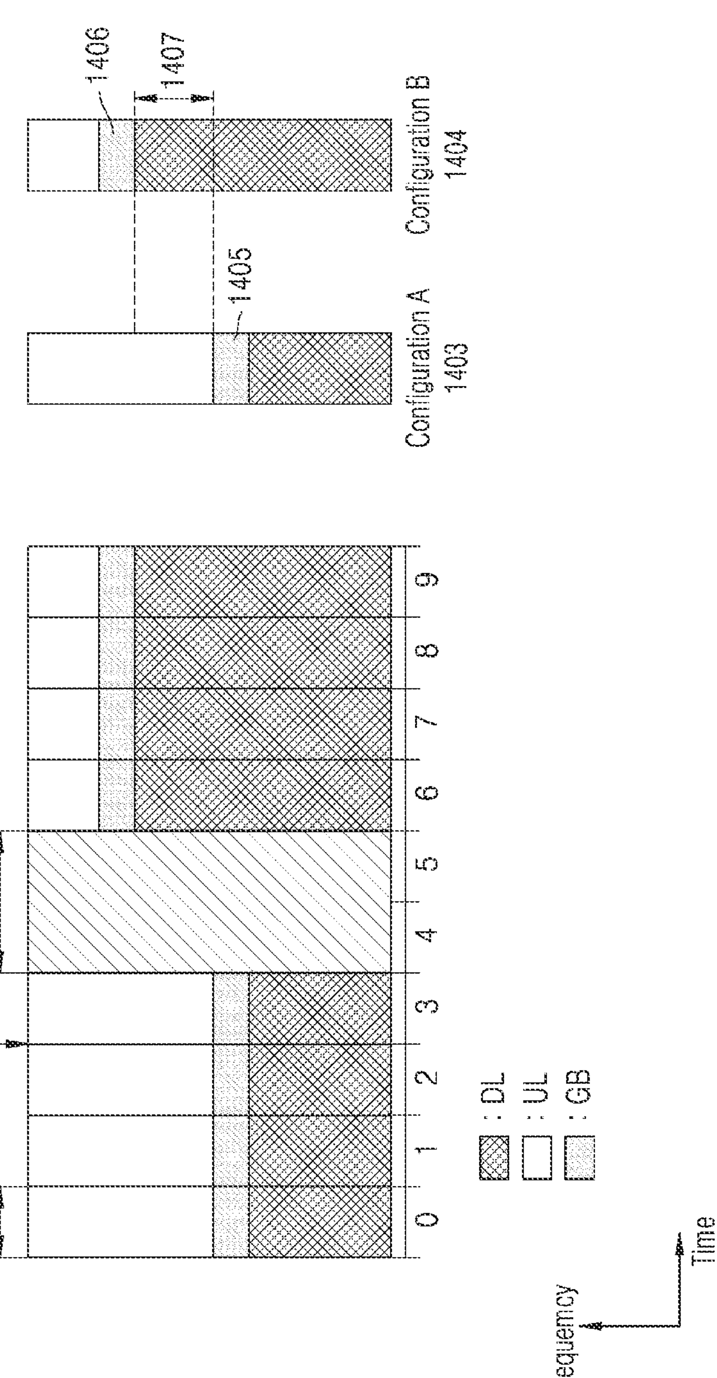
FIG. 14 illustrates an example of an uplink-downlink configuration switch, according to an embodiment.

FIG. 14 illustrates an example of an UL-DL configuration switch, according to an embodiment.

In FIG. 14, a configuration switch is generated between an arbitrary UL-DL configuration A 1203 and an arbitrary UL-DL configuration B 1404. A resource unit of a time domain may be a symbol, a slot, 1430 or various other time units (e.g., mini-slot), and in the example of FIG. 14, a slot unit is assumed. In the example of FIG. 14, an operation performed by the BS, of transmitting an UL-DL configuration switch indicator 1410 to the terminal in slot 3, and switching the UL-DL configuration from the UL-DL configuration A 1403 to the UL-DL configuration B 1404 is shown. Here, in order to switch the UL-DL configuration from the UL-DL configuration A 1403 to the UL-DL configuration B 1404, a switch time period corresponding to Tdelay 1420 may be required. That is, the BS may transmit the configuration switch indicator 1410 in any slot n to switch the UL-DL configuration, and may be operated based on the UL-DL configuration switched from a time point after slot n+$T_{delay}$. When the terminal receives the UL configuration switch indicator from the base station in slot n, the terminal may operate based on the UL configuration changed from the time point after slot n+$T_{delay}$.

The switch delay time $T_{delay}$ 1420 may be considered limitedly when a special "condition A" is satisfied. That is, when the condition A is satisfied, the $T_{delay}$ 1420 may have a value greater than 0, and when the condition A is not satisfied, the $T_{delay}$ 1420 may be 0. For example, when at least one of the following conditions or a combination of one or more conditions is satisfied, the $T_{delay}$ 1420 may be considered.

As a first condition, when the UL and DL directions in a specific frequency domain resource are switched in the UL-DL configuration A before the switch and the UL-DL configuration B after the switch, a switch delay time Tdelay may be required. For example, in detail, in the example of FIG. 14, when the UL-DL configuration A 1403 is changed to the UL-DL configuration B 1404, a specific frequency domain resource 1407 may be switched from the UL to the DL. As described above, when a direction switch between UL and DL occurs in the frequency domain resource, the switch delay time $T_{delay}$ 1420 may be required. When a direction switch between UL and DL occurs in the frequency domain, because the state of interference between UL and DL may be different from before, a switch delay time $T_{delay}$ may be required, which is an additional time for setting a parameter value of the transmitting and receiving ends to an optimal value in the base station or the terminal device.

As a second condition, when a GB is switched in the UL-DL configuration A before the switch and the UL-DL configuration B after the switch (e.g., when a position or size of the GB is changed), a switch delay time $T_{delay}$ may be required. For example, in detail, in the example of FIG. 14, positions 1405 and 1406 of the GB may be different between the UL-DL configuration A 1403 before the switch and the UL-DL configuration B 1404 after the switch, respectively, and in this case, a switch delay time $T_{delay}$ 1420 may be required. The required size and location of the guard band in the UL-DL configuration may be different depending on the interference between UL and DL. That is, configuration information for the GB may also be different according to the UL-DL configurations, and a change in the GB configuration may indicate that the interference conditions between UL and DL are different. Thus, when the GB is also changed along with the switch in the UL-DL configurations, it may mean that the UL and DL interference state is different from the one before, and thus, the additional switch delay time $T_{delay}$ may be required to set a parameter value of the transmitting and receiving ends to an optimal value in a base station or a terminal device.

As a third condition, when the UL-DL configuration A before the switch corresponds to a certain UL-DL configuration X, the switch delay time $T_{delay}$ 1420 may be required. A certain UL-DL configuration X may be predefined, or may be explicitly preset by the BS through higher layer signaling to the terminal, or may be implicitly determined by other system parameters. There may be one or a plurality of certain UL-DL configurations X, and when there are a plurality of UL-DL configurations X, the plurality of UL-DL configurations may constitute an UL-DL configuration X set. In this case, when the UL-DL configuration A before the switch corresponds to any UL-DL configuration in the UL-DL configuration X set, a switch delay time may be required.

As a fourth condition, when the UL-DL configuration B after the switch corresponds to a certain UL-DL configuration Y, the switch delay time $T_{delay}$ 1420 may be required. A certain UL-DL configuration Y may be predefined, or may be explicitly preset by the base station through higher layer signaling to the terminal, or may be implicitly determined by other system parameters. There may be one or a plurality of certain UL-DL configurations Y, and when there are a plurality of UL-DL configurations Y, the plurality of UL-DL configurations may constitute an UL-DL configuration Y set. In this case, when the UL-DL configuration B after the switch corresponds to any UL-DL configuration in the UL-DL configuration Y set, a switch delay time may be required.

As a fifth condition, when the UL-DL configuration A before the switch corresponds to a certain UL-DL configuration X, and the UL-DL configuration B after the switch corresponds to a certain UL-DL configuration Y, the switch delay time $T_{delay}$ 1420 may be required. The certain UL-DL configuration X and the certain UL-DL configuration Y may be predefined, or may be explicitly preset by the BS through higher layer signaling to the terminal, or may be implicitly determined by other system parameters. There may be one or a plurality of each of the certain UL-DL configurations X and the certain UL-DL configurations Y, and when there are a plurality of these, each of the plurality of UL-DL configurations may constitute an UL-DL configuration X set and an UL-DL configuration Y set. In this case, the UL-DL configuration A before the switch may correspond to an arbitrary UL-DL configuration in the UL-DL configuration X set, and the UL-DL configuration B after the switch may correspond to an arbitrary UL-DL configuration in the UL-DL configuration Y set.

The switch delay time $T_{delay}$ 1420 may always be considered when a switch in the UL-DL configuration occurs. That is, the switch delay time $T_{delay}$ may always be required regardless of whether the condition A described above is satisfied.

A value of the UL and DL switch delay time Tdelay may be predefined as a fixed value. The base station and the terminal may determine the value of the switch delay time based on a predefined $T_{delay}$.

The value of the UL and DL switch delay time $T_{delay}$ may be explicitly configured or notified from the BS to the terminal through higher layer signaling. The terminal may determine the value of the switch delay time based on the $T_{delay}$ notified from the base station.

The value of the UL and DL switch delay time $T_{delay}$ may be notified from the terminal to the BS through UE capability signaling. The BS may determine the switch delay time based on the value of $T_{delay}$ notified from the terminal.

Values of the UL and DL switch delay time $T_{delay}$ may be defined as different values according to a subcarrier spacing value. That is, $T_{delay}$,i may be defined for a subcarrier spacing (i). For example, when a subcarrier spacing is 15 kHz, $T_{delay,0}$ may be required, when the subcarrier spacing is 30 kHz, $T_{delay,1}$ may be required, when the subcarrier spacing is 60 kHz, $T_{delay,2}$ may be required, and when the subcarrier spacing is 120 kHz, $T_{delay,3}$ may be required.

The values of the UL and DL switch delay time $T_{delay}$ may be defined as the same value regardless of the subcarrier spacing value.

The value of the UL and DL switch delay time $T_{delay}$ may have different values according to UL-DL configuration information before or after a switch. For example, when the UL-DL configuration A1 is switched to the UL-DL configuration B1, the switch delay time $T_{delay,1}$ may be required. For example, when the UL-DL configuration A2 is switched to the UL-DL configuration B2, the switch delay time $T_{delay,2}$ may be required.

The value of UL and DL switch delay time $T_{delay}$ may have different values according to a range of switched frequency domain resource. The range of the frequency domain resource may be determined based on at least one of a band of the frequency domain resource or a size of the frequency domain resource.

The terminal may not expect transmission or reception during the UL and DL switch delay time $T_{delay}$. In detail, when the terminal receives an indicator for switching the UL-DL configuration in slot n, and the indicator corresponds to a switch requiring UL and DL switch delay time, the terminal may not expect transmission or reception from slot n to slot n+$T_{delay}$.

The UL-DL configuration switch indicator may be transmitted from a base station to a terminal by using at least one method among a common DCI (or DCI format monitored in a common search space), or a group-common DCI (or a DCI format monitored in a type-3 common search space) or a UE-specific DCI (or a DCI format monitored in a UE-specific search space) or a DCI format including scheduling or a DCI format not including scheduling.

The UL-DL configuration switch indicator may include UL-DL configuration information for one or a plurality of slots. That is, the base station may transmit, to the terminal, a configuration switch indicator indicating an UL-DL configuration for one or a plurality of slots, and the terminal may receive, from the base station, a configuration switch indicator indicating an UL-DL configuration for one or a plurality of slots.

Figure 15:
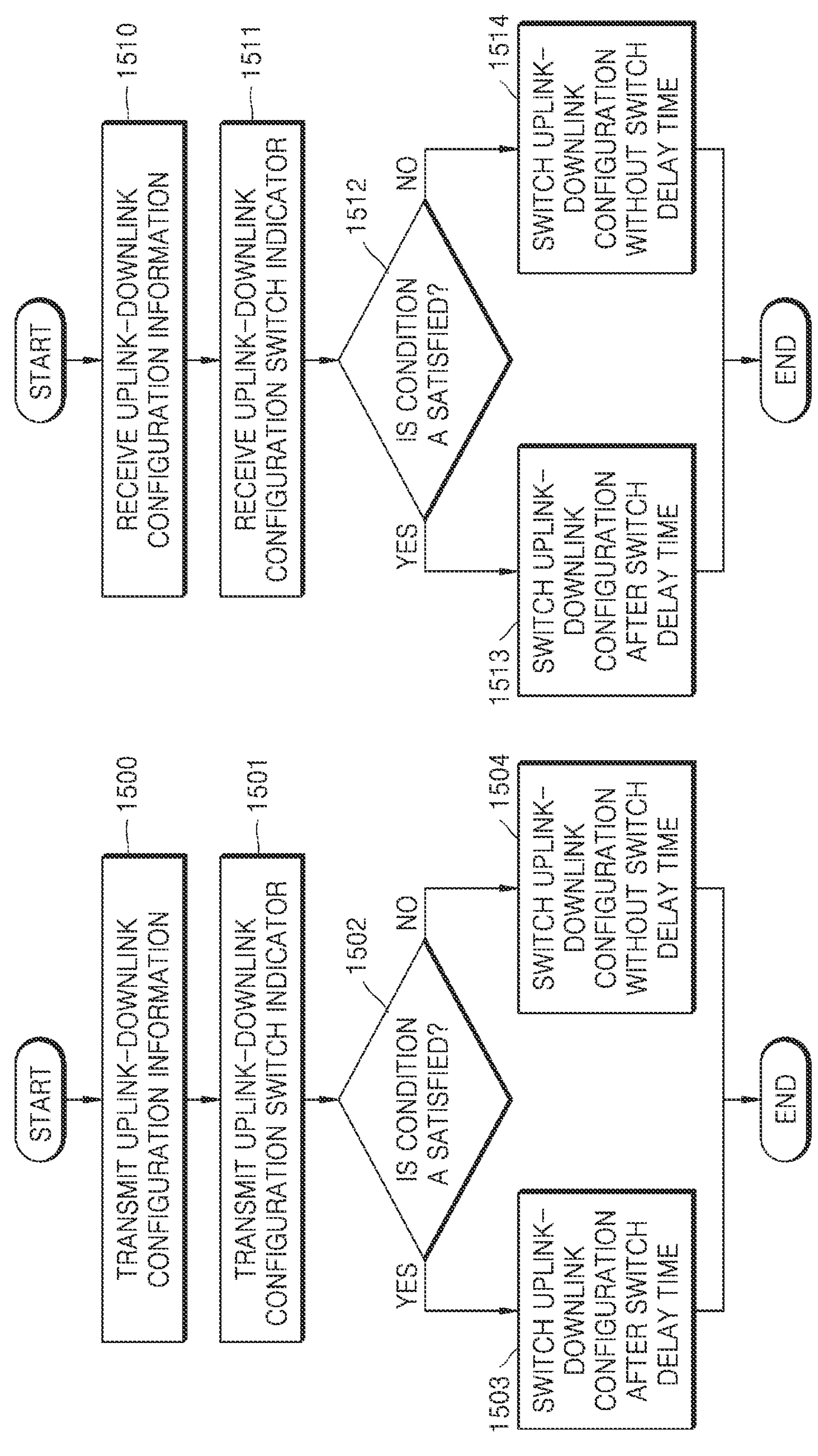
FIG. 15 illustrates base station and terminal procedures, according to an embodiment.

FIG. 15 illustrates BS and terminal procedures, according to an embodiment.

In describing a BS procedure, at 1500, the BS transmits configuration information about an UL-DL configuration to a terminal. At 1501, the BS transmits an UL-DL configuration switch indicator to the terminal. At 1502, the BS determines whether condition A is satisfied. When it is determined that condition A is satisfied, at 1503, the BS switches an UL-DL configuration by considering switch delay time. When it is determined that condition A is not satisfied, at 1504, the BS switches the UL-DL configuration without switch delay time.

In describing a terminal procedure, at 1510, the terminal receives, from the BS, configuration information about an UL-DL configuration. At 1511, the terminal receives an UL-DL configuration switch indicator from the BS. At 1512, the terminal determines whether condition A is satisfied. When it is determined that condition A is satisfied, at 1513, the terminal switches the UL-DL configuration by considering switch delay time. When it is determined that condition A is not satisfied, at 1514, the terminal switches the UL-DL configuration without switch delay time.

Method of Determining Invalid Symbol when Considering PUSCH Repetition Type B in XDD System According to an embodiment, a method of determining invalid symbols when considering PUSCH repetition type B in an XDD system is described. The terminal may consider a certain OFDM symbol as an invalid symbol when the PUSCH repetition type B is considered in the XDD system according to each of the following methods. In determining an invalid symbol, one of the following methods may be configured by the BS for the terminal via higher layer signaling, may be indicated through L1 signaling, or may be configured and indicated through a combination of higher layer signaling and L1 signaling, or a certain method may be fixedly used. Alternatively, the base station may change the configured certain method to another method through MAC-CE.

In a first method, when UL and DL resources are configured or indicated in one BWP, that is, in a case where different duplex directions (e.g., UL and DL) are configured and indicated in a same time resource through a configuration of one BWP received by the terminal, the terminal may consider, as an invalid symbol, an OFDM symbol in which all frequency resources are configured or indicated as DL or an OFDM symbol in which some resources are configured or indicated as UL and some resources are configured or indicated as DL. That is, in an OFDM symbol in which at least some frequency resources are configured or indicated as DL within the same time period, PUSCH repetition type B transmission may not be possible, and in an OFDM symbol in which all frequency resources are configured or indicated as UL within the same time period, PUSCH repetition type B transmission may be possible.

In a second method, when UL and DL resources are configured or indicated in one BWP, that is, in a case where different duplex directions (e.g., UL and DL) are configured or indicated for the same time resource through a configuration of one BWP received by the terminal, the terminal may consider, as an invalid symbol, an OFDM symbol in which all frequency resources are configured or indicated as DL. That is, in an OFDM symbol in which all frequency resources are configured or indicated as DL within the same time period, PUSCH repetition type B transmission may not be possible. Also, in an OFDM symbol in which at least some frequency resources are configured or indicated as UL within the same time period, PUSCH repetition type B transmission may be possible. Here, in all frequency resources of the OFDM symbol in which at least some frequency resources are configured or indicated as UL, PUSCH repetition type B transmission may not be valid, and some frequency resources configured or indicated as DL in the corresponding time resource may be considered as invalid resources (resource or RE), and PUSCH repetition type B transmission may be possible only in some frequency resources configured or indicated as UL in the corresponding time resource.

In a third method, when all resources in a time resource are configured or indicated as UL or DL without a situation where some frequency resources are configured as UL and some other frequency resources are configured as DL within the same time resource within one BWP, and a time ratio between UL and DL is different among different BWPs (for example, when a time ratio between UL and DL in five slots of first and second bandwidth parts is 4:1 (DDDDU) and 3:2 (DDDUU), respectively, the two BWPs may have different duplex directions in the same time resource in fourth slot), the terminal may consider, as an invalid symbol, an OFDM symbol in which all frequency resources are configured or indicated as DL within a certain BWP, and also as an invalid symbol, when some or all of frequency resources of OFDM symbols, in which all frequency resources are configured or indicated as UL within a certain BWP, overlap with an OFDM symbol in which all frequency resources are configured or indicated as DL within the same time resource of another BWP. That is, in an OFDM symbol in which all frequency resources are configured or indicated as DL within the same time period, PUSCH repetition type B transmission may not be possible, and when even an OFDM symbol in which all frequency resources are configured as UL within the same time period partially or completely overlaps an OFDM symbol configured or indicated as DL in another BWP, PUSCH repetition type B transmission may not be possible in the corresponding OFDM symbol. Also, according to another example, PUSCH repetition type B transmission may not be possible in a time resource of a preset unit, such as a slot or a mini slot including the corresponding OFDM symbol.

In a fourth method, when all resources in a time resource are configured or indicated as UL or DL in a BWP without a situation where some frequency resources are configured as UL and some other frequency resources are configured as DL within the same time resource within one BWP, and a time ratio between UL and DL is different among different BWPs (for example, when a time ratio between UL and DL in five slots of first and second bandwidth parts is 4:1 (DDDDU) and 3:2 (DDDUU), respectively, the two BWPs may have different duplex directions in the same time resource in fourth slot), the terminal may consider, as an invalid symbol, an OFDM symbol in which all frequency resources are configured or indicated as DL within a certain BWP, and may not consider as an invalid symbol, when some or all of frequency resources of OFDM symbols, in which all frequency resources are configured or indicated as UL within a certain BWP, overlap with an OFDM symbol in which all frequency resources are configured or indicated as DL within the same time resource of another BWP. That is, in an OFDM symbol in which all frequency resources are configured or indicated as DL within the same time period, PUSCH repetition type B transmission may not be possible, and when even an OFDM symbol in which all frequency resources are configured as UL within the same time period partially or completely overlaps an OFDM symbol configured or indicated as DL in another bandwidth part, PUSCH repetition type B transmission may not be possible because the corresponding overlapping frequency resource is considered as an invalid resource (resource or RE), but PUSCH repetition type B transmission may be possible for other non-overlapping frequency resources . . .

The methods described above are examples, and also when all resources in a time resource are configured or indicated as UL or DL in a BWP without a situation where some frequency resources are configured as UL and some other frequency resources are configured as DL within the same time resource within one BWP, and there are both UL and DL within the same time resource in another BWP, invalid resources may be determined based on the method described above. For example, the terminal may consider, as an invalid symbol, an OFDM symbol in which all frequency resources are configured or indicated as downlink within a certain bandwidth part, and also as an invalid symbol, when some or all of frequency resources of OFDM symbols, in which all frequency resources are configured or indicated as UL within a certain BWP, overlap with an OFDM symbol in which all or some frequency resources are configured or indicated as DL in a same time resource of another BWP.

Method of Configuring Invalid Symbol/Resource (Resource or RE) when Considering PUSCH Repetition Type B in XDD System According to an embodiment, when considering PUSCH repetition type B in the XDD system, methods of configuration through higher layer signaling of invalid symbols/resources (resource or RE), indication through L1 signaling, configuration and indication through a combination of higher layer signaling and L1 signaling are described. Through the methods below, for invalid symbols/resources (resources or REs) in the XDD system, configuration through higher layer signaling of invalid symbols/resources (resource or RE), indication through L1 signaling, configuration and indication through a combination of higher layer signaling and L1 signaling may be provided. In a method of configuring invalid symbols/resources, one type of the following methods may be configured by the BS for the terminal via higher layer signaling, may be indicated through L1 signaling, or may be configured and indicated through a combination of higher layer signaling and L1 signaling, or a certain method may be fixedly used. Alternatively, the BS may change the configured certain method to another method through MAC-CE.

In a first method, the terminal may receive a configuration for an invalid symbol from the BS through higher layer signaling. The corresponding configuration is bitmap information for one or two slots, and each bit may indicate whether each symbol constituting the slot(s) is an invalid symbol. For example, when bitmap information about one slot is "000010000010000", fifth and tenth symbols may be considered as invalid symbols and may not be used for transmission of PUSCH repetition type B. For the corresponding higher layer signaling, a period in a time resource may be configured through additional higher layer signaling configured, and a value thereof may be in units of slots, subframes, frames, and msec, and may be, for example, 20 ms. In addition, when higher layer signaling, which means that information about the corresponding invalid symbol may be dynamically indicated through DCI, the information about the corresponding invalid symbol may be dynamically indicated through a certain field in DCI or may not be indicated.

In a second method, the terminal may receive a configuration for an invalid symbol and invalid RB/RBG through higher layer signaling from the BS. The configuration may include bitmap information about one or two slots indicating an invalid symbol and bitmap information indicating invalid RB/RBG. Each bitmap may indicate whether time and frequency resources correspond to invalid resources, and the terminal may identify whether a certain frequency resource in a certain symbol through a combination of two bitmaps may be used for transmission of PUSCH repetition type B. Each bit may indicate whether each symbol constituting the slot(s) is an invalid symbol. Additionally, a period in the time resource of the invalid symbol may be configured through additional higher layer signaling, and a value thereof may be in units of slots, subframes, frames, and msec, and may be, for example, 20 ms. Also, a period in the time resource of invalid RB/RBG may be configured through additional higher layer signaling, and a value thereof may be in units of slots, subframes, frames, and msec, and may be, for example, 10 ms. Also, a period in the frequency resource of invalid RB/RBG may be configured through additional higher layer signaling, and a value thereof may be in units of RB, RBG, RE, MHz, and may be, for example, 10 RB. In addition, when it is configured for the terminal through higher layer signaling that information about the corresponding invalid symbol or invalid RB/RBG may be dynamically indicated through DCI, the information about the invalid symbol or invalid RB/RBG may be dynamically indicated through a certain field of the DCI or may not be indicated. Here, higher layer signaling, which means that the information about an invalid symbol or invalid RB/RBG may be dynamically indicated through DCI, may have common configuration information with respect to an invalid symbol and invalid RB/RBG or may have individual configuration information. In addition, a field in the DCI may be a common field or a separate field for the invalid symbol and invalid RB/RBG.

In a third method, the terminal may receive a configuration for an invalid resource from the BS through higher layer signaling. The corresponding configuration may be configured or indicated for the terminal in the form of a two-dimensional bitmap indicating invalid resources in time and frequency domains. Each bit in the corresponding bitmap may indicate whether a specific time/frequency resource corresponds to an invalid resource, and a size of a two-dimensional bitmap may be determined based on the number of symbols for one or two slots and the number of RBs or RBGs on the frequency resource. Additionally, a period in the time resource with respect to the invalid resource may be configured through additional higher layer signaling, and a value thereof may be in units of slots, subframes, frames, and msec, and may be, for example, 20 ms. Also, a period in the frequency resource with respect to invalid RB/RBG may be configured through additional higher layer signaling, and a value thereof may be in units of RB, RBG, RE, MHz, and may be, for example, 10 RB. In addition, when it is configured for the terminal through higher layer signaling that information about the corresponding invalid resource may be dynamically indicated through DCI, the corresponding invalid resource may be dynamically indicated through a certain field in the DCI or may not be indicated.

Method of Allocating/Determining Frequency Resources when Considering PUSCH Repetition Type B in XDD System According to an embodiment, a method of allocating and determining frequency resources when considering PUSCH repetition type B in an XDD system is described. When the terminal transmits PUSCH repetition type B through frequency resource allocation information configured or indicated by the base station, after determining valid resources by using at least one of first through the fourth methods of an above-described embodiment for determining an invalid symbol, frequency resource allocation in an OFDM symbol in which all frequency resources are configured and indicated as UL may be different from frequency resource allocation in an OFDM symbol in which some frequency resources are configured and indicated as UL and some other frequency resources are configured and indicated as DL. As another example, when only one duplex direction is configured or indicated in an arbitrary time resource of a certain bandwidth part while different TDD configurations are configured for respective BWPs, frequency resource allocation regarding PUSCH repetition type B transmission in an OFDM symbol in which all frequency resources in an arbitrary time resource of a certain BWP are configured and indicated as UL and overlap with frequency resources of another BWP, which are configured or indicated as UL, may be different from a method of frequency resource allocation in an OFDM symbol in which all frequency resources in an arbitrary time resource of a certain BWP are configured and indicated as UL and at the same time overlap with frequency resources of another BWP, which are configured and indicated as DL. In the method of allocating frequency resources, one of the following methods may be configured by the BS for the terminal via higher layer signaling, may be indicated through L1 signaling, or may be configured and indicated through a combination of higher layer signaling and L1 signaling, or a certain method may be fixedly used. Alternatively, the base station may change the configured certain method to another method through MAC-CE.

In a first method, when frequency resource allocation information configured or indicated for the terminal by the base station partially overlaps with frequency resources configured or indicated as DL in a certain time resource (OFDM symbol), rate matching may be performed on the corresponding frequency resources, and PUSCH repetition type B transmission may be performed only on the remaining non-overlapping frequency resources. For example, when a frequency resource allocation length that may be obtained through frequency resource allocation information about PUSCH repetition type B is $RB_{tot}$ RBs, among which a length of a frequency resource configured or indicated as DL in a certain time resource (OFDM symbol) is $RB_{DL}$ RBS, the terminal may perform actual repetition transmission corresponding to $RB_{tot}$-$RB_{DL}$ RBs. Here, when ($RB_{tot}$-$RB_{DL}$) RBs have a value lower than a certain reference value, the corresponding actual repetition may not be transmitted, and the reference value may be configured by higher layer signaling or may be a value that is predetermined in advance by the following rule (e.g., 1 RB, 1 RBG, or ½ or less, ¼ or less of a configured or indicated amount of allocated frequency resources, etc.). Here, when the terminal transmits actual repetition on the reduced amount of frequency resources, the terminal may perform transmission power control based on the amount of frequency resources before the reduction in the amount of frequency resources, or may perform the transmission power control based on the reduced amount of frequency resources. In addition, for reasons such as interference control between downlink and uplink transmission resources, the terminal may perform actual repetition transmission from a point away by RB or RBG of a certain offset (which may be configured by higher layer signaling, indicated by L1 signaling, notified by a combination of configuration and indication of higher layer signaling and L1 signaling, or defined as a certain value in a standard) at a boundary point between DL and UL transmission resources.

In a second method, when the frequency resource allocation information configured or indicated by the BS for the terminal partially overlaps with the frequency resource configured or indicated as DL in a certain time resource (OFDM symbol), the terminal may transmit actual repetition by shifting to an UL resource by the overlapping frequency resource. For example, when RB indices of the start and end points of a frequency resource that may be obtained through the frequency resource allocation information for PUSCH repetition type B are $RB_{start}$ and $RB_{end}$, and when a frequency resource configured or indicated as DL in a certain time resource (OFDM symbol) is from $RB_{end}$-$RB_{DL}$ to $RB_{end}$ among a length $RB_{tot}$ which is a length of all the frequency resources that may be obtained through the frequency resource allocation information, the terminal may shift a frequency resource transmission position of actual repetition from $RB_{start}$-$RB_{DL}$ to $RB_{end}$-$RB_{DL}$ to perform transmission. When a position of the frequency resource of $RB_{start}$-$RB_{DL}$ is lower than the start point of the frequency resource configured or indicated as an UL resource in the corresponding BWP, the terminal may perform rate matching so that actual repetition may be transmitted in the UL resource in the corresponding bandwidth part. In addition, similarly to the previous method, when the frequency resource amount of rate-matched actual repetition is lower than a certain reference value, the terminal may not transmit the corresponding actual repetition, and the reference value may be configured by higher layer signaling, or may be a value that is predetermined in advance according to the following rules (e.g., 1 RB, 1 RBG, or ½ or less, ¼ or less of a configured or indicated amount of allocated frequency resources, etc.). Here, when the terminal transmits actual repetition on the reduced amount of frequency resources, the terminal may perform transmission power control based on the amount of frequency resources before the reduction in the amount of frequency resources, or may perform the transmission power control based on the reduced amount of frequency resources. In addition, for reasons such as interference control between DL and UL transmission resources, the terminal may perform actual repetition transmission from a point away by RB or RBG of a certain offset (which may be configured by higher layer signaling, indicated by L1 signaling, notified by a combination of configuration and indication of higher layer signaling and L1 signaling, or defined as a certain value in a standard) at a boundary point between DL and UL transmission resources.

FIG. 16 illustrates an example of a method for allocating/determining frequency resources, according to an embodiment.

FIG. 16 is a diagram illustrating a method of allocating/determining frequency resources when considering PUSCH repetition type B in an XDD system based on the first method above, according to an embodiment of the present disclosure.

FIG. 16 illustrates a DL resource 1600, a UL resource 1601, and a PUSCH resource 1602 related to PUSCH repetition type B indicated in frequency resource allocation information about PUSCH repetition type.

An allocation length of a frequency resource of the PUSCH resource 1602 related to PUSCH repetition type B, which may be obtained through the frequency resource allocation information about PUSCH repetition type B, may be $RB_{tot}$ RBs 1610. When a frequency resource allocation length configured or indicated as downlink in a certain time resource (OFDM symbol) is $RB_{DL}$ RBs 1611 among $RB_{tot}$ RBs 1610, the terminal may perform rate matching on the $RB_{DL}$ RBs 1615, and may perform, on $RB_{tot}$-$RB_{DL}$ RBs, actual repetition transmission corresponding to $RB_{tot}$-$RB_{DL}$ RBs 1616.

Here, when ($RB_{tot}$-$RB_{DL}$) RBs have a value lower than a certain reference value, the terminal may not transmit the corresponding actual repetition (1620). The reference value may be configured by higher layer signaling or may be a value that is predetermined in advance by the following rule (as an unlimited example, the reference value may be set to 1 RB, 1 RBG, or ½ or less, ¼ or less of a configured or indicated amount of allocated frequency resources, etc.). Here, when the terminal transmits actual repetition on the reduced amount of frequency resources, the terminal may perform transmission power control based on the amount of frequency resources before the reduction in the amount of frequency resources, or may perform the transmission power control based on the reduced amount of frequency resources. In addition, for reasons such as interference control between downlink and uplink transmission resources, the terminal may perform actual repetition transmission from a point away by RB or RBG corresponding to a certain offset 1625 at a boundary point between downlink and uplink transmission resources (1626). As an unlimited example, the offset may be configured by higher layer signaling, indicated by L1 signaling, notified by a combination of configuration and indication of higher layer signaling and L1 signaling, or defined as a certain value in a standard.

FIG. 17 illustrates an example of a method for allocating/determining frequency resources, according to an embodiment.

FIG. 17 is a diagram illustrating a method of allocating/determining frequency resources when considering PUSCH repetition type B in an XDD system based on the second method above, according to an embodiment of the present disclosure.

FIG. 17 illustrates a DL resource 1700, a UL resource 1701, and a PUSCH resource 1702 related to PUSCH repetition type B indicated in frequency resource allocation information about PUSCH repetition type B.

RB indices of the start and end points of a frequency resource that may be obtained through the frequency resource allocation information about PUSCH repetition type B may be $RB_{start}$ 1711 and $RB_{end}$ 1712, respectively. Here, a PUSCH resource 1710 related to PUSCH repetition type B, in which the start index of a frequency resource is $RB_{start}$ 1711 and the RB index of the end point is $RB_{end}$ 1712 of the frequency resource, may be allocated. When frequency resources configured or indicated as downlink in a certain time resource (OFDM symbol) is from $RB_{end}$-$RB_{DL}$ to $RB_{end}$ among a length $RB_{tot}$, which is a length of all the frequency resources that may be obtained through the frequency resource allocation information, the terminal may shift a frequency resource position for transmission of actual repetition, from $RB_{start}$-$RB_{DL}$ 1716 to $RB_{end}$-$RB_{DL}$ 1717 to perform actual repetition transmission. That is, the terminal may perform transmission of actual repetition by using, instead of a resource region 1710 indicated for PUSCH transmission, but a resource region 1715 identified for PUSCH transmission (that is, a resource region consisting of a start index $RB_{start}$-$RB_{DL}$ 1716 of the frequency resource and an end index $RB_{end}$-$RB_{DL}$ 1717 of the frequency resource).

Here, there may be a case 1720 in which a position of the frequency resource of $RB_{start}$-$RB_{DL}$ is lower than the start point of the frequency resource configured or indicated as the uplink resource 1701 in the corresponding bandwidth part. In this case, the terminal may perform rate matching 1721 so that actual repetition may be transmitted in the uplink resource in the corresponding bandwidth part, and transmit actual repetition (1722). Also, for reasons such as interference control between downlink and uplink transmission resources, from a point away by RB or RBG corresponding to a certain offset 1725, the terminal may perform actual repetition transmission at a boundary point between downlink and uplink transmission resources 1726. As an unlimited example, the offset may be configured by higher layer signaling, indicated by L1 signaling, notified by a combination of configuration and indication of higher layer signaling and L1 signaling, or defined as a certain value in a standard.

Also, for reasons such as interference control between downlink and uplink transmission resources, from a point away by RB or RBG corresponding to a certain offset 1725, the terminal may perform actual repetition transmission at a boundary point between downlink and uplink transmission resources 1726. As an unlimited example, the offset may be configured by higher layer signaling, indicated by L1 signaling, notified by a combination of configuration and indication of higher layer signaling and L1 signaling, or defined as a certain value in a standard.

UE Capability Reporting Method

According to an embodiment, the terminal may report at least one of those listed below as UE capability that may express that the operation of the terminal described above may be performed in the embodiments described above.

- UE capability indicating whether XDD system is supported.
- UE capability indicating whether respective resource configuration methods are supported in an XDD system
- UE capability indicating whether respective frequency band identifying methods are supported in an XDD system
- UE capability indicating whether respective UL-DL configuration and indication methods are supported in an XDD system
- UE capability indicating whether respective bandwidth part configuration and indication methods are supported in an XDD system
- UE capability indicating whether respective invalid symbol/resource determination methods considering PUSCH repetition type B are supported in an XDD system
- UE capability indicating whether respective invalid symbol/resource configuration methods considering PUSCH repetition type B are supported in an XDD system
- UE capability indicating whether respective frequency resource allocation methods considering PUSCH repetition type B are supported in an XDD system
- UE capability indicating whether frequency offset support that may be additionally considered in the respective frequency resource allocation methods considering PUSCH repetition type B is provided in an XDD system
- UE capability indicating whether a power control method that may be additionally considered in the respective frequency resource allocation methods considering PUSCH repetition type B is supported in an XDD system The UE capabilities described above are optional with capability signaling, and may support signaling differing according to FR1/FR2. Some or all of the UE capabilities described above may be included in one feature group, or respective UE capabilities may support individual feature group signaling. The UE capabilities described above may support signaling for each terminal, band combination, band, or CC.

Figure 18:
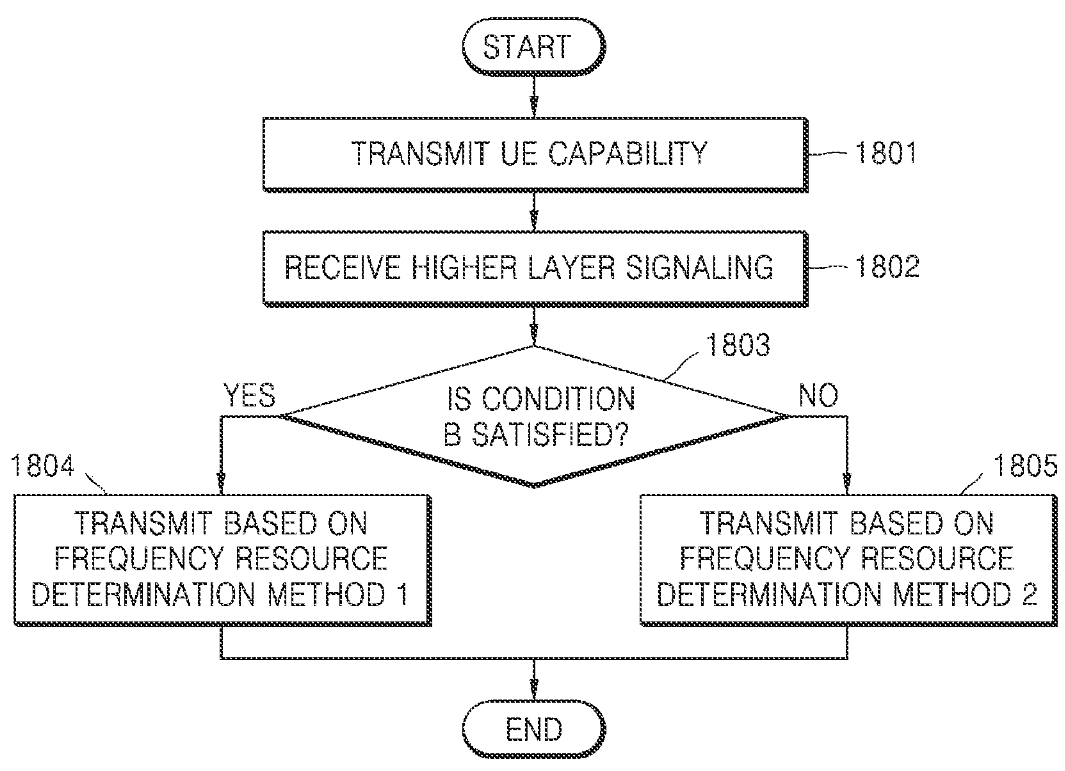
FIG. 18 is a flowchart describing an example of a terminal operation regarding a frequency allocation and determination method, according to an embodiment.

FIG. 18 is a flowchart describing an example of a terminal operation regarding a frequency allocation and determination method, according to an embodiment.

The terminal transmits at least one of the UE capabilities described above, at 1801. The terminal receives, based on the transmitted UE capability, higher layer signaling from the base station, at 1802. Higher layer signaling may be the resource configuration method of the XDD system, the frequency band identifying method, the uplink-downlink configuration method, the PUSCH repetition type B-related configuration information, the method of determining invalid symbol/resources when considering PUSCH repetition type B in the XDD system, the method of generating configuration information regarding invalid symbol/resources and configuration information thereof, the frequency resource allocation and determination method described above.

Thereafter, the operation of the terminal may differ according to whether Condition B is satisfied. At 1803, it is determined whether Condition B is satisfied. Here, Condition B may refer to cases satisfying following conditions.

When PUSCH repetition type B transmission is configured or indicated, and when, with respect to a BWP configured for the terminal, some frequency resources have UL resources and some other frequency resources have a DL resource in a certain time resource in the corresponding bandwidth part, or with respect to the BWP configured for the terminal, when all frequency resources have an UL resource in a certain time resource, and the BWP has a DL resources in the other time resources, and a time ratio between the UL and the DL is different from each other as some or all of frequency resources overlap on a frequency with another BWP accordingly, and when frequency resource allocation regarding PUSCH repetition type B transmission overlaps with DL resources in some time resources and some frequency resources, and When Condition B is satisfied, the terminal transmits PUSCH repetition type B through frequency resource determination method 1, at 1804. The frequency resource determination method 1 may be one of the two above-described methods. When Condition B is not satisfied, the terminal transmits PUSCH repetition type B through frequency resource determination method 2, at 1805. The frequency resource determination method 2 may be the PUSCH repetition type B transmission method that does not consider XDD.

Figure 19:
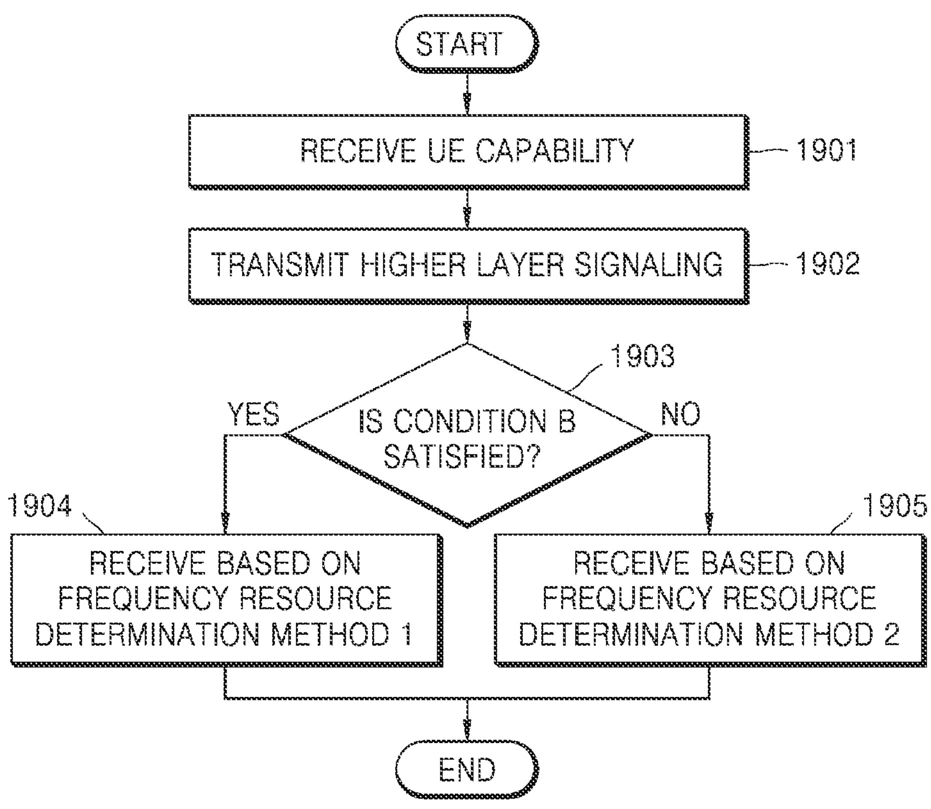
FIG. 19 is a flowchart describing an example of a base station operation regarding a frequency allocation and determining method, according to an embodiment.

FIG. 19 is a flowchart describing an example of a BS operation regarding a frequency allocation and determination method, according to an embodiment.

The BS receives at least one of the UE capabilities described above from the UE, at 1901. The BS transmits higher layer signaling to the terminal based on the received at least one UE capability, 1902. Higher layer signaling that may be included here may be the resource configuration method of the XDD system, the frequency band identifying method, the UL-DL configuration method, the PUSCH repetition type B-related configuration information, the method of determining invalid symbol/resources when considering PUSCH repetition type B in the XDD system, the method of generating configuration information regarding invalid symbol/resources and configuration information thereof, the frequency resource allocation and determination method described above. Thereafter, the operation of the terminal and the base station may differ according to whether Condition B is satisfied. At 1903, it is determined whether Condition B is satisfied. Here, Condition B may refer to cases satisfying following conditions.

When PUSCH repetition type B transmission is configured or indicated, and when, with respect to a BWP configured for the terminal, some frequency resources have UL resources and some other frequency resources have a DL resource in a certain time resource in the corresponding BWP, or with respect to the BWP configured for the terminal, when all frequency resources have an UL resource in a certain time resource, and the BWP has a downlink resources in the other time resources, and a time ratio between the UL and the DL is different from each other as some or all of frequency resources overlap on a frequency with another BWP accordingly, and when frequency resource allocation regarding PUSCH repetition type B transmission overlaps with DL resources in some time resources and some frequency resources, and when Condition B is satisfied, the BS receives, from the terminal, PUSCH repetition type B through frequency resource determination method 1, at 1904. The frequency resource determination method 1 may be one of the two above-described methods. When Condition B is not satisfied, the BS receives PUSCH repetition type B through frequency resource determination method 2, at 1905. Frequency resource determination method 2 may be the PUSCH repetition type B transmission method that does not consider XDD.

Figure 20:
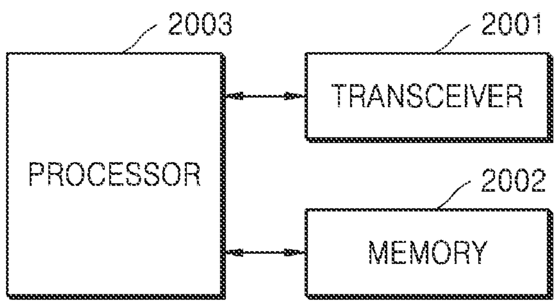
FIG. 20 illustrates a structure of a terminal, according to an embodiment.

FIG. 20 illustrates a structure of a terminal, according to an embodiment.

Referring to FIG. 20, the terminal includes a transceiver 2001, a memory 2002, and a processor 2003. However, elements of the terminal are not limited thereto. For example, the terminal may include a larger or smaller number of elements compared to the above-described elements. Also, at least some or all of the transceiver 2001, the memory 2002, and the processor 2003 of the terminal may be implemented in the form of a single chip.

The transceiver 2001 may transmit or receive signals to or from a BS. The signals may include control information and data. To this end, the transceiver 2001 may include an RF transmitter that performs up-conversion and amplification on a frequency of a signal to be transmitted, and an RF receiver that performs low-noise amplification on a received signal and performs down-conversion on a frequency of the received signal. Also, the transceiver 2001 may receive a signal through a radio channel, output the received signal to the processor 2003, and transmit an output signal of the processor 2003 through a radio channel.

The memory 2002 may store a program and data required for operation of the terminal. The memory 2002 may store control information or data included in signals transmitted and received by the terminal. The memory 2002 may be a storage medium, such as read-only memory (ROM), random access memory (RAM), a hard disk, a compact disc ROM (CD-ROM), and a digital versatile disc (DVD), or a combination of storage media. Also, the memory 2002 may include a plurality of memories. The memory 2002 may store a program for executing an operation for saving power of the terminal.

The processor 2003 may control a series of processes for the terminal to be operated according to embodiments described above. By executing a program stored in the memory 2002, the processor 2003 may receive information such as a configuration for CA, a bandwidth part configuration, an SRS configuration, a PDCCH configuration, etc. from the BS, and control a dormant cell operating operation based on the configuration information.

Figure 21:
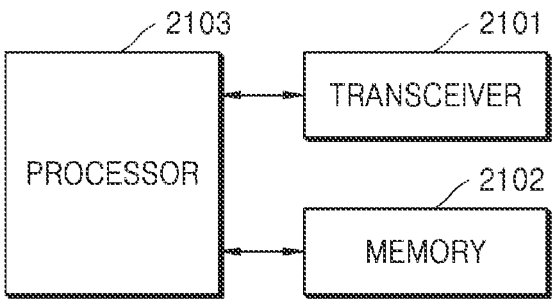
FIG. 21 illustrates a structure of a base station, according to an embodiment.

FIG. 21 illustrates a structure of a stations, according to an embodiment.

Referring to FIG. 21, a BS includes a transceiver 2101, a memory 2102, and a processor 2103. However, elements of the BS are not limited thereto. For example, the BS may include a larger or smaller number of elements compared to the above-described elements. Also, the transceiver 2101, the memory 2102, and the processor 2103 may be implemented in the form of a single chip.

The transceiver 2101 may transmit or receive signals to or from a terminal. The signals may include control information and data. To this end, the transceiver 2101 may include an RF transmitter that performs up-conversion and amplification on a frequency of a signal to be transmitted, and an RF receiver that performs low-noise amplification on a received signal and performs down-conversion on a frequency of the received signal. Also, the transceiver 2101 may receive a signal through a radio channel, output the received signal to the processor 2103, and transmit an output signal of the processor 2103 through a radio channel.

The memory 2102 may store a program and data required for operation of the BS. The memory 2103 may store control information or data included in signals transmitted and received by the BS. The memory 2102 may be a storage medium, such as ROM, RAM, a hard disk, a CD-ROM, and a DVD, or a combination of storage media. Also, the memory 2102 may include a plurality of memories. The memory 2102 may store a program for executing an operation for saving power of the base station.

The processor 2103 may control a series of processes for the BS to be operated according to the embodiments described above. By executing a program stored in the memory 2102, the processor 2103 may transmit information such as a configuration for CA, a bandwidth part configuration, an SRS configuration, a PDCCH configuration, etc. to the BS, and control a dormant cell operation based on the configuration information.

The methods according to the embodiments described herein or in the following claims may be implemented as hardware, software, or a combination of hardware and software.

When implemented in software, a computer-readable storage medium or computer program product storing one or more programs (software modules) may be provided. The one or more programs stored in the computer-readable storage medium or computer program product are configured for execution by one or more processors in an electronic device. The one or more programs include instructions directing the electronic device to execute the methods according to the embodiments of the disclosure as described in the claims and the specification.

The programs (e.g., software modules or software) may be stored in RAM, non-volatile memory including flash memory, ROM, electrically erasable programmable read-only memory (EEPROM), a magnetic disc storage device, a CD-ROM, a DVD, another optical storage device, or a magnetic cassette. Alternatively, the programs may be stored in a memory including a combination of some or all of the above-described storage media. Each of the memories may be provided in plurality.

In addition, the programs may be stored in an attachable storage device accessible through any or a combination of communication networks such as the Internet, an intranet, a local area network (LAN), a wide LAN (WLAN), and a storage area network (SAN). Such a storage device may access, via an external port, an apparatus that performs the embodiments of the disclosure. Furthermore, an additional storage device on the communication network may access the apparatus that performs the above embodiments.

According to the disclosed embodiments, a communication method and apparatus for effectively performing frequency resource allocation in a wireless communication method may be provided.

In the embodiments described above, an element or elements included in the disclosure are expressed in a singular or plural form depending on the described embodiments. However, the singular or plural form is selected properly for a situation assumed for convenience of description and does not limit the disclosure, and elements expressed in a plural form may include a single element and an element expressed in a singular form may include a plurality of elements.

Meanwhile, the embodiments disclosed in the present specification and drawings are presented merely to easily describe the technical content of the disclosure and help understanding of the disclosure, and are not intended to limit the scope of the disclosure. Thus, it will be apparent to those of ordinary skill in the art that the disclosure is not limited to the embodiments of the disclosure, which have been provided only for illustrative purposes. Also, when necessary, the above respective embodiments may be employed in combination. For example, a base station and a terminal may be operated in a manner that portions of an embodiment of the disclosure are combined with portions of another embodiment of the disclosure. The embodiments of the disclosure may also be applied to other communication systems, and various modifications based on the technical concept of the embodiments of the disclosure may be made. For example, the embodiments of the disclosure may be applied to a LTE, 5G or NR system.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:

receiving, from a base station (BS), a radio resource control (RRC) message including configuration information related to a physical uplink shared channel (PUSCH) repetition transmission;

in response to identifying that a frequency resource for the PUSCH repetition transmission on a first bandwidth part (BWP) partially overlaps with a downlink (DL) frequency resource on a second BWP, based on uplink (UL)-DL configuration information received from the BS, identifying a plurality of resource blocks (RBs) included in a part of the frequency resource, on the first BWP, which does not overlap with the DL frequency resource;

based on a number of the plurality of RBs included in the part of the frequency resource being greater than or equal to a reference value, determining, among one or more repetitions scheduled based on the configuration information, at least one actual repetition corresponding to the plurality of RBs included in the part of the frequency resource; and transmitting the at least one actual repetition corresponding to the plurality of RBs included in the part of the frequency resource via the PUSCH.

2. The method of claim 1, wherein:

the configuration information includes information indicating that the PUSCH repetition transmission is configured to the UE, and a time ratio of resources allocated for DL reception and resources allocated for UL transmission for each of the first BWP and the second BWP are different from each other.

3. The method of claim 1, wherein:

the plurality of RBs included in the part of the frequency resource which does not overlap with the DL frequency resource is identified based on a total number of RBs with respect to the PUSCH repetition transmission and a number of RBs included in the DL frequency resource, and the configuration information includes information regarding the total number of RBs.

4. The method of claim 1, wherein the configuration information includes information indicating invalid resource in time domain and frequency domain.

5. The method of claim 1, further comprising:

transmitting, to the BS, UE capability information indicating at least one UE capability related to the PUSCH repetition transmission.

6. The method of claim 3, wherein:

the information regarding the total number of RBs includes a start RB index for the PUSCH repetition transmission and an end RB index for the PUSCH repetition transmission.

7. A user equipment (UE) in a wireless communication system, the UE comprising:

a transceiver; and at least one processor coupled to the transceiver and configured to:

receive, from a base station (BS), a radio resource control (RRC) message including configuration information related to a frequency resource for a physical uplink shared channel (PUSCH) repetition transmission, in response to identifying that a frequency resource for the PUSCH repetition transmission on a first bandwidth part (BWP) partially overlaps with a downlink (DL) frequency resource on a second BWP, based on uplink (UL)-DL configuration information received from the BS, identify a plurality of resource blocks (RBs) included in a part of the frequency resource, on the first BWP, which does not overlap with the DL frequency resource, based on a number of the plurality of RBs included in the part of the frequency resource being greater than or equal to a reference value, determine, among one or more repetitions scheduled based on the configuration information, at least one actual repetition corresponding to the plurality of RBs included in the part of the frequency resource, and transmit the at least one actual repetition corresponding to the plurality of RBs included in the part of the frequency resource via a PUSCH.

8. The UE of claim 7, wherein:

the configuration information includes information indicating that the PUSCH repetition transmission is configured to the UE, and wherein a time ratio of resources allocated for DL reception and resources allocated for UL transmission for each of the first BWP and the second BWP are different from each other.

9. The UE of claim 7, wherein:

the plurality of RBs included in the part of the frequency resource which does not overlap with the DL frequency resource is identified based on a total number of RBs with respect to the PUSCH repetition transmission and, a number of RBs included in the DL frequency resource, and the configuration information includes information regarding the total number of RBs.

10. The UE of claim 7, wherein the configuration information includes information indicating invalid resource in time domain and frequency domain.

11. The UE of claim 9, wherein:

the information regarding the total number of RBs includes a start RB index for the PUSCH repetition transmission and an end RB index for the PUSCH repetition transmission.

12. A method performed by a base station (BS) in a wireless communication system, the method comprising:

transmitting, to a user equipment (UE), a radio resource control (RRC) message including configuration information related to a frequency resource for a physical uplink shared channel (PUSCH) repetition transmission; and based on a number of a plurality of resource blocks (RBs) included in a part of a frequency resource for the PUSCH repetition transmission on a first bandwidth part (BWP) being greater than or equal to a reference value, receiving, via a PUSCH, at least one actual repetition corresponding to the part of the frequency resource, on the first BWP, wherein the plurality of RBs included in the part of the frequency resource for the PUSCH repetition transmission on the first BWP does not overlap with a downlink (DL) frequency resource on a second BWP, and wherein the frequency resource for the PUSCH repetition transmission on the first BWP that partially overlaps with the DL frequency resource on the second BWP is identified at the UE based on uplink (UL)-DL configuration information configured by the BS.

13. The method of claim 12, wherein:

the configuration information includes information indicating that the PUSCH repetition transmission is configured to the UE, and a time ratio of resources allocated for DL reception and resources allocated for UL transmission for each of the first BWP and the second BWP are different from each other.

14. The method of claim 12, wherein:

the plurality of RBs included in the part of the frequency resource which does not overlap with the DL frequency resource is identified based on a total number of RBs with respect to the PUSCH repetition transmission and a number of RBs included in the DL frequency resource, and wherein the configuration information includes information regarding the total number of RBs.

15. The method of claim 12, wherein the configuration information includes information indicating invalid resource in time domain and frequency domain.

16. The method of claim 12, further comprising:

receiving, from the UE, UE capability information indicating at least one UE capability related to the PUSCH repetition transmission.

17. The method of claim 14, wherein:

the information regarding the total number of RBs includes a start RB index for the PUSCH repetition transmission and an end RB index for the PUSCH repetition transmission.

* * * * *